US012672990B2

(12) United States Patent
Trimble et al.

(10) Patent No.: US 12,672,990 B2
(45) Date of Patent: Jul. 7, 2026

(54) PATIENT TRANSPORT APPARATUS WITH SKI ASSEMBLIES

(71) Applicant: Stryker Corporation, Kalamazoo, MI (US)

(72) Inventors: Shawn Trimble, Portage, MI (US); Christopher Gentile, Sturgis, MI (US); Joshua Buck, Grand Rapids, MI (US)

(73) Assignee: Stryker Corporation, Portage, MI (US)

( * ) Notice: Subject to any disclaimer, the term of this patent is extended or adjusted under 35 U.S.C. 154(b) by 314 days.

(21) Appl. No.: 18/570,320

(22) PCT Filed: Mar. 30, 2022

(86) PCT No.: PCT/US2022/022484
§ 371 (c)(1),
(2) Date: Dec. 14, 2023

(87) PCT Pub. No.: WO2023/027771
PCT Pub. Date: Mar. 2, 2023

(65) Prior Publication Data

US 2024/0269020 A1 Aug. 15, 2024

Related U.S. Application Data

(60) Provisional application No. 63/237,307, filed on Aug. 26, 2021.

(51) Int. Cl.
*A61G 5/06* (2006.01)

(52) U.S. Cl.
CPC .................................... *A61G 5/061* (2013.01)

(58) Field of Classification Search
CPC . A61G 5/061; A61G 5/06; A61G 5/00; A61G 1/017; A61G 3/02; A61G 5/066
See application file for complete search history.

(56) References Cited

U.S. PATENT DOCUMENTS 7,398,571 B2 7/2008 Souke et al.
8,307,473 B1 * 11/2012 Lambarth .............. A61G 5/061 5/81.1 R (Continued)

FOREIGN PATENT DOCUMENTS

WO 2008127089 A1 10/2008

OTHER PUBLICATIONS

Partial International Search Report for Application No. PCT/US2022/022484 dated Jul. 20, 2022, 2 pages.

(Continued)

*Primary Examiner* — Valentin Neacsu
*Assistant Examiner* — Michael R Stabley
(74) *Attorney, Agent, or Firm* — Howard & Howard Attorneys PLLC

(57) ABSTRACT

A patient transport apparatus with a seat assembly to support a patient. A rear assembly pivots between first and second rear positions, and a stair rear position. A ski is selectively pivotable relative to the rear assembly between a plurality of ski positions. A carrier is coupled between the rear assembly and the ski and is operable between: an unlocked state where relative movement between the ski and the rear assembly is permitted, and a locked state where the carrier inhibits relative movement between the ski and the rear assembly. Movement of the rear assembly from the first rear position towards the second rear position changes operation of the carrier from the unlocked state to the locked state such that continued movement of the rear assembly into the rear stair position arranges the rear assembly and the ski for engagement with stairs.

19 Claims, 53 Drawing Sheets

(56) References Cited

U.S. PATENT DOCUMENTS

| | | | | |
|---|---|---|---|---|
| 8,439,416 | B2 | 5/2013 | Lambarth et al. | |
| 8,640,798 | B2 * | 2/2014 | Walkingshaw | A61G 5/066 280/5.24 |
| 9,486,373 | B2 | 11/2016 | Lambarth et al. | |
| 9,510,981 | B2 | 12/2016 | Lambarth et al. | |
| 10,744,049 | B2 | 8/2020 | Naber et al. | |
| 10,758,437 | B2 | 9/2020 | Lucas et al. | |
| 10,857,047 | B2 | 12/2020 | Furman et al. | |
| 11,298,279 | B2 | 4/2022 | Trimble et al. | |
| 11,304,865 | B2 * | 4/2022 | Furman | A61G 7/08 |
| 11,395,779 | B2 * | 7/2022 | Feliksa | A61G 1/017 |
| 11,963,916 | B2 * | 4/2024 | Tessmer | A61G 5/066 |
| 2010/0117312 | A1 * | 5/2010 | Walkingshaw | A61G 5/066 305/15 |
| 2014/0299391 | A1 * | 10/2014 | Carletti | A61G 5/061 180/6.7 |
| 2018/0028383 | A1 | 2/2018 | Stryker et al. | |
| 2018/0177652 | A1 | 6/2018 | Furman et al. | |
| 2018/0185212 | A1 | 7/2018 | Lucas et al. | |

OTHER PUBLICATIONS

International Search Report for Application No. PCT/US2022/022484 dated Sep. 12, 2022, 2 pages.

* cited by examiner

PATIENT TRANSPORT APPARATUS WITH SKI ASSEMBLIES

CROSS-REFERENCE TO RELATED APPLICATIONS

The subject patent application claims priority to and all the benefits of U.S. Provisional Patent Application No. 63/237,307, filed on Aug. 26, 2021, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, chairs, stair chairs, and the like. Many conventional patient transport apparatuses, such as for example cots, generally include a base arranged for movement about floor surfaces, and a litter upon which a patient can be positioned or otherwise supported. Here, one or types of lift mechanisms may be employed to facilitate adjusting a vertical position of the litter relative to the base to, among other things, promote patient care, load the patient transport apparatus into an ambulance, and the like.

Conventional stair chairs (or “evacuation chairs”) are configured to facilitate transporting a seated patient up or down a flight of stairs, such as by employing tracks that allow for controlled descent down a staircase. When a patient is to be transported along stairs using a stair chair, the tracks are typically moved from a stowed configuration to a deployed configuration extending outwardly at an angle to engage stairs.

Those having ordinary skill in the art will appreciate that, when used in connection with certain emergency medical services, stair chairs are typically realized as separate patient transport apparatuses from cots. Further, many conventional ambulances are configured to facilitate loading, securing, and transporting cots, but typically only employ storage space for stair chairs. Thus, in scenarios where a patient being transported via an ambulance on a cot must be transported up or down stairs using a stair chair, the patient sometimes has to be transferred between different patient transport apparatuses, such as from a stair chair to a cot which may subsequently be loaded into an ambulance.

A patient support system designed to overcome one or more of the aforementioned challenges is desired.

SUMMARY

The present disclosure is directed towards a patient transport apparatus for supporting a patient for transport along stairs. The patient transport apparatus includes a seat assembly with a seat frame and a seat section coupled to the seat frame to support the patient. A rear assembly is coupled to the seat assembly and is pivotable between a plurality of rear assembly positions including a first rear assembly position, a second rear assembly position, and a plurality of intermediate rear assembly positions therebetween, the plurality of intermediate rear assembly positions including a rear assembly stair position. A front assembly spaced from the rear assembly is coupled to the seat assembly. A ski assembly is operatively attached to the seat assembly and is selectively pivotable relative to the rear assembly between a plurality of ski positions. A carrier is coupled between the rear assembly and the ski assembly and is operable between: an unlocked state where relative movement between the ski assembly and the rear assembly is permitted, and a locked state where the carrier inhibits relative movement between the ski assembly and the rear assembly. Movement of the rear assembly from the first rear assembly position towards the second rear assembly position changes operation of the carrier from the unlocked state to the locked state such that continued movement of the rear assembly into the rear assembly stair position arranges the rear assembly and the ski assembly for engagement with stairs.

The present disclosure is also directed towards a patient transport apparatus for supporting a patient for transport along stairs. The patient transport apparatus includes a seat assembly with a seat frame and a seat section coupled to the seat frame to support the patient. A rear assembly is coupled to the seat assembly adjacent to a rear side of the patient transport apparatus and is pivotable between a plurality of rear assembly positions including a rear assembly chair position, and a rear assembly stair position for engaging stairs. A front assembly spaced from the rear assembly is coupled to the seat assembly adjacent to a front side of the patient transport apparatus. A brace operatively is attached to the seat frame, and a ski assembly is operatively attached to the seat assembly. The ski assembly is pivotable relative to the rear assembly between a plurality of ski positions including: a raised ski position arranged for engagement with stairs, and a lowered ski position, the ski assembly includes a stop face arranged to abut the brace in the raised ski position to maintain the ski assembly in the raised ski position during engagement with stairs. A biasing element is operatively attached to the ski assembly to urge the ski assembly towards the raised ski position. A fowler assembly is coupled to the seat assembly and is pivotable between a plurality of fowler positions including a fowler lowered position, a fowler raised position, and a plurality of intermediate fowler positions therebetween. The fowler assembly includes a guide arranged to abut at least a portion of the ski assembly in the fowler lowered position and disposed in spaced relation from the ski assembly in the fowler raised position such that movement from the fowler raised position towards the fowler lowered position moves the ski assembly from the raised ski position towards the lowered ski position as the guide comes into abutment with at least a portion of the ski assembly.

DETAILED DESCRIPTION

Figure 1A:
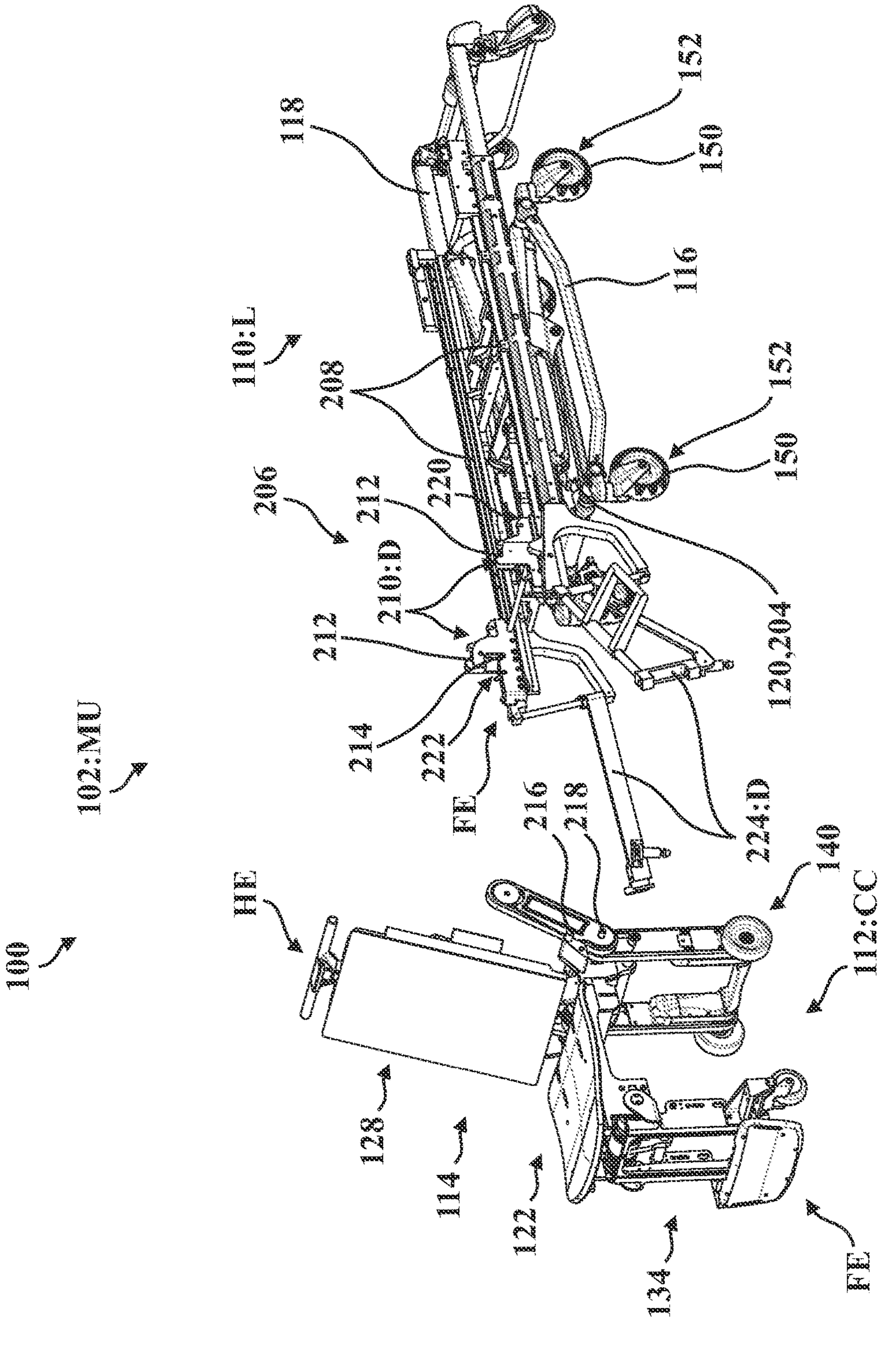
FIG. 1A is a perspective view of a patient transport apparatus of a patient support system of the present disclosure, shown with the patient transport apparatus operating in an undocked mode with a base having stabilizers arranged in a deployed configuration to brace the base against floor surfaces for loading a litter, the litter shown positioned adjacent to the base and arranged in a chair configuration.
Figure 1B:
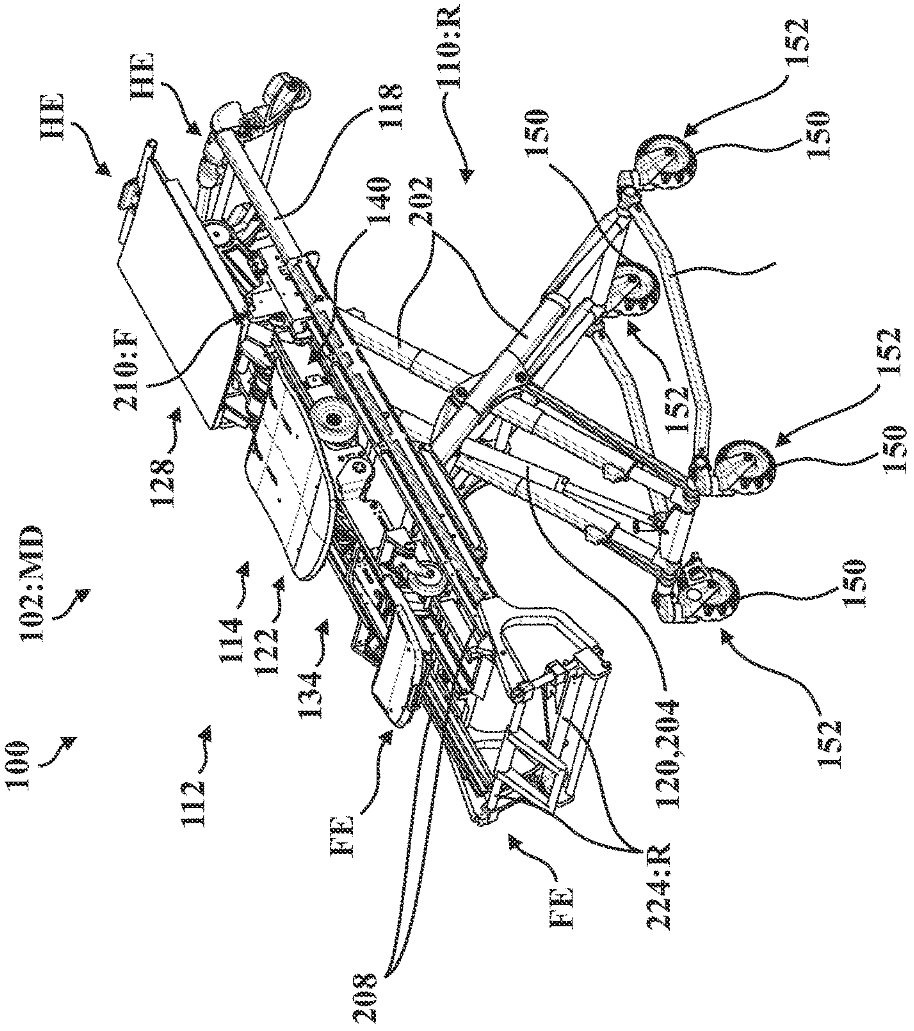
FIG. 1B is another perspective view of the patient transport apparatus of FIG. 1A, shown with the patient transport apparatus operating in a docked mode with the litter secured to the base and with the stabilizers arranged in a retracted configuration.
Figure 4A:
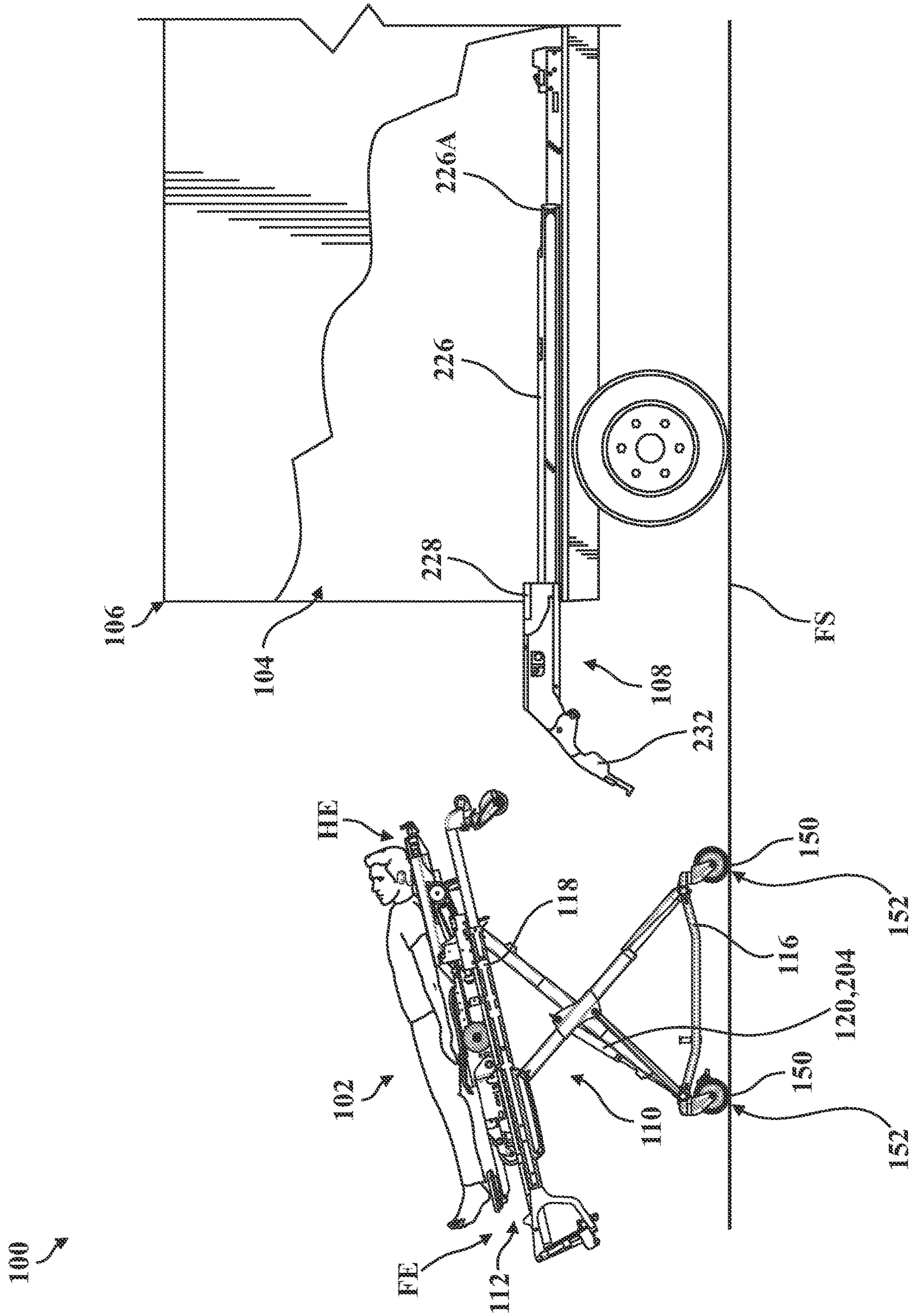
FIG. 4A is another side view of the patient transport apparatus of FIGS. 1A-3G, shown positioned adjacent to a cargo area of an ambulance to which a power load device is secured, with the base of the patient transport apparatus shown arranged in a raised configuration.

Referring to FIGS. 1A-1B and 4A, portions of a patient support system 100 are shown including a patient transport apparatus 102 for supporting a patient in a health care setting according to aspects of the present disclosure. In some versions, the patient transport apparatus 102 is configured to be loaded into a cargo area 104 of an ambulance 106, such as via a power load device 108 (see FIGS. 4A-4C). As will be appreciated from the subsequent description below, while the illustrated versions of the patient transport apparatus 102 described herein are configured as cots for transporting patients, the patient transport apparatus 102 may comprise a hospital bed, a stretcher, a table, a wheelchair, a chair, or a similar apparatus utilized in the care of a patient. The version of the patient transport apparatus 102 shown in FIGS. 1A-1B generally comprises a base 110 and a litter 112. The litter 112 defines or otherwise comprises a patient support surface 114 to support a patient.

In some versions, the patient transport apparatus 102 may comprise a reconfigurable patient support as described in U.S. Pat. No. 9,486,373, which is hereby incorporated by reference in its entirety. In some versions, the patient transport apparatus 102 may comprise a reconfigurable transport apparatus as described in U.S. Pat. No. 9,510,981, which is hereby incorporated by reference in its entirety. In some versions, the patient transport apparatus 102 may comprise a person support apparatus system as described in U.S. Patent Application Publication No. 2018/0028383, which is hereby incorporated by reference in its entirety. In some versions, the patient transport apparatus 102 may comprise a patient transfer apparatus with integrated tracks as described in U.S. patent application Ser. No. 15/854,943, which is hereby incorporated by reference in its entirety. In some versions, the patient transport apparatus 102 may comprise a variable speed patient transfer apparatus as described in U.S. patent application Ser. No. 15/854,199, which is hereby incorporated by reference in its entirety. In some versions, the patient transport apparatus 102 may comprise a patient transfer apparatus as described in U.S. patent application Ser. No. 15/855,161, which is hereby incorporated by reference in its entirety. In some versions, the patient transport apparatus 102 may comprise an ambulance cot as described in U.S. Pat. No. 7,398,571, which is hereby incorporated by reference in its entirety.

With continued reference to FIGS. 1A-1B, the base 110 and litter 112 each have a head end HE and a foot end FE corresponding to designated placement of the patient's head and feet on the patient transport apparatus 102. In FIG. 1A, the litter 112 is shown separated from the base 110; as is described in greater detail below, the base 110 is configured to removably receive and support the litter 112 in certain situations. Put differently, in the illustrated version, the litter 112 is configured for releasable attachment to the base 110. The base 110 generally includes a base frame 116, an intermediate frame 118, and a base lift device 120. The intermediate frame 118 is spaced above the base frame 116 and is moved relative to the base frame 116 via the base lift device 120 as described in greater detail below. Although not illustrated in detail in the drawings, a mattress (or sections thereof) may be disposed on or integral with the litter 112. In such circumstances, the mattress comprises or otherwise defines a secondary patient support surface 114 upon which the patient is supported.

As will be described in greater detail below in connection with FIGS. 3A-8, in the illustrated versions, the litter 112 employs a plurality of assemblies, some of which are capable of being articulated relative to others in various ways and under certain operating conditions to adjust the patient support surface 114 and to facilitate docking to and undocking from the base 110. In the illustrated version, the litter 112 generally includes a seat assembly 122 with a seat frame 124 and a seat section 126, a fowler assembly 128 with a fowler frame 130 and a fowler section 132, a front assembly 134 with a front frame 136 and a front section 138, a rear assembly 140 with a rear frame 142, and a ski assembly 144. Each of the assemblies 122, 128, 134, 140, 144 introduced above will be described in greater detail below.

In the illustrated versions, the fowler assembly 128 pivots relative to the seat assembly 122 about a rear axis XR, the front assembly 134 pivots relative to the seat assembly 122 about a front axis XF, and the rear assembly 140 pivots relative to the seat assembly 122 about a rear axis XR. In addition, the ski assembly 144 pivots about the rear axis XR as described in greater detail below, but could pivot about other axes in some configurations. In the illustrated version, the seat section 126, the fowler section 132, and the front section 138 each provide support to the patient and, thus, generally cooperate to define the patient support surface 114. In the illustrated version, the front section 138 is also configured to translate along the front frame 136, such as is described in U.S. patent application Ser. No. 16/705,878, the disclosure of which is hereby incorporated by reference in its entirety. It will be appreciated that the fowler section 132 and the front section 138 may pivot relative to the seat section 126, or may articulate relative to the seat section 126 in any manner. For instance, the fowler section 132 and/or the front section 138 may both pivot and translate relative to the seat section 126 in some configurations.

Caregiver interfaces 148, such as handles, help facilitate movement of the patient transport apparatus 102 over floor surfaces. Here, caregiver interfaces 148 may be coupled to the fowler assembly 128, the front assembly 134 (not shown), the intermediate frame 118, and the like. Additional caregiver interfaces 148 may be integrated into other components of the patient transport apparatus 102. The caregiver interfaces 148 are graspable by the caregiver to manipulate the patient transport apparatus 102 for movement.

Base wheels 150 are coupled to the base frame 116 to facilitate transport over floor surfaces. The base wheels 150 are arranged in each of four quadrants of the base 110 adjacent to corners of the base frame 116. In the illustrated versions, the base wheels 150 are caster wheels, which are able to rotate and swivel relative to the base frame 116 during transport. Each of the base wheels 150 forms part of a base caster assembly 152. Each base caster assembly 152 is mounted to the base frame 116. It should be understood that various configurations of base caster assemblies 152 are contemplated. In addition, in some configurations, the base wheels 150 are not caster wheels and may be non-steerable, steerable, non-powered, powered, or combinations thereof. Additional base wheels 150 are also contemplated. For example, the patient transport apparatus 102 may comprise four non-powered, non-steerable wheels, along with one or more powered wheels. In some cases, the patient transport apparatus 102 may not include any wheels. In other configurations, one or more auxiliary wheels (powered or non-powered), which are movable between stowed positions and deployed positions, may be coupled to the base frame 116. In some cases, when these auxiliary wheels are located between caster assemblies and contact the floor surface FS in the deployed position, they cause two of the base caster assemblies 152 to be lifted off the floor surface thereby shortening a wheel base 110 of the patient transport apparatus 102. A fifth wheel may also be arranged substantially in a center of the base 110. Other configurations are contemplated.

It should be noted that in many of the drawings described herein, certain components of the patient transport apparatus 102 have been omitted from view for convenience of description and ease of illustration.

Figure 2:
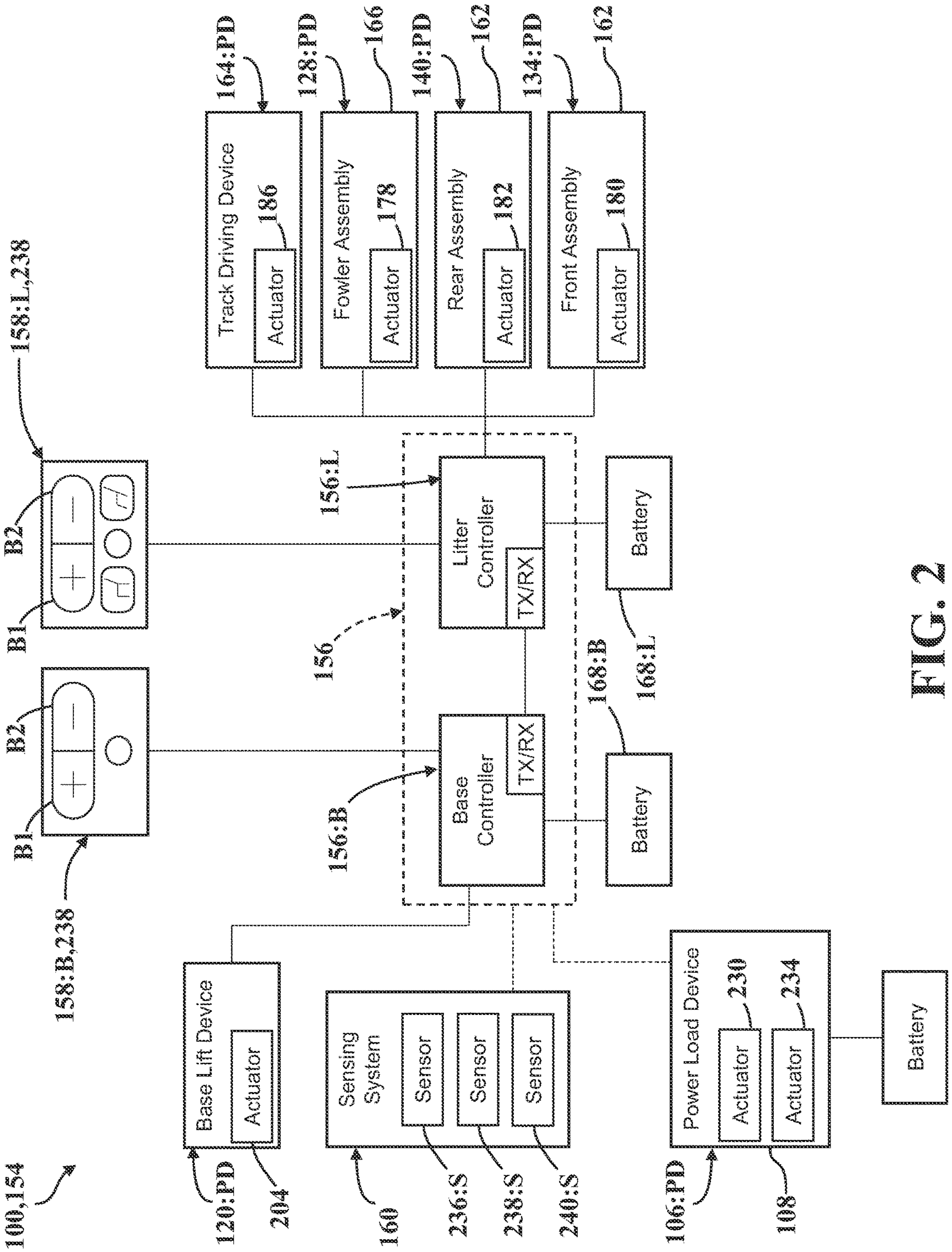
FIG. 2 is a schematic view of a control system of the patient transport apparatus of FIGS. 1A-1B.

Referring now to FIG. 2, a control system 154 of the patient transport apparatus 102 is shown schematically. The control system 154 generally comprises one or more powered devices PD operated by a base controller 156B and/or a litter controller 156L (collectively referred to herein as "controller 156") in response to actuation of a base user interface 158B and/or a litter user interface 158L (collectively referred to herein as "user interface 158") in response to state signals received from a sensing system 160. Each of these components will be described in greater detail below.

With continued reference to FIG. 2, each of the one or more powered devices PD of the control system 154 is configured to perform one or more predetermined functions. To this end, the powered devices PD employ one or more components that utilize electricity in order to perform functions. One or more powered devices PD of the patient support system 100 and/or the patient transport apparatus 102 may comprise powered adjustment devices, such as the power load device 108, the base lift device 120, a litter lift device 162, a track driving device 164, and a fowler section adjustment device 166. To this end, in some versions, the base 110 employs a base energy storage device 168B and the litter 112 employs a litter energy storage device 168L (collectively referred to herein as "energy storage device 168"). Other powered devices PD are also contemplated.

The powered devices PD may have many possible configurations for performing the predetermined functions of the patient transport apparatus 102. As will be appreciated from the subsequent description below, powered devices PD may cooperate with or otherwise form a part of the patient transport apparatus 102 in certain versions. Exemplary configurations of some of the powered devices PD are described in greater detail below. One or more actuators may be used to effectuate functions of each powered device PD. It should be understood that numerous configurations of the powered devices PD, other than those specifically described herein, are contemplated. Exemplary scenarios of how certain powered devices PD may be utilized are also described below. However, numerous other scenarios not described herein are also contemplated.

The litter 112 of the present disclosure is configured to be removably attached to the intermediate frame 118 of the base 110, as noted above and as is described in greater detail below, and is generally operable between: an undocked mode MU (see FIG. 1A) where the litter 112 supports the patient for movement independent of the base 110, and a docked mode MD (see FIG. 1B) where the litter 112 support the patient for movement concurrent with the base 110. The process of moving between the undocked mode MU and the docked mode MD is described in greater detail below in connection with FIGS. 3A-3G. While operating in the undocked mode MU, the litter 112 is operable between a lift configuration CL (see FIG. 7A), a chair configuration CC (see FIG. 7C), and a stair configuration CS (see FIGS. 7D-8).

Figure 7A:
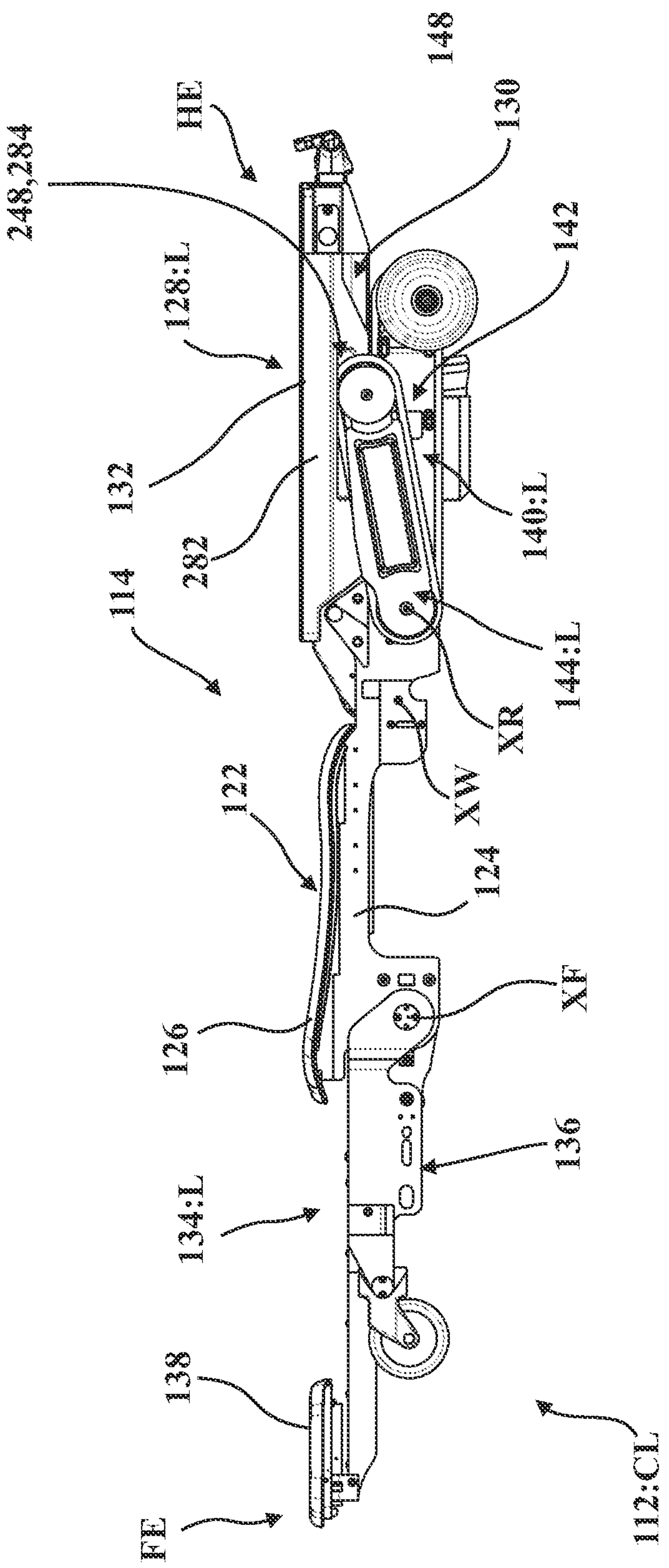
FIG. 7A is a side view of the litter of the patient transport apparatus of FIGS. 1A-6, shown arranged in a loft configuration.
Figure 7B:
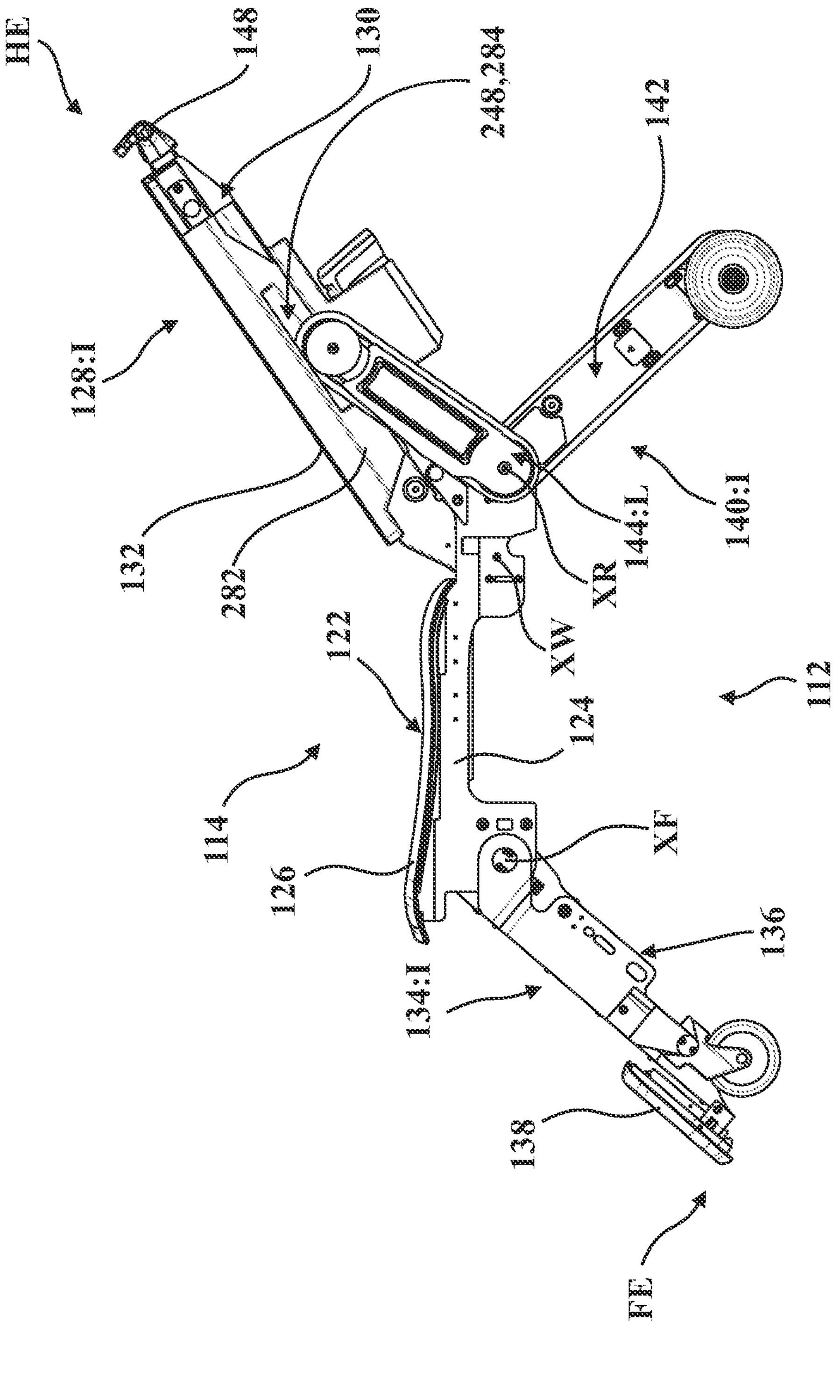
FIG. 7B is another side view of the litter of FIG. 7A shown transitioning between the loft configuration and the chair configuration.
Figure 7C:
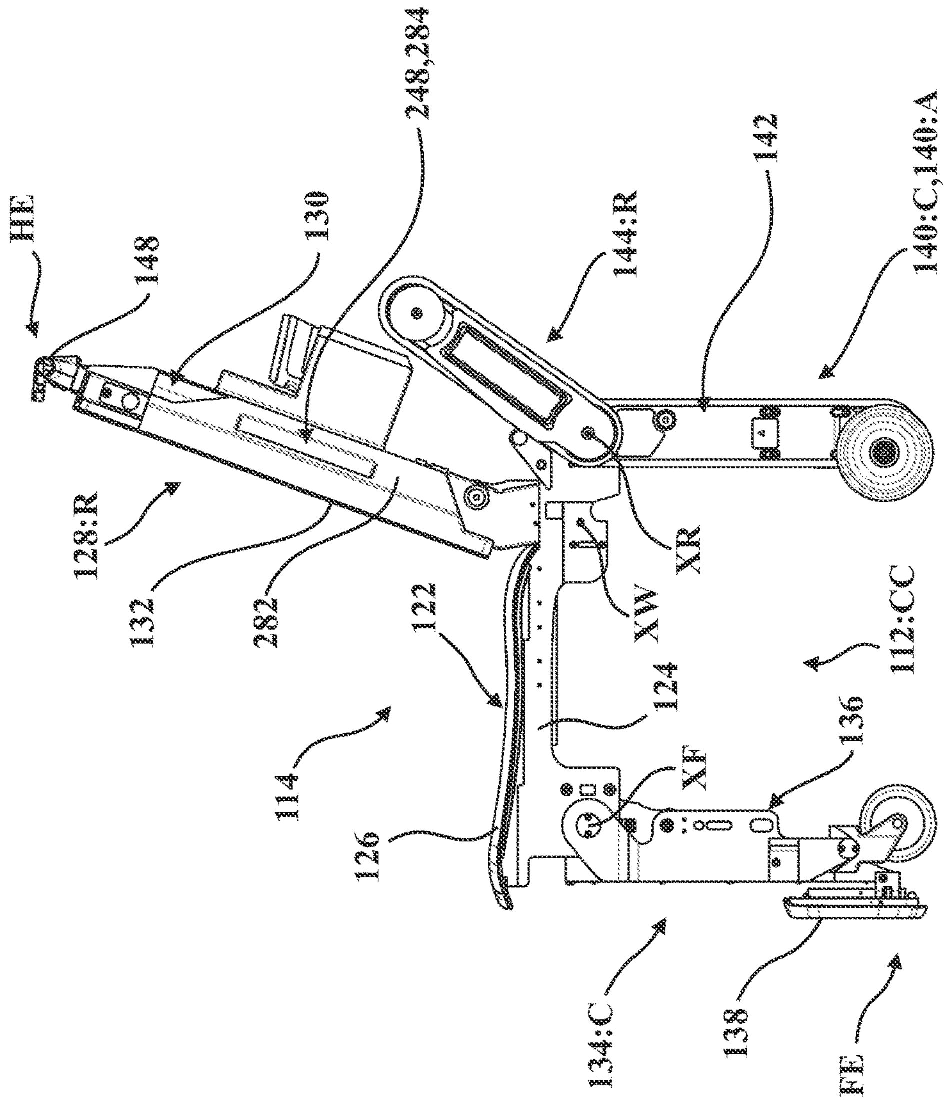
FIG. 7C is another side view of the litter of FIGS. 7A-7B shown arranged in the chair configuration.
Figure 7D:
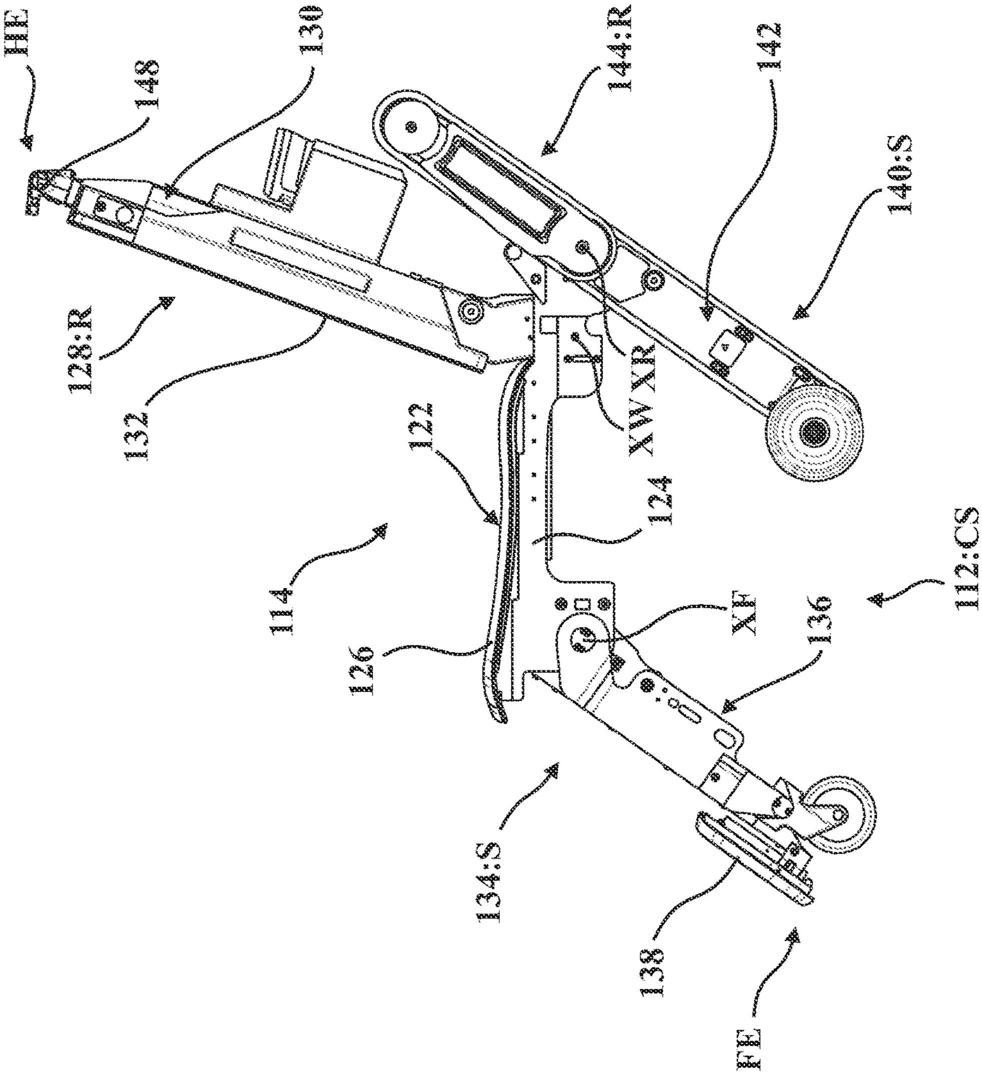
FIG. 7D is another side view of the litter of FIGS. 7A-7C shown arranged in a stair configuration.
Figure 8:
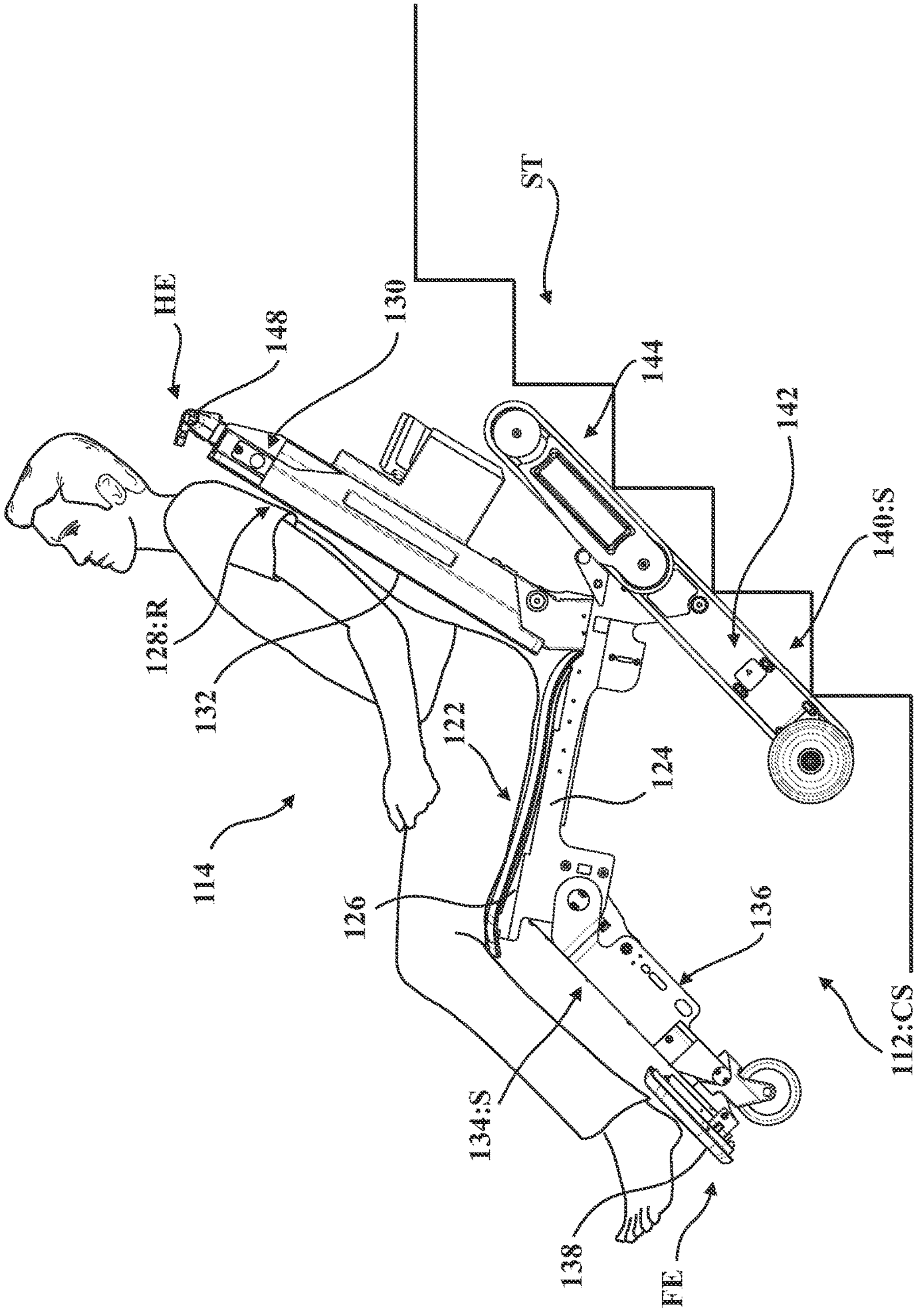
FIG. 8 is another side view of the litter of FIGS. 7A-7D shown arranged in the stair configuration supporting a patient for transport along stairs.
Figure 9:
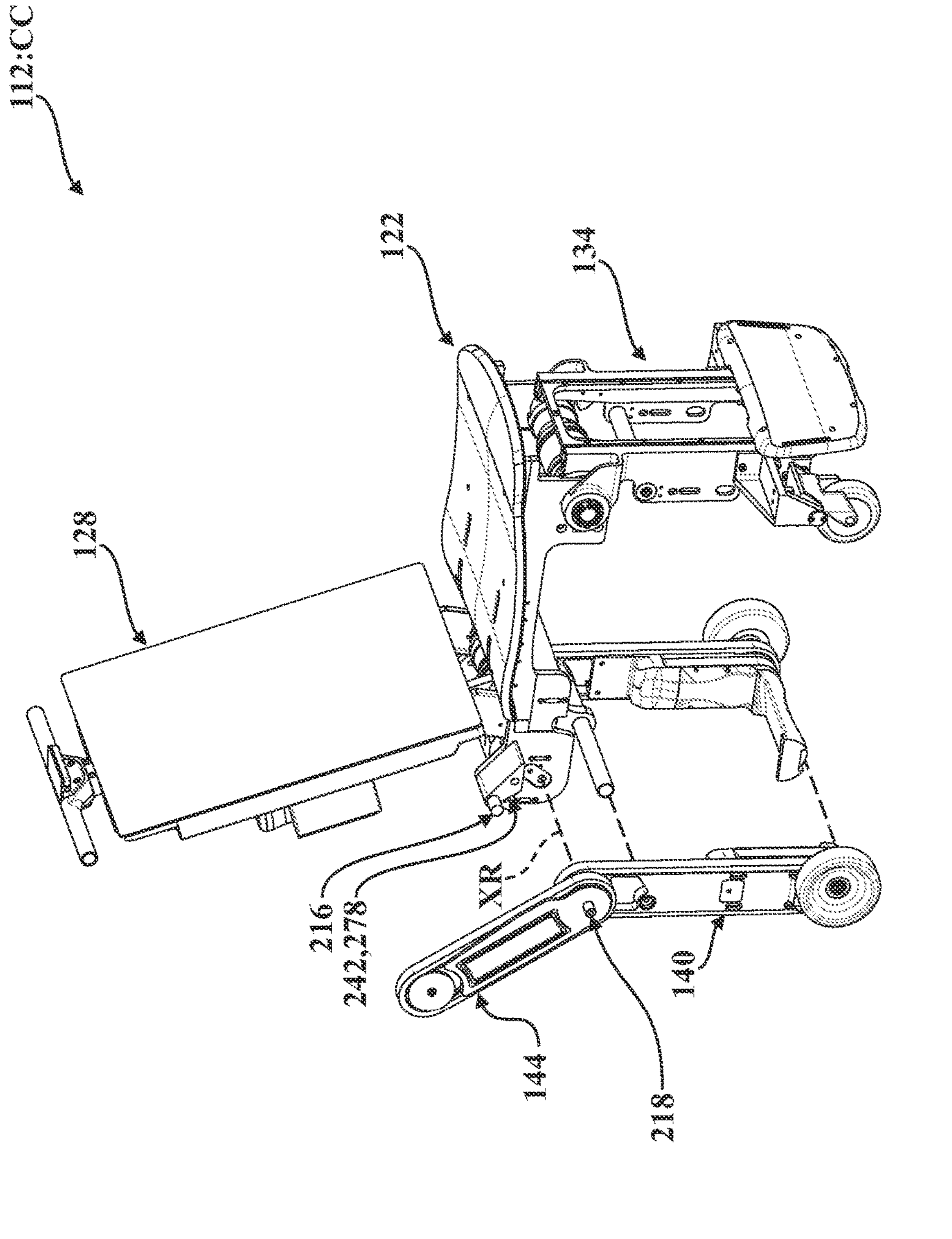
FIG. 9 is a partially-exploded perspective view of the litter of the patient transport apparatus of FIGS. 1A-4C, shown with a rear leg of a rear assembly spaced from a seat frame member of a seat assembly.
Figure 10:
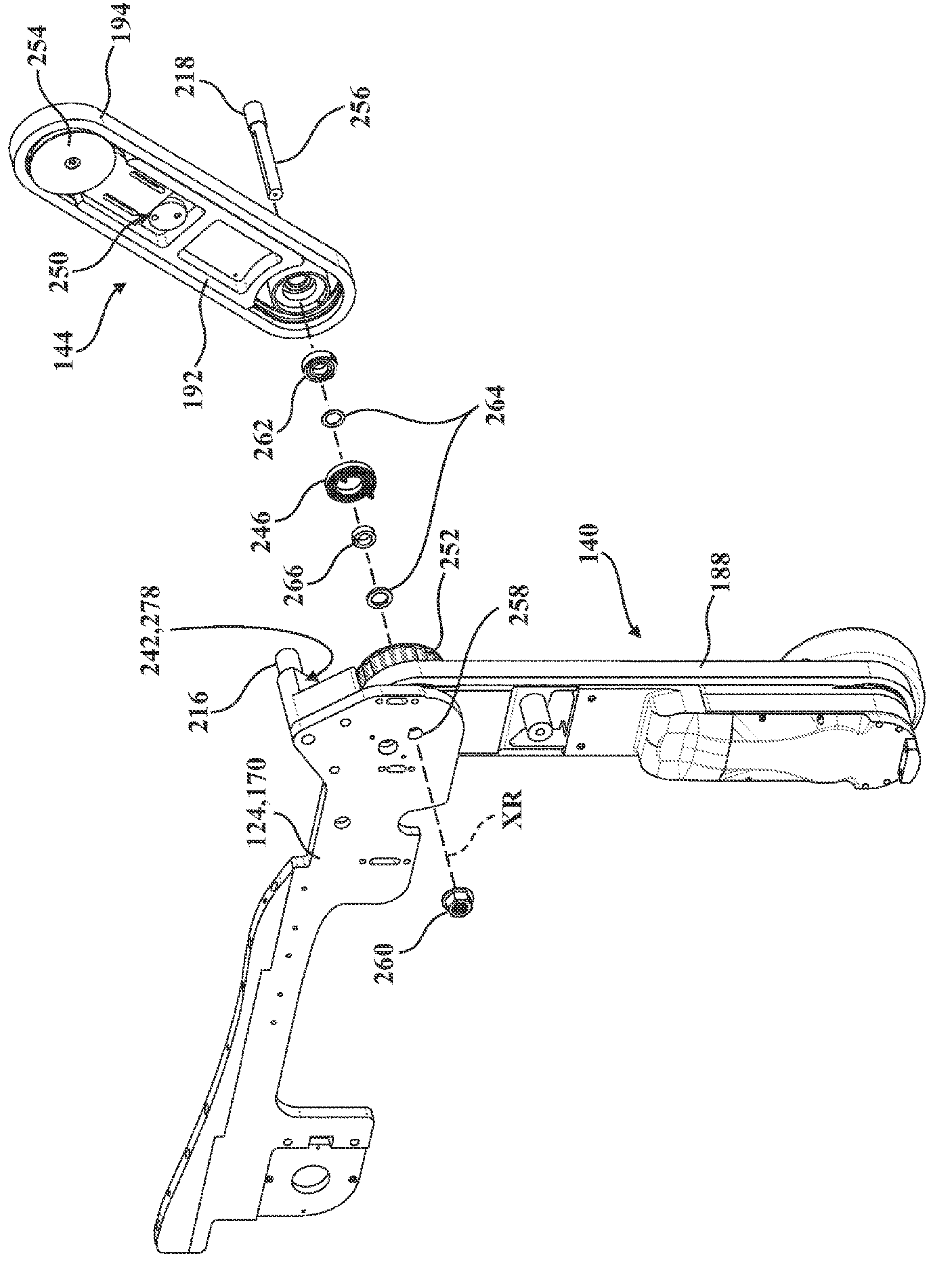
FIG. 10 is a partially-exploded perspective view of portions of the litter of FIG. 9, shown with portions of a ski assembly positioned adjacent to the rear assembly.

In the version shown in FIGS. 7C-8, when operating in and between the chair and stair configurations CC, CS, the litter 112 is configured to serve as a mobile chair to transport the patient along floor surfaces FS as well as up and down stairs ST. Mobile chairs (sometimes called "stair chairs") are used to evacuate patients from buildings where patient accessibility is limited, such as buildings having more than one floor. As noted above, the patient support surface 114 of the litter 112 of the illustrated patient transport apparatus 102 is generally defined by the fowler section 132, the seat section 126, and the front section 138. Here, the seat section 126 is supported by the seat frame 124, and the fowler section 132 is supported by the fowler frame 130 that is coupled to the seat frame 124 such that the fowler frame 130 may pivot or otherwise articulate relative to the seat frame 124. The front section 138 is supported by the front frame 136 which is coupled to the seat frame 124 such that the front frame 136 may pivot or otherwise articulate relative to the seat frame 124. Here too, the rear assembly 140 is coupled to the seat frame 124 such that the rear frame 142 may pivot or otherwise articulate relative to the seat frame 124.

In some configurations, the seat frame 124 may include seat frame members 170 spaced laterally apart from and fixed relative to each other. Similarly, the fowler frame 130 may include fowler frame members 172 spaced laterally apart and fixed relative to each other. The front frame 136 may include front legs 174 spaced laterally apart and fixed relative to each other, and the rear frame 142 may include rear legs 176 spaced laterally apart and fixed relative to each other. In the illustrated version, the litter 112 comprises a fowler actuator 178, a front actuator 180, and a rear actuator 182 which are each driven by the controller 156 (e.g., by the litter controller 156L) and are operatively attached to the seat assembly 122 to facilitate respectively pivoting or otherwise articulating the fowler assembly 128, the front assembly 134, and the rear assembly 140 relative to the seat assembly 122.

In the illustrated versions, the fowler assembly 128 is movable via the fowler actuator 178 between a fowler raised position 128R (see FIGS. 7D-7E), a fowler lowered position 128L (see FIG. 7A), and one or more intermediate fowler positions 1281 (see FIG. 7B) between the fowler raised position 128R and the fowler lowered position 128L.

As noted above, the illustrated patient transport apparatus 102 employs the track driving device 164, which is configured to assist users in traversing a flight of stairs ST by mitigating the load users (e.g., caregivers) would otherwise be required to lift via caregiver interfaces 148 (see FIG. 8; not shown in detail). In some configurations, the track driving device 164 may be configured to move the litter 112 across the floor surface FS (not shown). The track driving device 164 is formed as a part of the rear legs 176 of the rear assembly 140. Here, each rear leg 176 includes a respective leg track frame member 184 coupled to the seat frame 124 for pivoting movement about the rear axis XR. The track driving device 164 also includes track actuators 186 which drive continuous leg tracks 188 rotatably coupled to the respective leg track frame members 184. The track actuators 186 are coupled to the track frame members 184 and are coupled to (or otherwise disposed in communication with) the controller 156 to drive the leg tracks 188 for ascending and descending stairs ST (see FIG. 8). The track driving device 164 may be configured to operate in the same manner or a similar manner as those shown in U.S. Pat. Nos. 7,398,571, 9,486,373, 9,510,981, and/or U.S. Patent Application Publication No. 2018/0028383, previously referenced.

The rear assembly 140 also includes rear wheels 190 rotatably coupled to each of the track frame members 184 that are configured to be disposed in contact with the floor surface FS, such as to support the litter 112 for movement in the chair configuration CC. In the illustrated versions, the rear wheels 190 are freely rotatable. In alternative versions, the rear wheels 190 may be powered drive wheels coupled to the controller 156. Other configurations are contemplated. The components of the track driving device 164 are arranged such that the leg track frame members 184, the leg tracks 188, and the rear wheels 190 move together with the rear assembly 140 which, as noted above, is arranged to selectively pivot about the rear axis XR to facilitate changing between the various configurations of the litter 112 as well as to facilitate docking and undocking from the base 110. As will be described in greater detail below, the rear assembly 140 is movable via the rear actuator 182 between a rear assembly loft position 140L (see FIG. 7A), a rear assembly chair position 140C (see FIG. 7C), a rear assembly stair position 140S (see FIGS. 7D-8), a rear assembly dock position 140D (see FIG. 3D), and one or more intermediate rear assembly positions 140I (see FIG. 7B) between the rear assembly loft position 140L and the rear assembly dock position 140D. For the purposes of clarity and consistency, it will be appreciated that the rear assembly chair position 140C and the rear assembly stair position 140S may be considered intermediate rear assembly positions 140I in some versions.

In some versions, the ski assemblies 144 serve as extensions to the track driving device 164 and likewise help facilitate engagement with stairs ST. To this end, in the illustrated versions, the ski assemblies 144 each include respective ski track frame members 192 operatively attached to the seat frame 124 for pivoting movement about the rear axis XR (or another axis). Here too, the track actuators 186 drive continuous ski tracks 194 rotatably coupled to the respective ski track frame members 192. In some versions, the ski assemblies 144 are arranged for pivoting movement between a plurality of ski positions, including a raised ski position 144R (see FIGS. 7C-7D), a lowered ski position 144L (see FIG. 7A), and one or more intermediate ski positions 1441 (see FIG. 20G) between the raised ski position 144R and the lowered ski position 144L. In some versions, abutment with the fowler assembly 128 moves the ski assemblies 144. However, other configurations are contemplated. In some versions, the ski assembly 144 is arranged for engagement with stairs ST in the raised ski position 144R (e.g., the version shown in FIGS. 9-15B), while in other versions the ski assembly 144 is arranged for engagement with stairs ST in an intermediate ski position 1441.

The front legs 174 of the front assembly 134 support respective front wheels 196, which are realized as part of respective front caster assemblies 198 arranged to facilitate movement of the litter 112 in the chair configuration CC (see FIGS. 5-6 and 7C), as well as to facilitate transitioning between the chair configuration CC and the stair configuration CS (compare FIGS. 7C-7D). In the illustrated versions, the front wheels 196 are freely rotatable, but could be motorized, braked, and the like in some versions. As noted above, in some versions, the front section 138 may be translatable along the front frame 136, such as when the litter 112 moves between the loft configuration CL and the chair configuration CC (compare FIGS. 7A-7D), and/or when the litter 112 operates in the docked mode MD (see FIG. 4A). To this end, the front assembly 134 may include an extension mechanism, generally indicated at 200, configured to longitudinally position the front section 138 relative to the front legs 174. While not depicted in detail herein, the extension mechanism 200 may be similar to as is described in U.S. patent application Ser. No. 16/705,878, the disclosure of which is incorporated by reference in its entirety. As will be described in greater detail below, the front assembly 134 is movable via the front actuator 180 between a front assembly loft position 134L (see FIG. 7A), a front assembly chair position 134C (see FIG. 7C), a front assembly stair position 134S (see FIGS. 7D-8), and one or more intermediate front assembly positions 1341 (see FIG. 7B) between the front assembly loft position 134L and the front assembly dock position 134D.

The litter lift device 162 is coupled to the litter 112 and is configured to raise and lower the patient between minimum and maximum heights of the litter 112, and to generally facilitate movement between the loft configuration CL, the chair configuration CC, and the stair configuration CS when the litter 112 is separated from the base 110 (see FIGS. 7A-7D). To this end, the illustrated litter lift device 162 generally includes the front actuator 180 and the rear actuator 182. The base lift device 120 is coupled to the base 110 and is configured to raise and lower the patient between a plurality of vertical configurations including a maximum raised configuration 110R (see FIG. 1B), a maximum lowered configuration 110L (see FIG. 1A), and a plurality of vertical configurations therebetween, both while the litter 112 is supported by the base 110 and, in some versions, while the litter 112 is undocked from the base 110.

In the representative version illustrated in FIGS. 1A-1B, the base 110 comprises one or more lift arms 202 coupling the intermediate frame 118 to the base frame 116. The base lift device 120 comprises one or more base lift actuators 204 coupled to at least one of the base frame 116 and the intermediate frame 118 to raise and lower the intermediate frame 118 and litter 112 relative to the floor surface FS and the base frame 116. The base lift device 120 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

The base 110 of the patient transport apparatus 102 also generally includes a docking subassembly 206 operatively coupled to the intermediate frame 118. Here, the docking subassembly 206 includes intermediate rails 208 which support a trolley 210 for translation between a trolley forward position 210F where the trolley 210 is arranged at the head end HE of the base 110, and a trolley docking position 210D where the trolley 210 is arranged at the foot end FE of the base 110. The trolley 210 includes or otherwise defines upper and lower pin stops 212, 214 which are arranged to engage against respective upper and lower pins 216, 218 of the litter 112 in order to support the litter 112 in a cantilevered position CP during the process of docking the litter 112 to the base 110, as well as to support the litter 112 to the base 110 when operating in the docked mode MD. The docking subassembly 206 also generally includes a forward trolley lock mechanism 220 to inhibit movement of the trolley 210 away from the trolley forward position 210F, and a dock trolley lock mechanism 222 to inhibit movement of the trolley 210 away from the trolley docking position 210D, in order to facilitate transitioning between the undocked mode MU and the docked mode MD as described in greater detail below.

In the illustrated version, the base 110 also includes a stabilizer 224 operatively attached to the foot end FE of the intermediate frame 118 and configured for movement between a retracted configuration 224R (see FIGS. 3F-3G) where the stabilizer 224 is disposed in spaced relation from the floor surface FS, and a deployed configuration 224D (see FIGS. 3A-3E) where the stabilizer engages the floor surface to brace the base 110 at an additional point of contact with the floor surface FS to stabilize the base 110 when the litter 112 is in the cantilevered position CP (see FIG. 3D) during the process of docking the litter 112 to the base 110.

Figure 4B:
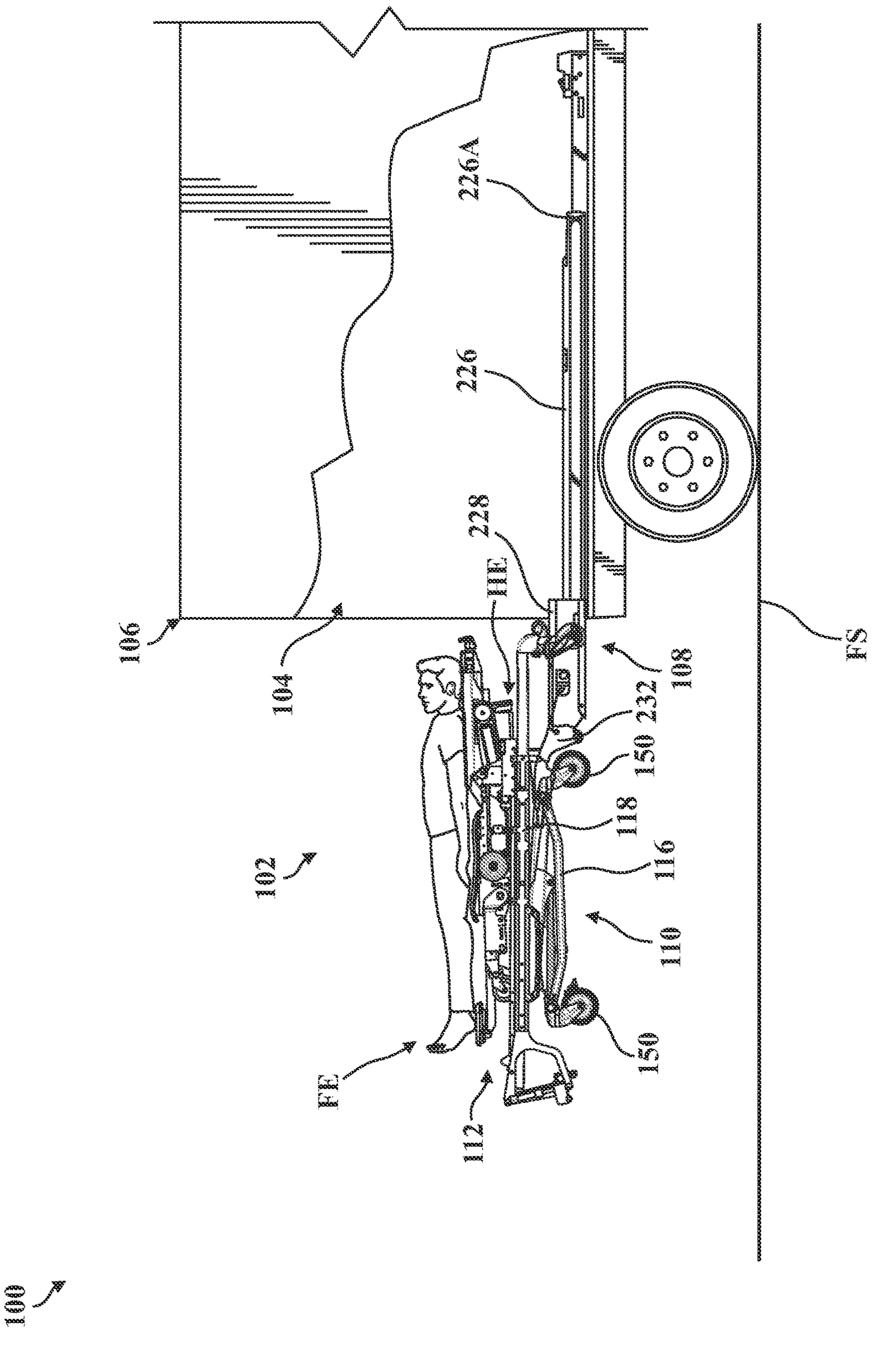
FIG. 4B is another side view of the patient transport apparatus and the ambulance of FIG. 4A, shown with the base arranged in a lowered position secured to the power load device adjacent to the cargo area of the ambulance.
Figure 4C:
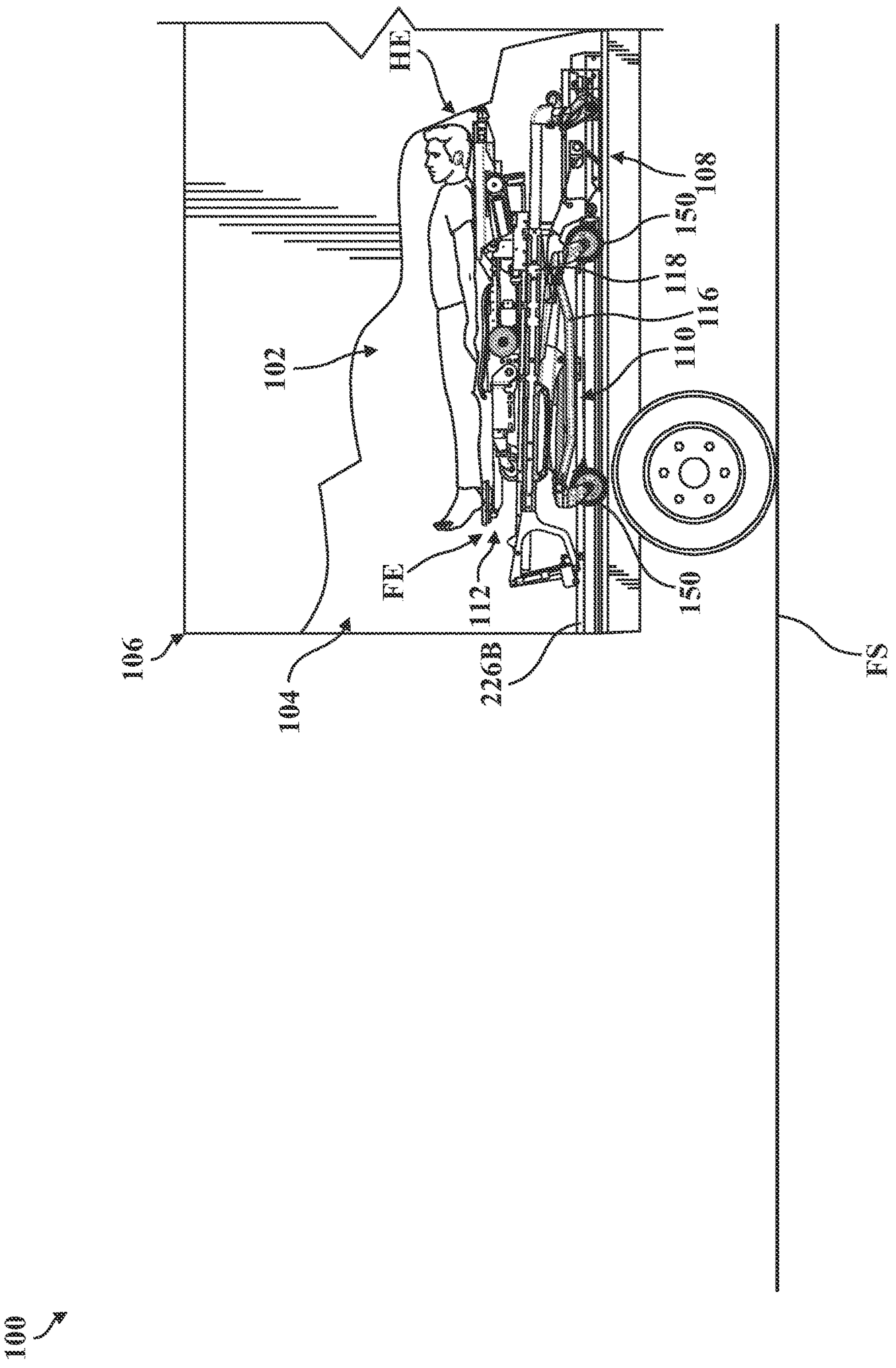
FIG. 4C is another side view of the patient transport apparatus and the ambulance of FIGS. 4A-4B, shown with the power load device retracted together with the patient transport apparatus into the cargo area of the ambulance.

As is shown in FIGS. 4A-4C and depicted schematically in FIG. 2, the power load device 108 is coupled to the ambulance 106 and is configured to load and unload the patient transport apparatus 102 into and out of the ambulance 106 when the power load device 108 is coupled to at least one of the litter 112 and the base 110. In this exemplary version, the power load device 108 of the patient support system 100 is realized as a powered device PD that can be driven by the controller 156 without necessarily forming a part of the patient transport apparatus 102. The power load device 108 generally comprises a rail 226 coupled to the ambulance. The rail 226 comprises a first rail end 226A at the back of the ambulance 106 where patients are loaded (e.g., the cargo area 104), and extends to a second rail end 226B toward the front of the ambulance 106.

The power load device 108 further includes a rail trolley 228 coupled to the rail 226. The rail trolley 228 is movable along a length of the rail 226. The power load device 108 also includes a trolley actuator 230 coupled to the rail 226 and the rail trolley 228 to move the rail trolley 228 along the length of the rail 226, and load arms 232 configured to pivot or otherwise articulate relative to the rail trolley 228 in order to support the patient transport apparatus 102 when at least one of the litter 112 and the base 110 are coupled to the rail trolley 228. The power load device 108 further includes an arm actuator 234 coupled to the rail trolley 228 and the load arms 232 to pivot or otherwise articulate the load arms 232 relative to the rail trolley 228. When the rail trolley 228 is coupled to at least one of the litter 112 and the base 110, the power load device 108 is coupled to or otherwise disposed in communication with the controller 156 to be controlled by the controller 156. The power load device 108 may be powered by a power source supplied by the ambulance 106 and/or by a power source on the patient transport apparatus 102. In some versions, the power load device 108 of the patient support system 100 is configured as described in U.S. Pat. No. 8,439,416, which is hereby incorporated by reference in its entirety.

As noted above, the control system 154 is provided to control operation of the one or more powered devices PD which form a part of or otherwise cooperate with the patient transport apparatus 102. To this end, the controller 156 may employ one or more microprocessors for processing instructions or an algorithm stored in memory to control operation of the one or more powered devices PD. Additionally or alternatively, the controller 156 may comprise one or more microcontrollers, field programmable gate arrays, systems on a chip, discrete circuitry, and/or other suitable hardware, software, and/or firmware that is capable of carrying out the functions described herein. The controller 156 may be carried on-board the patient transport apparatus 102, or may be remotely located. The controller 156 may comprise one or more subcontrollers configured to control the one or more powered devices PD, and/or one or more subcontrollers for each of the one or more powered devices PD. In some cases, one subcontroller may be attached to the litter 112 and another subcontroller may be attached to the base 110. Power to the one or more powered devices PD and/or the controller 156 may be provided by the energy storage device 168. In alternative configurations, the one or more powered devices PD and/or the controller 156 may be provided by an external power source.

The controller 156 is coupled to the one or more powered devices PD in a manner that allows the controller to control the powered devices PD (e.g., via electrical communication). The controller 156 may communicate with the one or more powered devices PD via wired or wireless connections. In some versions, the controller 156 may generate and transmit control signals to the one or more powered devices PD, or components thereof, to drive or otherwise facilitate operating their associated actuators or to cause the one or more powered devices PD to perform one or more of their respective functions.

In addition to controlling operation of the one or more powered devices PD, in some versions, the controller 156 also determines current and desired states of the litter 112 and/or the base 110 based on input signals that the controller 156 receives from user interfaces 158 and/or based on state signals that the controller 156 receives from the sensing system 160. The state of the litter 112 and/or the base 110 may be a position, a relative position with respect to another object or component, an orientation, a configuration, an angle, a speed, a load condition, an energization status, or any other state of the litter 112 and/or the base 110.

The sensing system 160 comprises a state detection device 236 that is coupled to the litter 112 and the controller 156 and monitors the state of the litter 112 directly, or indirectly. The state detection device 236 comprises one or more sensors S configured to monitor the litter 112, the base 110, and/or the one or more powered devices PD. To this end, the state detection device generates a state signal corresponding to the state of the litter 112 and sends the state signal to the controller, such as when the litter 112 is mounted to the base 110.

The state detection device and/or other aspects of the sensing system 160 may be used by the controller for various purposes. The sensing system 160 may comprise one or more sensors S, including force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. The sensing system 160 may further comprise one or more sensors S to detect mechanical, electrical, and/or electromagnetic coupling between components of the patient transport apparatus 102. Other types of sensors S are also contemplated. Some of the sensors S may monitor thresholds movement relative to discrete reference points. The sensors S can be located anywhere on the patient transport apparatus 102, or remote from the patient transport apparatus 102. For example, the sensors S may be located on or in the patient support surface 114, the base frame 116, the intermediate frame 118, or other suitable locations.

In some configurations, the sensing system 160 may act as an input device used to provide input signals to the controller 156 to cause or continue operation of the one or more powered devices PD. Numerous scenarios exist in which the one or more powered devices PD can be operated based on input signals provided by the sensing system 160 and/or the user interface 158.

In one configuration, the sensing system 160 indicates when the function being performed has been completed by the one or more powered devices PD. By way of non-limiting example, adjustment of one or more powered devices PD may be interrupted or stopped because a minimum or maximum position of the one or more powered devices PD has been reached, such as by using a sensor S realized as a mechanical limit switch, a membrane switch, and the like.

In certain versions, the sensing system 160 may include a state input device 238 to enable a user (e.g., a caregiver) to select a state such that actuation of the state input device 238 generates the state signal. In this case, instead of the controller 156 automatically detecting the current state of the litter 112, a user can manually enter the current state (or, in some versions, a desired state) of the litter 112 (e.g., "litter-on-base," "litter-off-base," etc.). In some configurations, the state input device 238 is spaced from at least one of the user interfaces 158. In other configurations, the state input device 238 is connected to at least one of the user interfaces 158.

One or more user interfaces 158 are coupled to the controller 156 and may be actuated by the user (e.g., a caregiver) to transmit corresponding input signals to the controller 156, and the controller 156 controls operation of the one or more powered devices PD based on the input signals and the state signals. Operation of the one or more powered devices PD may continue until the user discontinues actuation of the user interface 158, (e.g., until the corresponding input signal is terminated). Other configurations are contemplated.

The user interface 158 may comprise devices capable of being actuated by the user, and may be configured to be actuated in a variety of different ways, including but not limited to, mechanical actuation (hand, foot, finger, etc.), hands-free actuation (voice, foot, etc.), and the like. The user interface 158 may comprise one or more of a load cell, a push button, a touch screen, a joystick, a twistable control handle, a dial, a knob, a gesture sensing device for monitoring motion of hands, fect, face, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, buttons/pedals may be physical buttons/pedals, or may be virtually-implemented buttons/pedals such as through optical projection or forming part of a graphical user interface presented on a touchscreen. Buttons/pedals may also be mechanically-implemented in some versions, or may drive-by-wire type buttons/pedals where a user-applied force actuates a sensor S such as a switch or potentiometer. User interfaces 158 may be provided in one or more locations on the base 110 and/or the litter 112. Other configurations are contemplated.

In some versions of the patient transport apparatus 102, the user interface 158 may comprises two buttons B1, B2 that may be actuated to generate the input signal used by the controller 156 to drive the one or more powered devices PD. In other versions, the user interface 158 may comprise three or more buttons. In some versions, the user interface 158 may comprise a single button. Other configurations are contemplated.

As will be appreciated from the subsequent description below, individual buttons B. B (or "input controls") of the user interface 158 may be used to control functions of or associated with more than one powered device PD. The user interfaces 158 generate input signals corresponding to each individual button B1, B2 of the user interface, when actuated. In order to operate different powered devices PD, the input signal received by the controller 156 may not change when the same button B1, B2 is actuated; rather, the state signals generated by the state detection device 236 may change according to the current state of the litter 112 and/or the base 110 such that the controller 156 determines which of the powered devices PD to actuate base 110*d* on the current state detected using the input signal from the same button B1, B2. Put differently, the same button B1, B2 can be used to control different powered devices PD depending on the state determined by the controller 156 via the sensing system 160, the state detection device 236, and/or the state input device 238. By way of non-limiting example, the user may actuate a button B1 on the user interface to operate the base lift device 120 when the litter 112 is in a first state, and the same button B1 may be actuated to operate the track driving device 164 when the litter 112 is in a second state. Other configurations are contemplated.

In one version, the sensing system 160 comprises a load detection device 240 coupled to the base 110. The load detection device 240 is configured to detect when the intermediate frame 118 is subjected to a load, such as load created by the litter 112 or load created by the litter 112 and the patient. More specifically, the load detection device 240 detects when a load has exceeded a load threshold. When the intermediate frame 118 is subject to a load below the load threshold, the base lift actuator 204 raises and lowers the intermediate frame 118 relative to the base frame 116 in response to actuation of the user interface 158 at a first rate. When the intermediate frame 118 is subjected to a load at or above the load threshold, the base lift actuator 204 raises and lowers the intermediate frame 118 relative to the base frame 116 in response to actuation of the user interface 158, at a second rate slower than the first rate. In the illustrated version, the base lift actuator 204 comprises a linear actuator. Here, the state detection device 236 comprises a sensor S to detect the litter 112 being coupled to and supported by the base 110. In this case, the current state of the litter 112 is considered to be a "litter-on-base" state. In response to detection via the sensor S, the state detection device 236 generates a corresponding state signal that is received by the controller 156; here in the "litter-on-base" state, when a user actuates the first button B1 of one of the user interfaces 158, the controller 156 is configured to operate the base lift actuator 204 to raise the litter 112 and the intermediate frame 118 relative to the floor surface and the base frame 116. Conversely, in the "litter-on-base" state, when the user actuates the second button B2 of the user interface 158, the controller 156 is configured to operate the base lift actuator 204 to lower the litter 112 and the intermediate frame 118 relative to the floor surface and the base frame 116. It will be appreciated that the forgoing represents examples of operation of the state detection device 236 and the state input device 238, and that other configurations are contemplated.

Figure 3A:
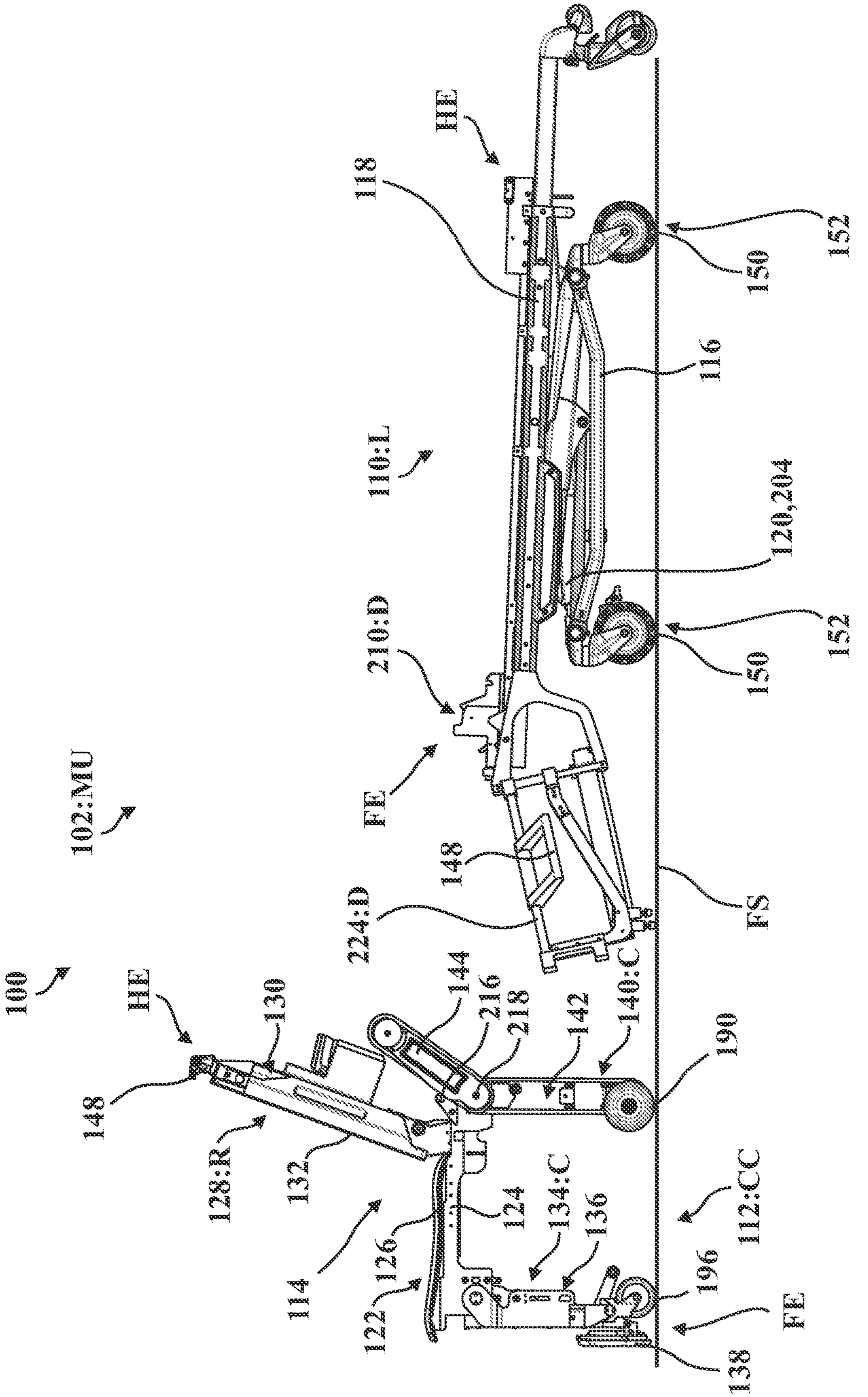
FIG. 3A is a side view of the patient transport apparatus of FIGS. 1A-2, shown with the base arranged in a lowered configuration and having a trolley disposed in a trolley docking position adjacent to the stabilizers shown in the deployed configuration, and with the litter arranged in the stair configuration adjacent to the stabilizers of the base.

As noted above, the litter 112 is operable in the docked mode MD (see FIG. 1B) and in the undocked mode MU (see FIG. 1A). Referring now to FIG. 3A, when in the undocked mode MU the litter 112 may be disposed adjacent to the base 110, with the litter 112 placed in the chair configuration CC. Here, the chair configuration CC is defined by the fowler assembly 128 being in the fowler raised position 128R, the front assembly 134 being in the front assembly chair position 134C, and with the rear assembly 140 being in the rear assembly chair position 140C. More specifically, here in the chair configuration CC, the fowler raised position 128R places the fowler section 132 relative to the seat section 126 to support the patient in a seated configuration (not shown in detail). Here too, in the chair configuration CC, the front section 138 is arranged to abut the patient's legs, fect, and the like, and the front frame 136 is arranged substantially parallel to the rear frame 142 in a generally vertical configuration with the front wheels 196 and the rear wheels 190 engaging the floor surface FS. Here too in FIG. 3A, the base 110 is shown in the maximum lowered configuration 110L with the stabilizer 224 disposed in the deployed configuration 224D to brace the base 110, and with the litter 112 disposed at the foot end FE of the base 110. In this arrangement, the litter 112 is disposed adjacent to the base 110 and is positioned such as to begin the process of docking.

Figure 3B:
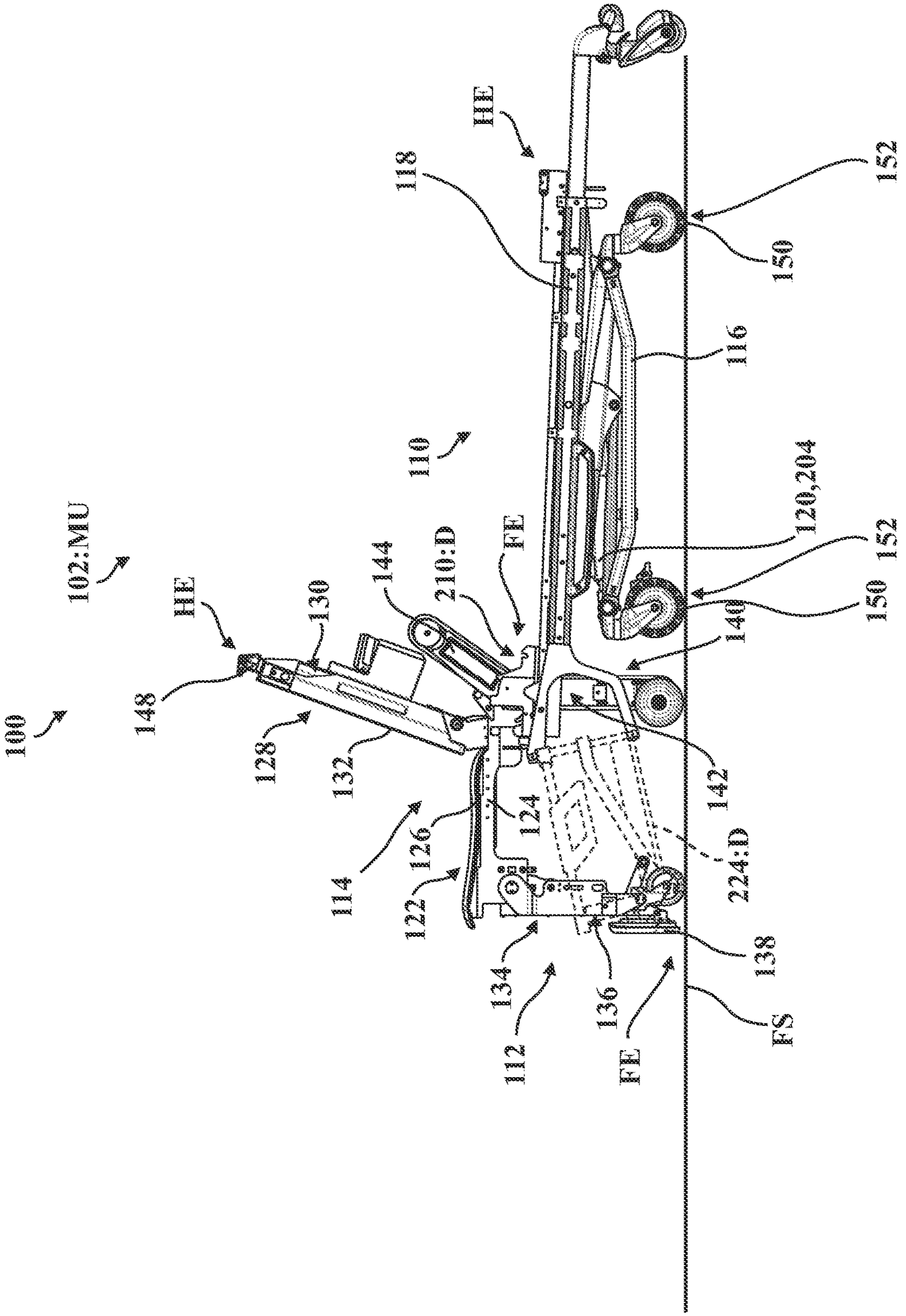
FIG. 3B is another side view of the patient transport apparatus of FIGS. 1A-3A, shown with the litter positioned for engagement with the trolley of the base adjacent to the stabilizers.

Continuing from FIG. 3A to FIG. 3B, the litter 112 is shown having been positioned longitudinally closer to the base 110, bringing the upper and lower pins 216, 218 into proximity of the trolley 210. Here, the sensing system 160 determines the relative positioning of the litter 112, and the controller 156 can be used to begin the process of docking by first actuating the rear actuator 182 to move the rear assembly 140 from the rear assembly chair position 140C towards the rear assembly dock position 140D in order to lower the upper and lower pins 216, 218 into engagement with the upper and lower pin stops 212, 214 of the trolley 210.

Figure 3C:
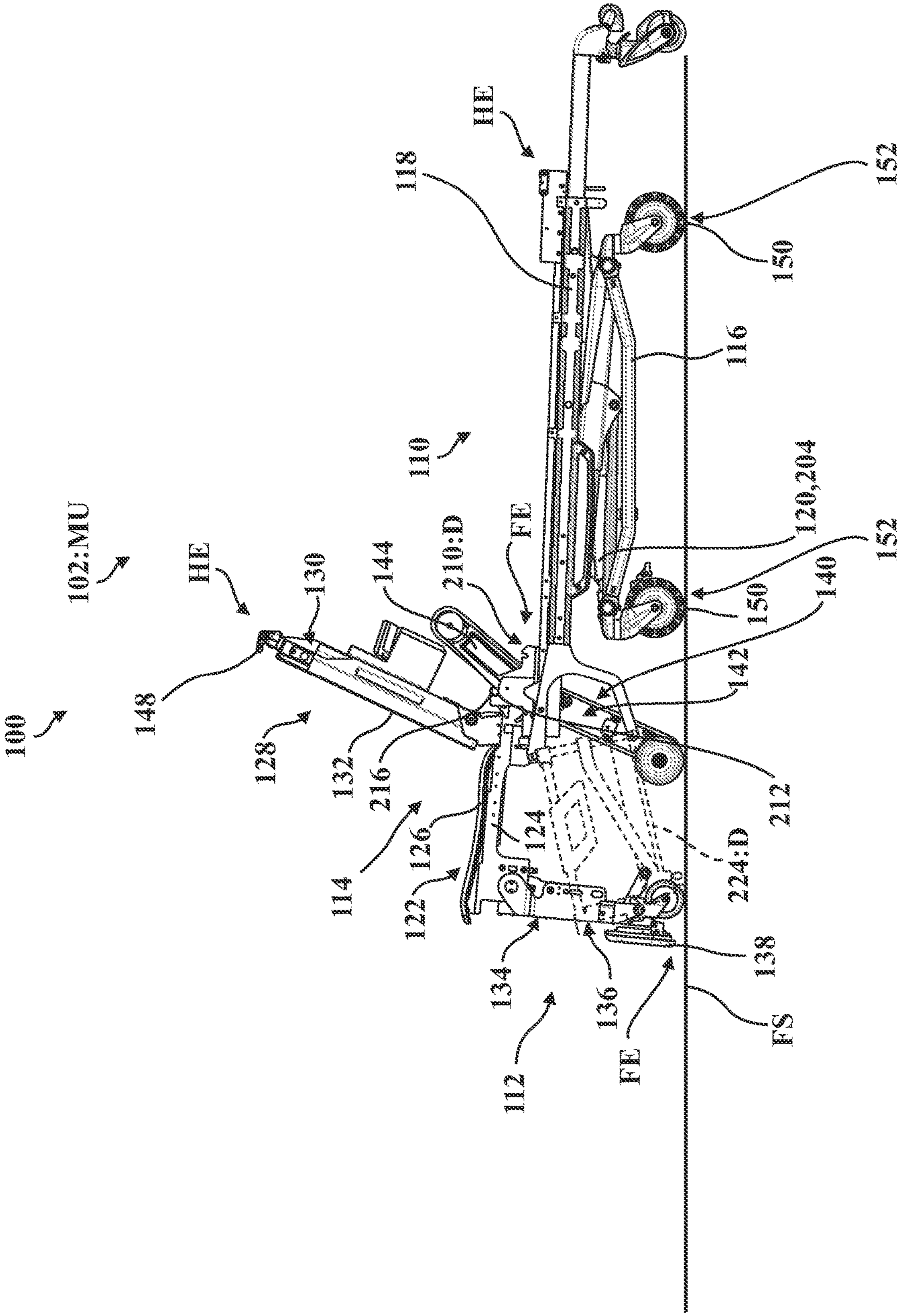
FIG. 3C is another side view of the patient transport apparatus of FIGS. 1A-3B, shown with a rear assembly of the litter pivoting the litter relative to the trolley to transfer weight between the litter and the base.

It will be appreciated that the arrangement of the rear assembly 140 as shown in FIG. 3C is such that the pivoting of the rear assembly 140 about the rear axis XR has moved the rear wheel 190 closer towards the front assembly 134 and has resulted in the seat assembly 122 having "tilted" backwards, which facilitates the process of transferring weight to the base 110. Here too, it will be appreciated that the rear assembly 140 is arranged for movement from the rear assembly chair position 140C (see also FIG. 7C) towards the rear assembly dock position 140D, as well as from the rear assembly chair position 140C towards the rear assembly stair position 140S (see also FIG. 7D) when pivoting about the rear axis XR to move the rear wheel 190 closer towards the front assembly 134. However, the rear assembly 140 is also arranged for movement from the rear assembly chair position 140C (see also FIG. 7C) towards the rear assembly loft position 140L (see FIG. 7A) when pivoting about the rear axis XR to move the rear wheel 190 further away from the front assembly 134.

Figure 3D:
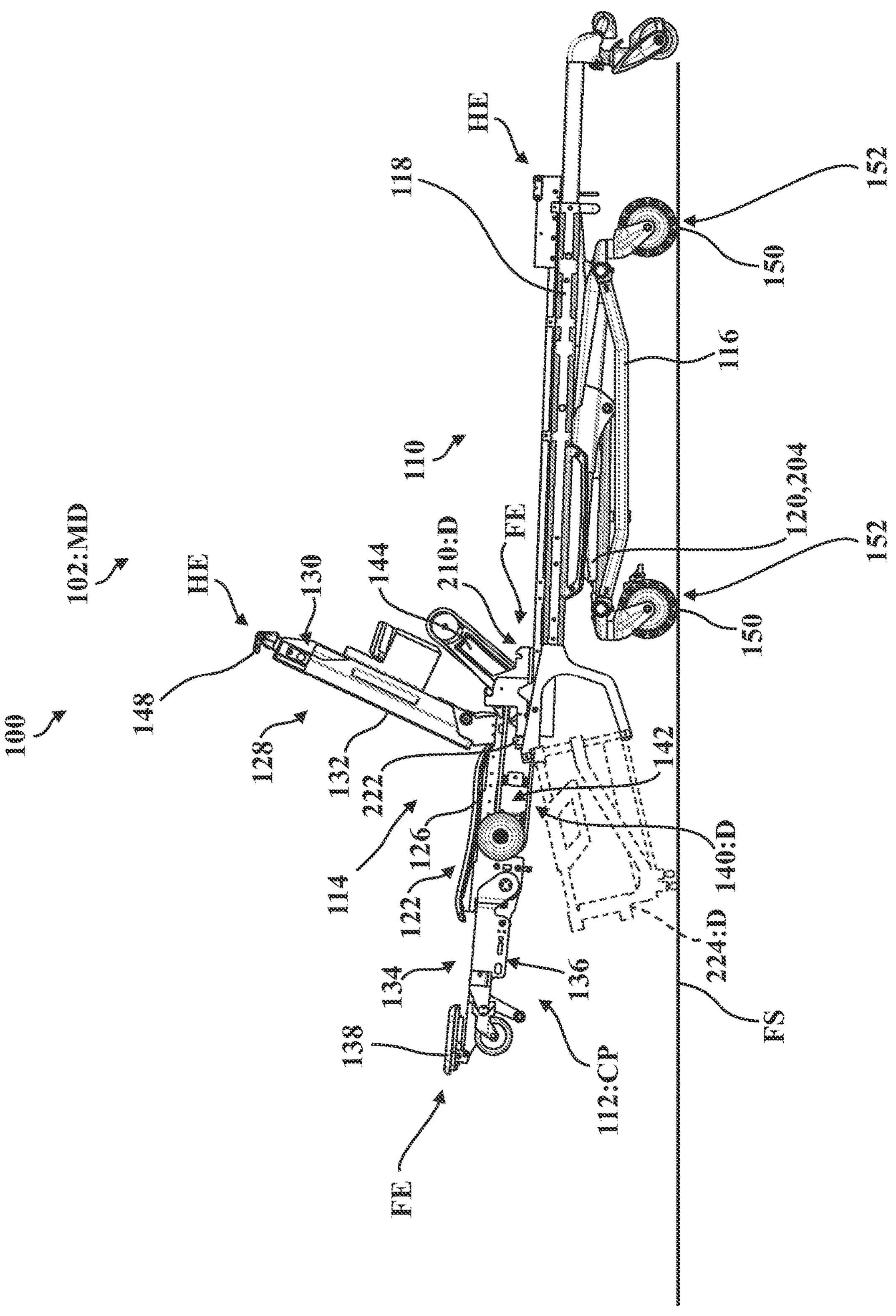
FIG. 3D is another side view of the patient transport apparatus of FIGS. 1A-3C, shown with the litter operating in a cantilevered position where a front assembly and the rear assembly of the litter are pivoted off of the floor surface to transfer weight from the litter onto the base, the base shown braced via the stabilizers.

With continued reference to FIG. 3C, once the controller 156 has determined that the lower the upper and lower pins 216, 218 have come into engagement with the upper and lower pin stops 212, 214 of the trolley 210, the controller 156 drives the rear actuator 182 to pivot the rear assembly 140 about the rear axis XR until it reaches the a rear assembly dock position 140D and, at the same time, drives the front actuator 180 to pivot the front assembly 134 about the front axis XF from the front assembly chair position 134C to the front assembly loft position 134L as shown in FIG. 3D. Here, it will be appreciated that the rear actuator 182 and the front actuator 180 may be driven simultaneously by the controller 156.

Figure 3E:
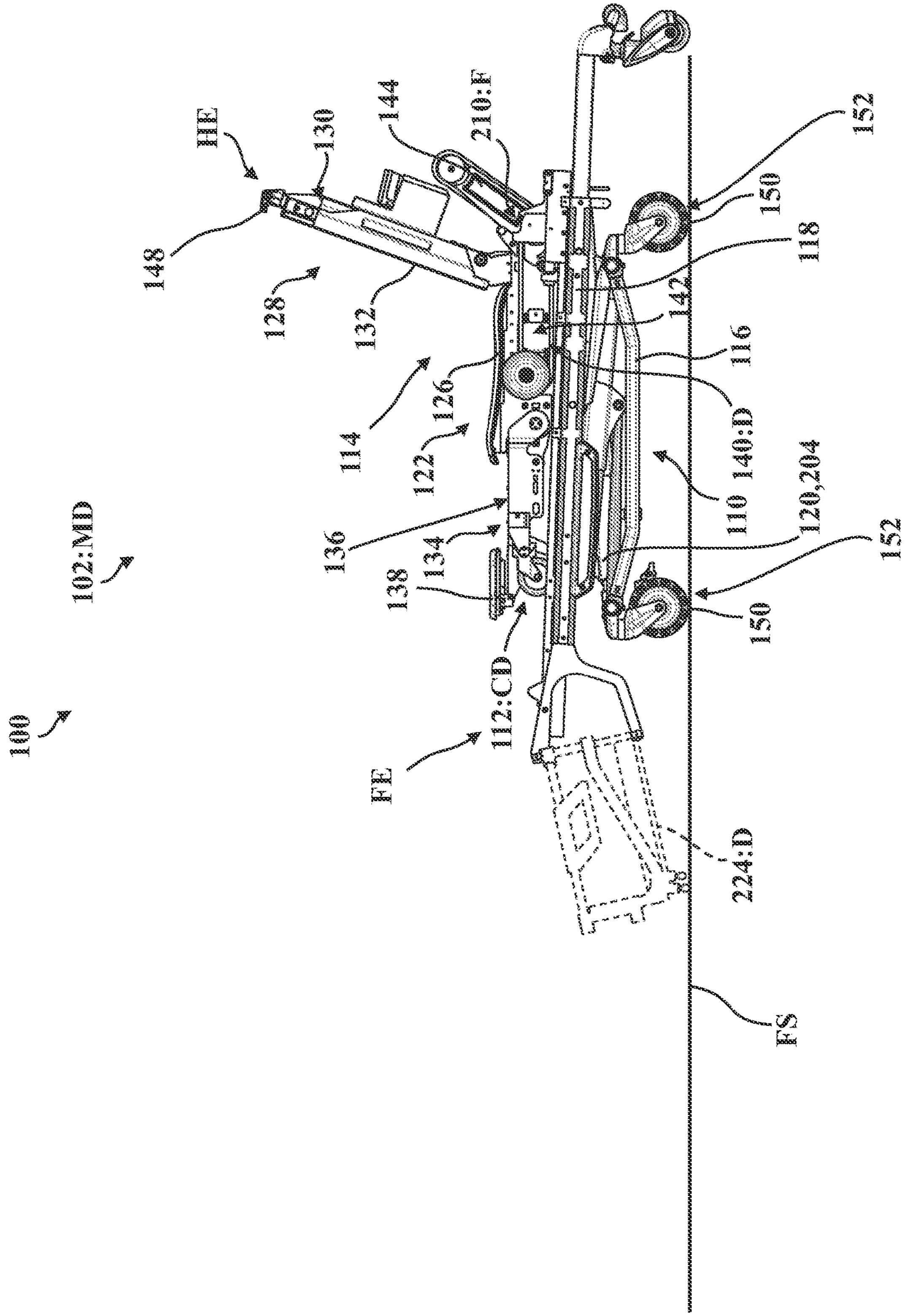
FIG. 3E is another side view of the patient transport apparatus of FIGS. 1A-3D, shown with the litter having moved with the trolley to a trolley forward position to place the patient transport apparatus in the docked mode MD.
Figure 3F:
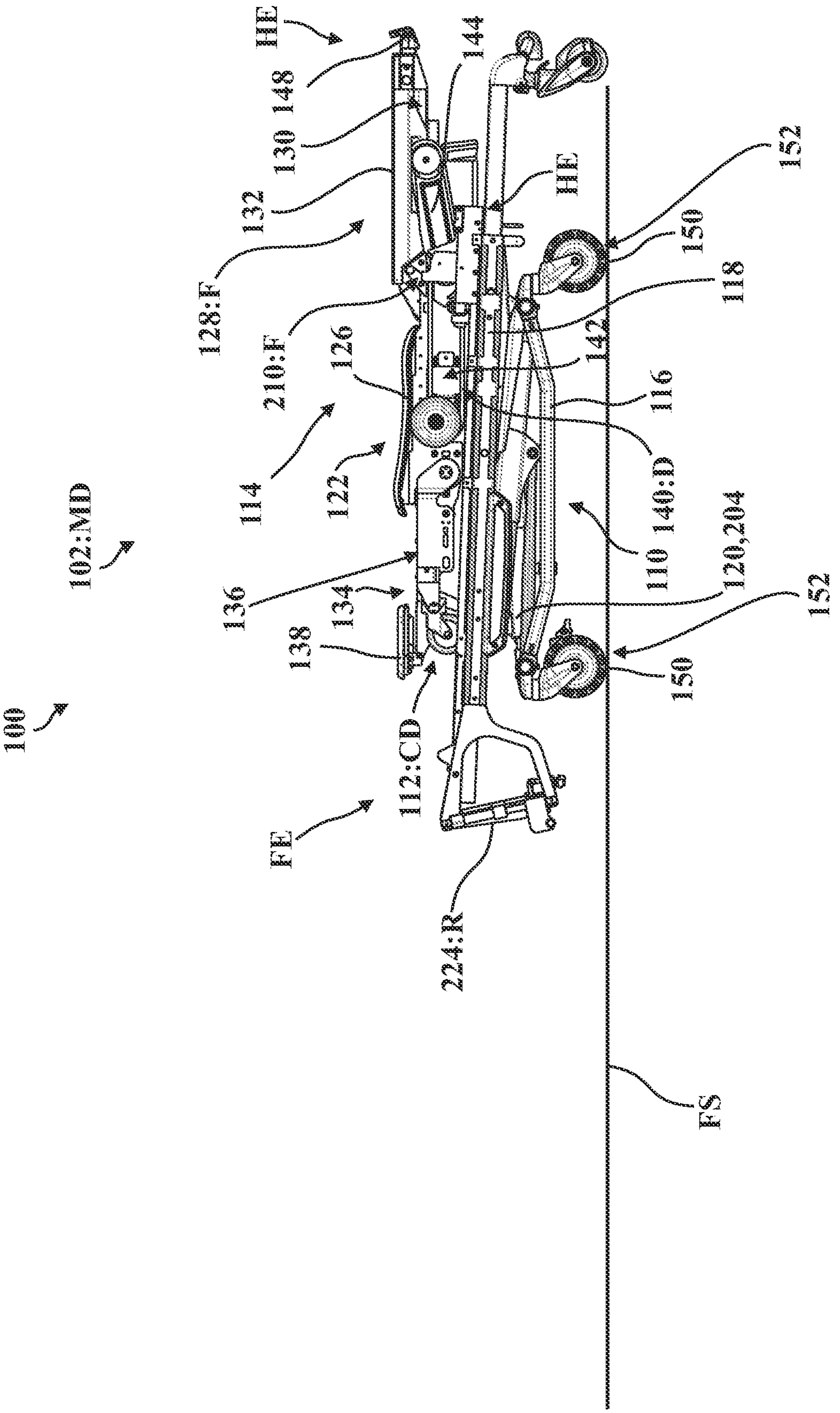
FIG. 3F is another side view of the patient transport apparatus of FIGS. 1A-3E, shown operating in the docked mode, with the stabilizers moved to the retracted configuration, and with a fowler assembly of the litter 112 shown arranged in a fowler lowered position.
Figure 3G:
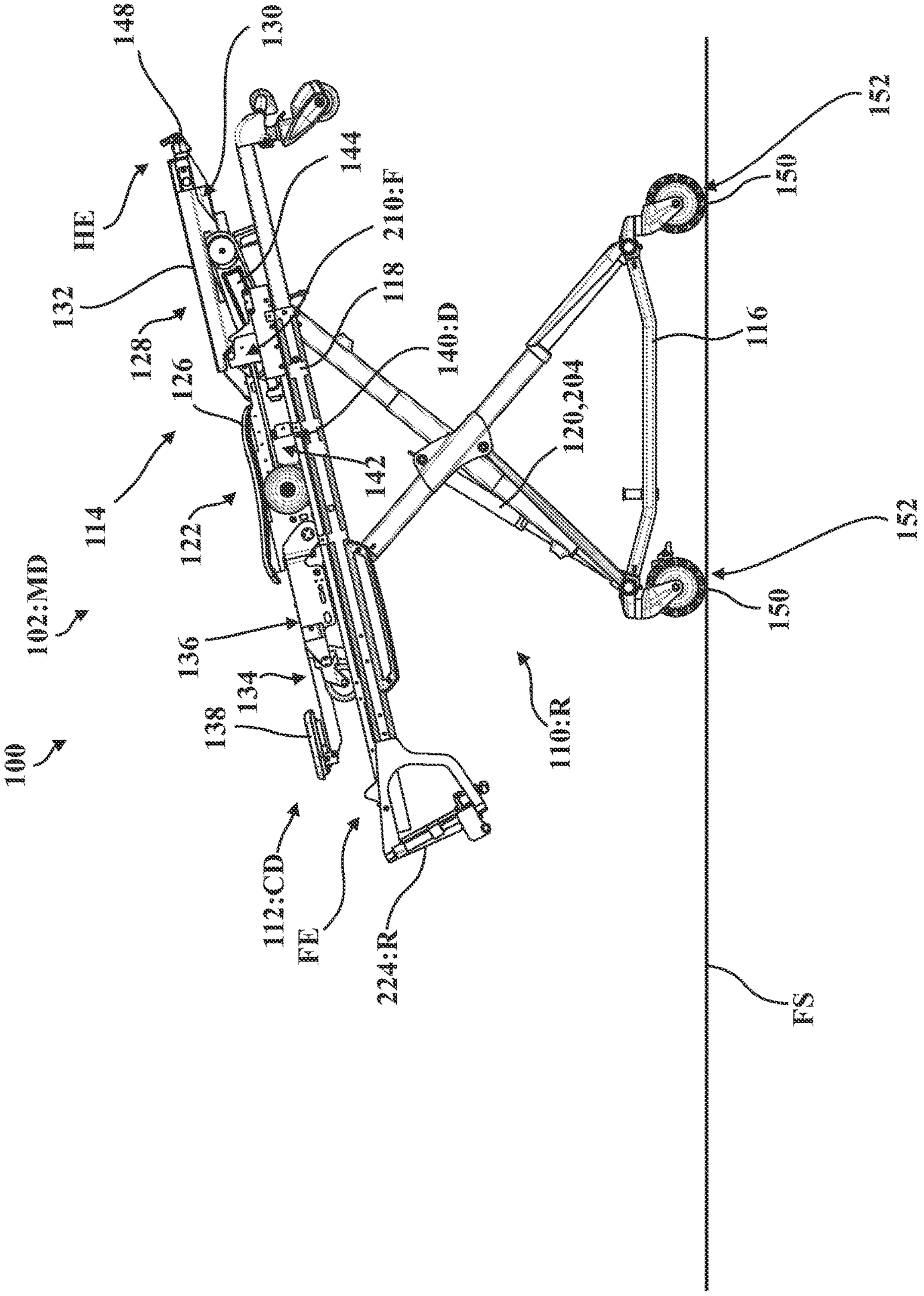
FIG. 3G is another side view of the patient transport apparatus of FIGS. 1A-3F, shown operating in the docked mode, with the base arranged in a raised configuration.

In FIG. 3D, the litter 112 is shown disposed in the cantilevered position CP with the trolley 210 disposed in the trolley docking position 210D arranged at the foot end FE of the base 110. Here, the front assembly 134 and the rear assembly 140 are arranged generally parallel to each other and to the seat assembly 122. From this cantilevered position CP depicted in FIG. 3D, the dock trolley lock mechanism 222 can be disengaged by the user, and the trolley 210 can be moved to the trolley forward position 210F arranged at the head end HE of the base 110, as shown in FIG. 3E. Here, in FIG. 3E, the dock trolley lock mechanism 222 retains the trolley 210 in the trolley forward position 210F which places the patient transport apparatus 102 in the docked mode MD. At this point, the stabilizer can be moved to the retracted configuration 224R out of contact with the floor surface FS, and other portions of the patient transport apparatus 102 may be moved if needed, such as to move the fowler assembly 128 to the fowler lowered position 128L as shown in FIG. 3F and/or to raise the intermediate frame 118 to position the base 110 in the maximum raised configuration 110R as shown in FIG. 3G.

FIG. 4A shows the patient transport apparatus 102 in the docked mode MD and positioned adjacent to the cargo area 104 of the ambulance 106 for loading via the power load device 108. Here, the base 110 is arranged with the intermediate frame 118 raised relative to the base frame 116 near or slightly below the maximum raised configuration 110R in order to facilitate loading the patient transport apparatus 102 into the ambulance 106. Continuing to FIG. 4B from FIG. 4A, the patient transport apparatus 102 has been loaded onto the power load device 108 at the first rail end 226A of the rail 226. Here too in FIG. 4B, the base lift device 120 of the base 110 has been utilized to position the base 110 in the maximum lowered configuration 110L, which results in the base wheels 150 coming out of contact with the floor surface FS after weight from he patient transport apparatus 102 has been transferred to the power load device 108 via the load arms 232. At this point, the rail trolley 228 may be moved towards the second rail end 226B of the rail 226 as shown in FIG. 4C in order to load the patient transport apparatus 102 fully into the cargo area 104 of the ambulance 106.

Referring now to FIGS. 5-8, when operating in the undocked mode MU, the litter 112 can be placed in a number of different configurations to support the patient for movement independent of the base 110. In FIG. 7A, for example, the litter 112 is arranged in the loft configuration CL with the rear assembly 140, the front assembly 134, and the fowler assembly 128 each arranged generally parallel to the seat assembly 122 to support the patient in a flat configuration (e.g., laying down). Here in the loft configuration CL, the rear assembly 140 is in the rear assembly loft position 140L, the front assembly 134 is in the front assembly loft position 134L, the fowler assembly 128 is in the fowler lowered position 128L, and the ski assembly is in the lowered ski position 144L. From this position, the litter 112 can be moved into the chair configuration CC depicted in FIG. 7C by moving the front assembly 134 to the front assembly chair position 134C while also moving the rear assembly 140 to the rear assembly chair position 140C and the fowler assembly 128 to the fowler raised position 128R. Here, it will be appreciated that FIG. 7B depicts intermediate positions of the front assembly 134, the rear assembly 140, and the fowler assembly 128.

Figure 5:
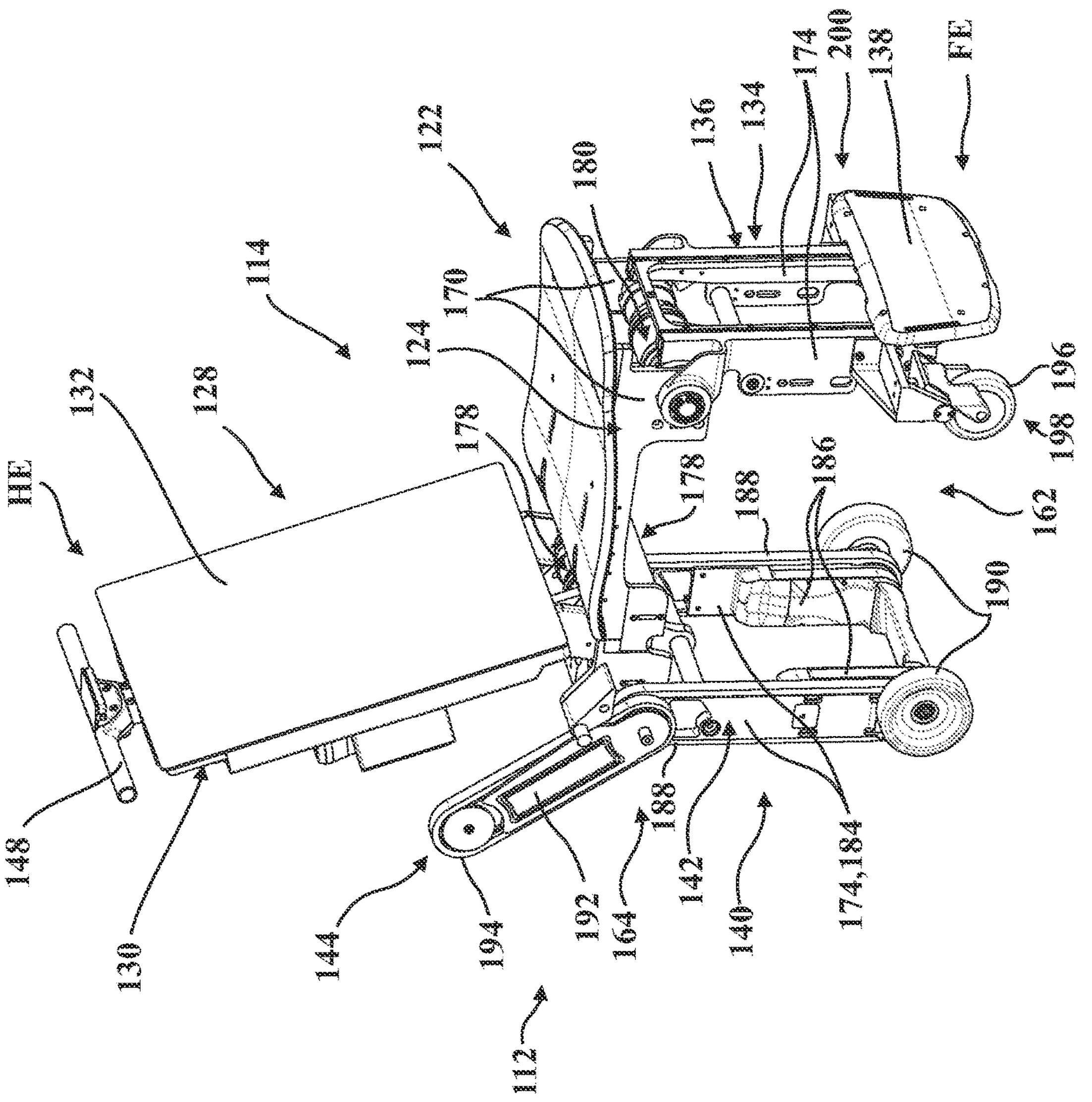
FIG. 5 is a front perspective view of the litter of the patient transport apparatus of FIGS. 1A-4C.
Figure 6:
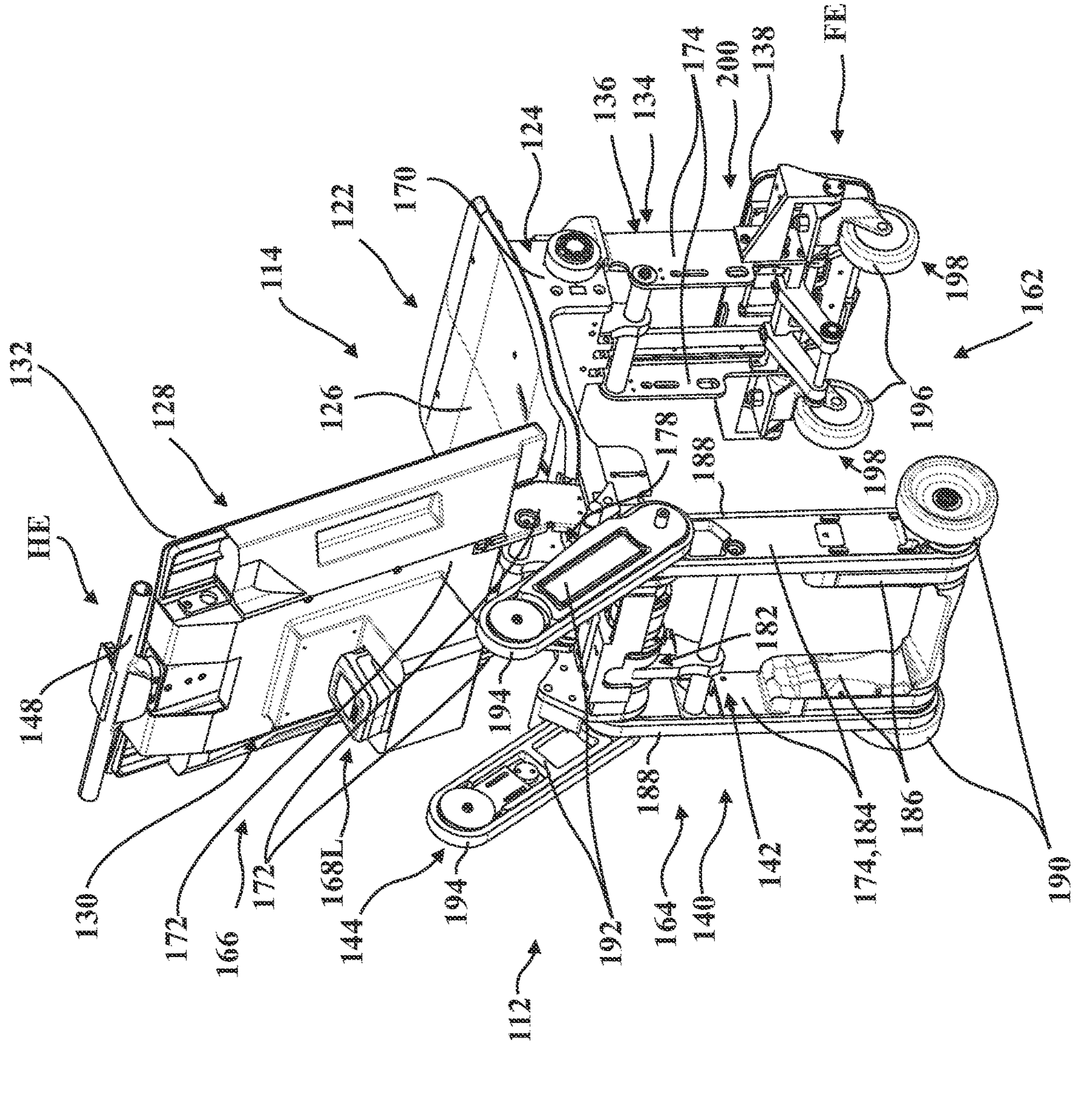
FIG. 6 is a rear perspective view of the litter of the patient transport apparatus of FIGS. 1A-5.

In the chair configuration CC depicted in FIGS. 5-6 and 7C, the rear assembly 140 and the front assembly 134 are each arranged parallel to each other and generally perpendicular to the seat assembly 122. From the chair configuration CC, the rear assembly 140 and the front assembly 134 can be moved simultaneously to bring the litter 112 into the stair configuration CS as depicted in FIG. 7D by placing the rear assembly 140 in the rear assembly stair position 140S and by placing the front assembly 134 in the front assembly stair position 134S. Here too in the stair configuration CS depicted in FIG. 7D, the front assembly 134 and the rear assembly 140 are arranged substantially parallel to each other, but are now arranged an oblique angle relative to the seat assembly 122 in order to, among other things, position the leg tracks 188 for engagement with stairs ST as shown in FIG. 8. In certain embodiments, the ski track frame members 192 and the rear frame 142 are arranged substantially parallel to each other in the rear assembly stair position 140S. Here in the stair configuration CS, the track driving device 164 can be used to move the litter 112 along stairs ST via engagement with the leg tracks 188 (as well as the ski tracks 194). It will be appreciated that the litter 112 can be moved between the configurations CL, CC. CS in various ways to facilitate patient care, and can be docked to and/or undocked from the base 110 as noted above.

When operating in the loft configuration CL as shown in FIG. 7A, the rear assembly 140, the front assembly 134, and the fowler assembly 128 are each arranged generally parallel to the seat assembly 122 to support the patient in a flat configuration (e.g., laying down in a supine position). When the litter 112 is disposed in the cantilevered position CP and/or the dock configuration CD as shown in FIGS. 3D-3F, the rear assembly 140 and the front assembly 134 are each similarly arranged generally parallel to the seat assembly 122, except that the rear assembly 140 is rotated approximately 180 degrees about the rear axis XR to be substantially underneath the seat assembly 122. One the litter 112 is in the docked configuration CD as shown in FIG. 3E, the fowler assembly 128 can be adjusted, such as to be substantially parallel to the seat assembly 122 as shown in FIG. 3F.

Referring now to FIGS. 9-15B, in the illustrated version, the ski assembly 144 is coupled to the rear assembly 140 via the lower pin 218, hereafter referred to as the carrier pin 218. Here in this version, the litter 112 includes a brace 242 operatively attached to the seat frame 124, such as with one or more fasteners (not shown). The ski assembly 144 is operatively attached to the seat assembly 122 and is pivotable relative to the rear assembly 140 between a plurality of ski positions including the raised ski position 144R arranged for engaging stairs ST, and the lowered ski position 144L. As is described in greater detail below, the ski assembly 144 includes a stop face 244 arranged to abut the brace 242 in the raised ski position 144R to maintain the ski assembly 144 in the raised ski position 144R during engagement with stairs ST (see FIG. 8). A biasing element 246 is operatively attached to the ski assembly 144 to urge the ski assembly 144 towards the raised ski position 144R. Here too in this embodiment, the fowler assembly 128 includes a guide 248 arranged to abut at least a portion of the ski assembly 144 in the fowler lowered position 128L (see FIG. 7A; see also FIG. 15B) and so as to be disposed in spaced relation from the ski assembly 144 in the fowler raised position 128R (see FIG. 7C; see also FIGS. 8 and 15A). Here, movement of the fowler assembly 128 from the fowler raised position 128R (see FIG. 7C) towards the fowler lowered position 128L (see FIG. 7A) moves the ski assembly 144 from the raised ski position 144R (see FIG. 7C; see also FIGS. 14A and 15A) to the lowered ski position 144L (see FIG. 7A; see also FIGS. 14B and 15B) as the guide 248 comes into abutment with at least a portion of the ski assembly 144. As will be appreciated from the subsequent description below, with this configuration, the fowler assembly 128 moves the ski assembly 144 as the litter 112 moves into the loft configuration CL (or as the fowler assembly 128 is moved into the fowler lowered position 128L while operating in the dock configuration CD), the biasing element 246 ensures that the ski assembly 144 returns to the raised ski position 144R for engagement with stairs ST, and the brace 242 and the stop face 244 cooperate to ensure that the ski assembly 144 is maintained in the raised ski position 144R during engagement with stairs ST (e.g., so as to prevent the ski assembly 144 from moving "beyond" the raised ski position 144R).

Referring now to FIGS. 10-13, the ski assembly 144 employs a ski tensioner 250 operatively attached to the ski track frame member 192 to tension the ski track 194 between a hub 252 and a pulley 254. Here, the hub 252 is rotatably supported about the carrier pin 218 and is driven via rotational communication with the track actuator 186 effected by the leg track 188. In the illustrated version, the carrier pin 218 has a D-shaped shank 256 which is shaped for keyed engagement with a corresponding D-shaped aperture 258 formed in the seat frame member 170 of the seat frame 124. A fastener 260, such as a nut, is disposed in threaded engagement (not shown in detail) with the carrier pin 218 to secure the rear assembly 140 and the ski assembly 144 for pivoting movement about the rear axis XR. One or more bearings 262 and/or bushings 264 may be supported along the D-shaped shank 256 of the carrier pin 218 to facilitate pivoting movement of the rear assembly 140 and/or the ski assembly 144.

Figure 11:
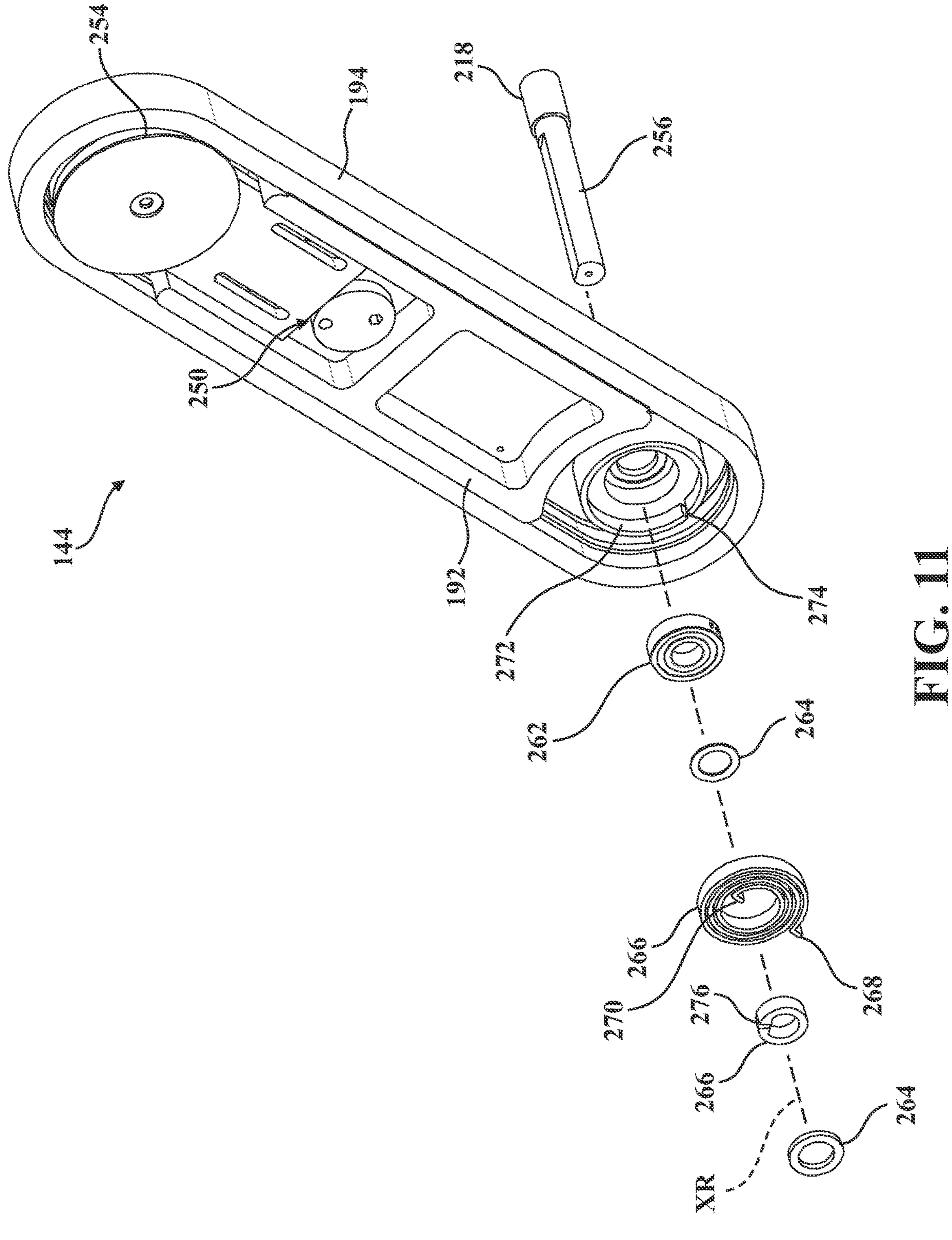
FIG. 11 is a partially-exploded perspective view of portions of the litter of FIG. 10.
Figure 12:
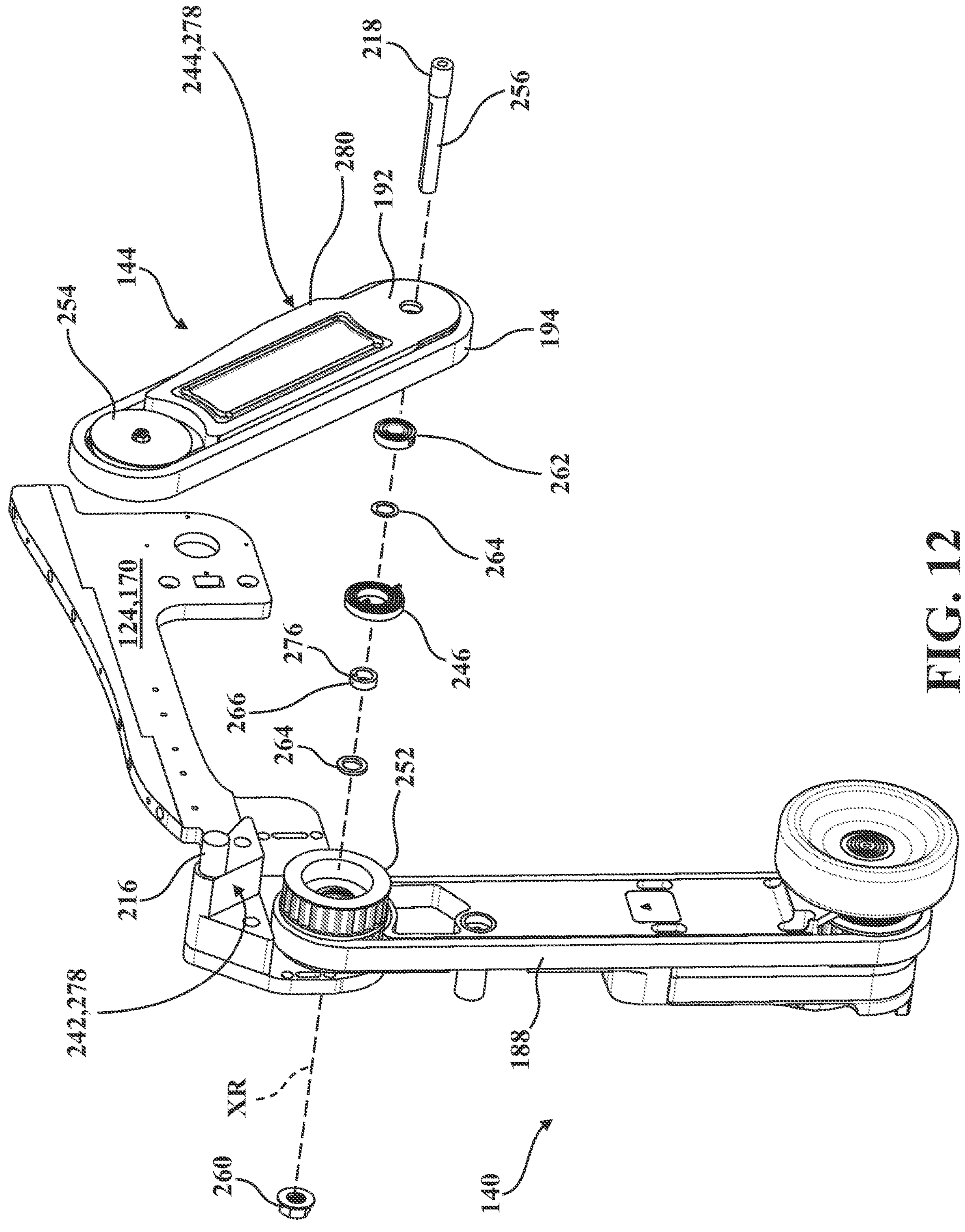
FIG. 12 is another partially-exploded perspective view of the portions of the litter of FIG. 9.
Figure 13:
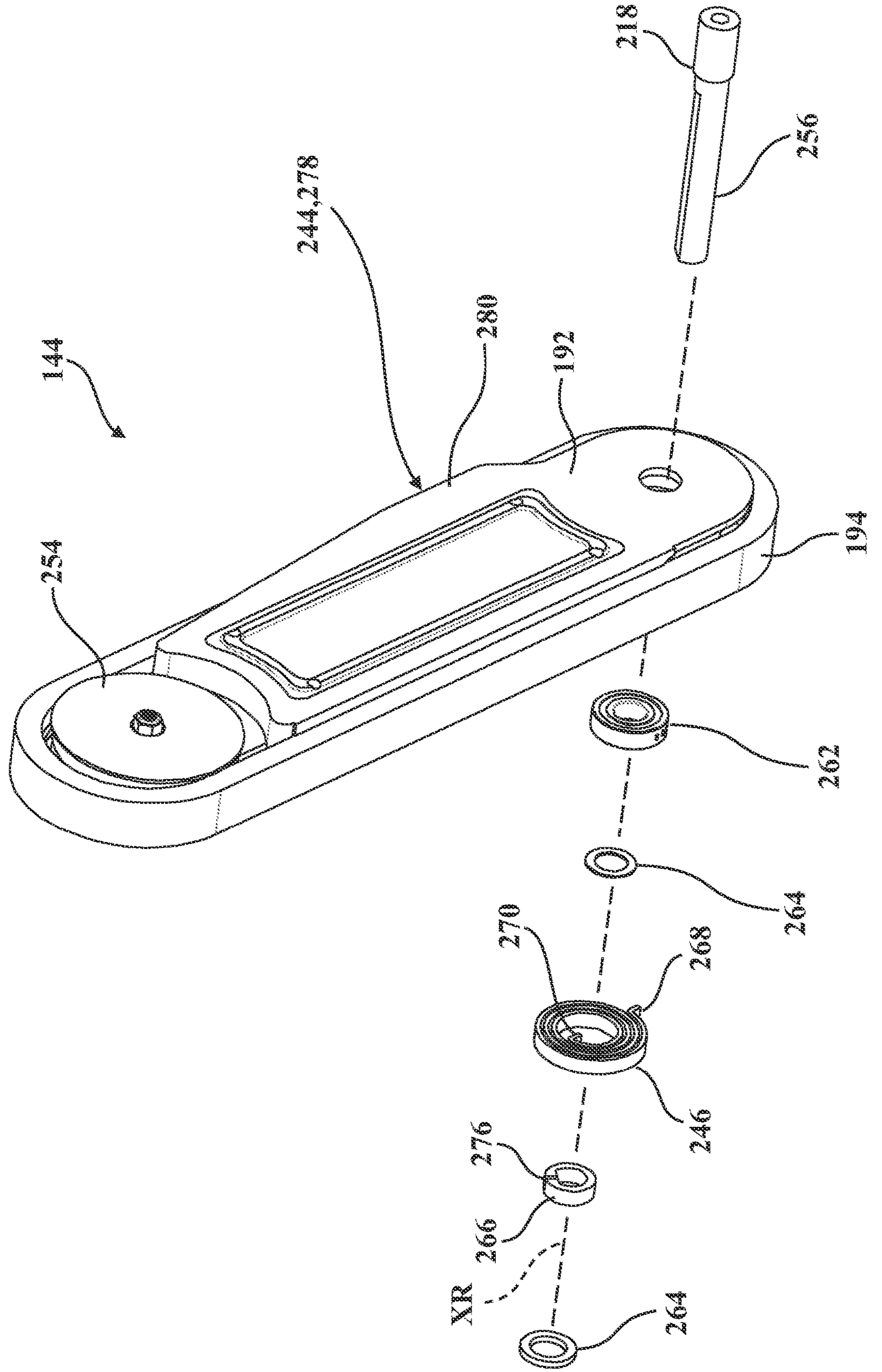
FIG. 13 is a partially-exploded perspective view of portions of the litter of FIG. 12.
Figure 14A:
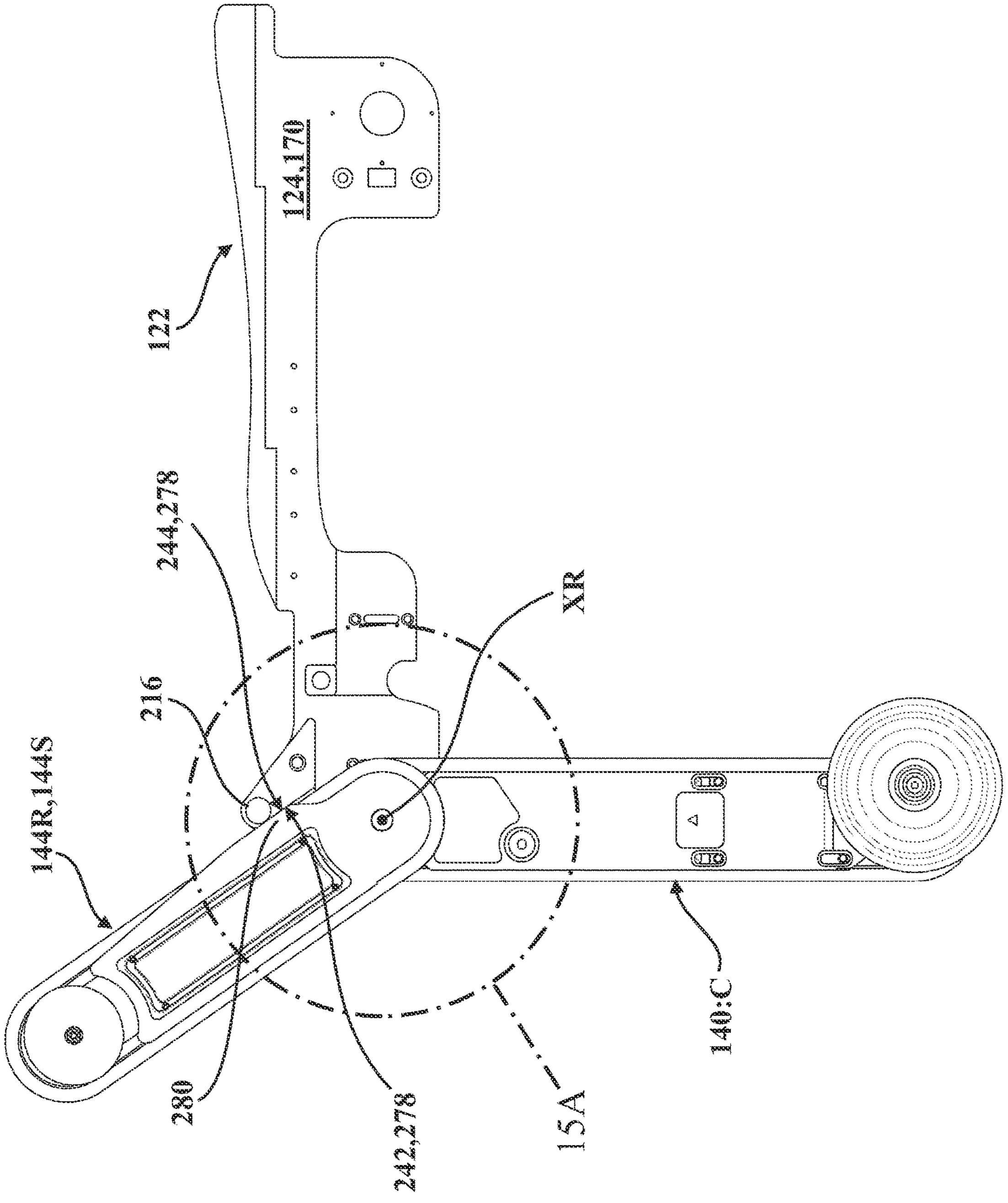
FIG. 14A is a side view of portions of the litter of FIGS. 10-13, shown with the ski arranged in a raised ski position and with the rear assembly arranged in a rear assembly chair position.
Figure 14B:
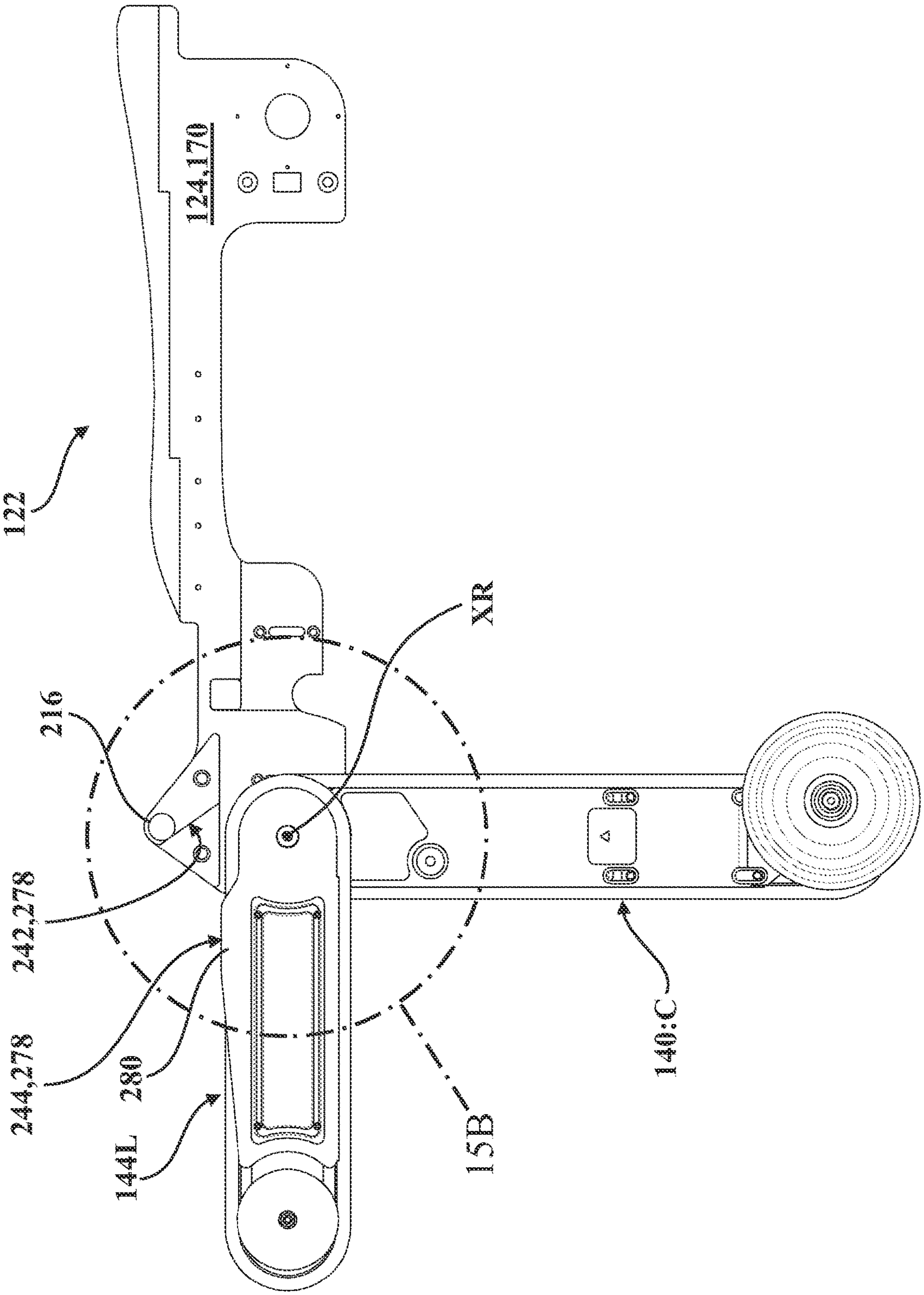
FIG. 14B is another side view of the portions of the litter of FIG. 14A, shown with the ski arranged in a lowered ski position and with the rear assembly arranged in the rear assembly chair position.
Figure 15A:
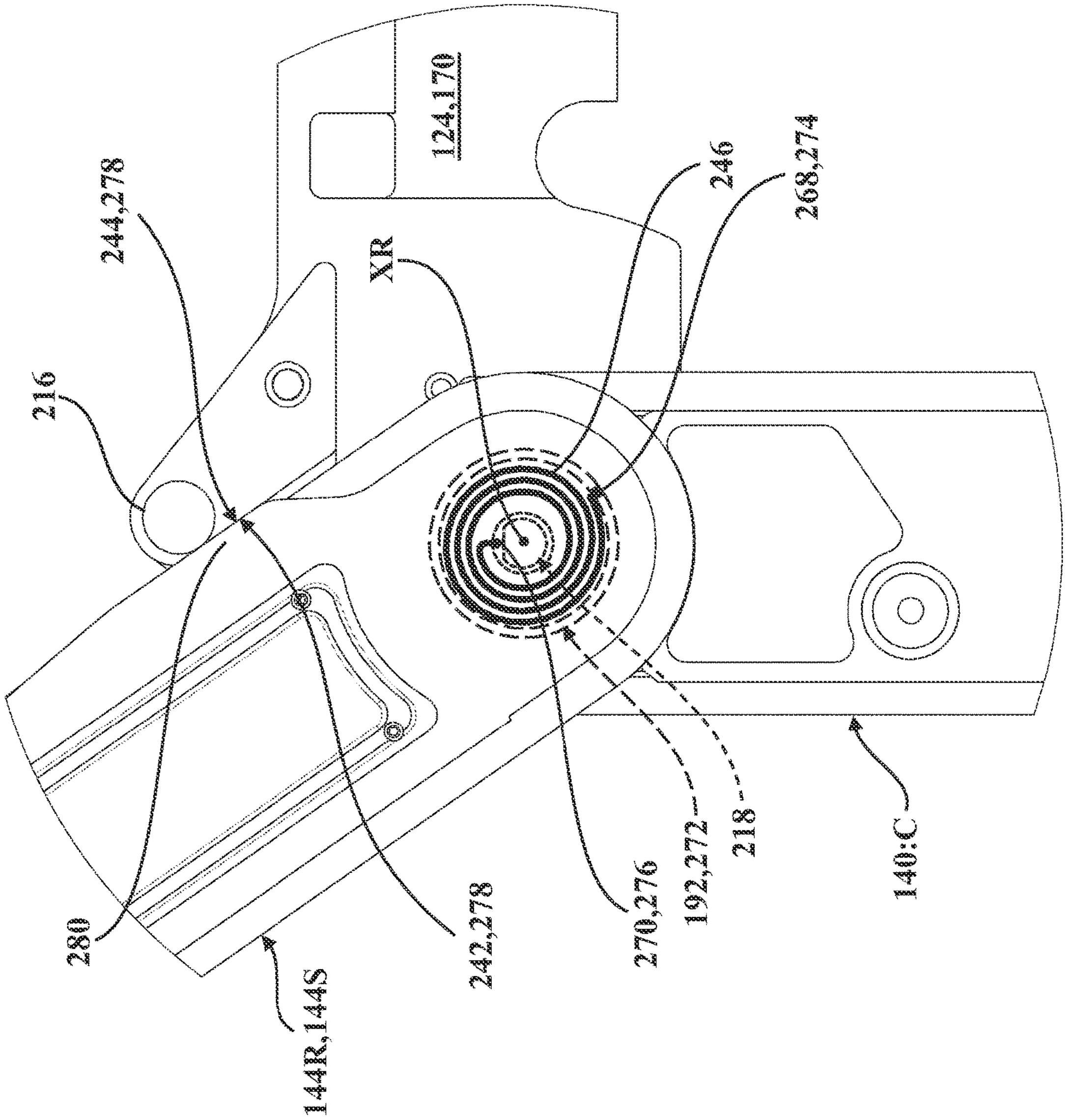
FIG. 15A is an enlarged partial side view taken along indicia 15A in FIG. 14A, shown with portions of the ski assembly and the rear assembly depicted schematically for illustrative purposes.
Figure 15B:
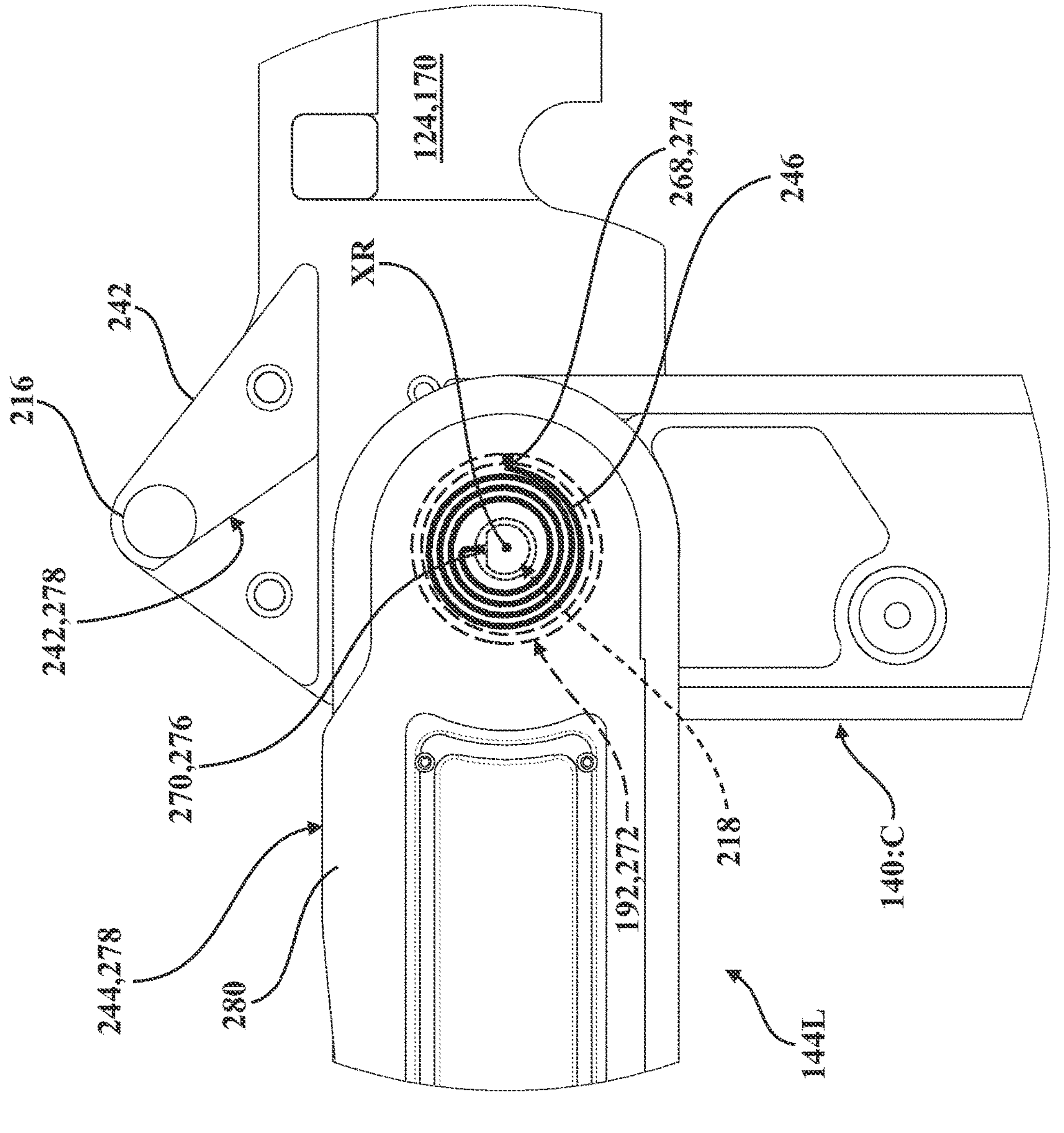
FIG. 15B is an enlarged partial side view taken along indicia 15B in FIG. 14B, shown with portions of the ski assembly and the rear assembly depicted schematically for illustrative purposes.
Figure 16:
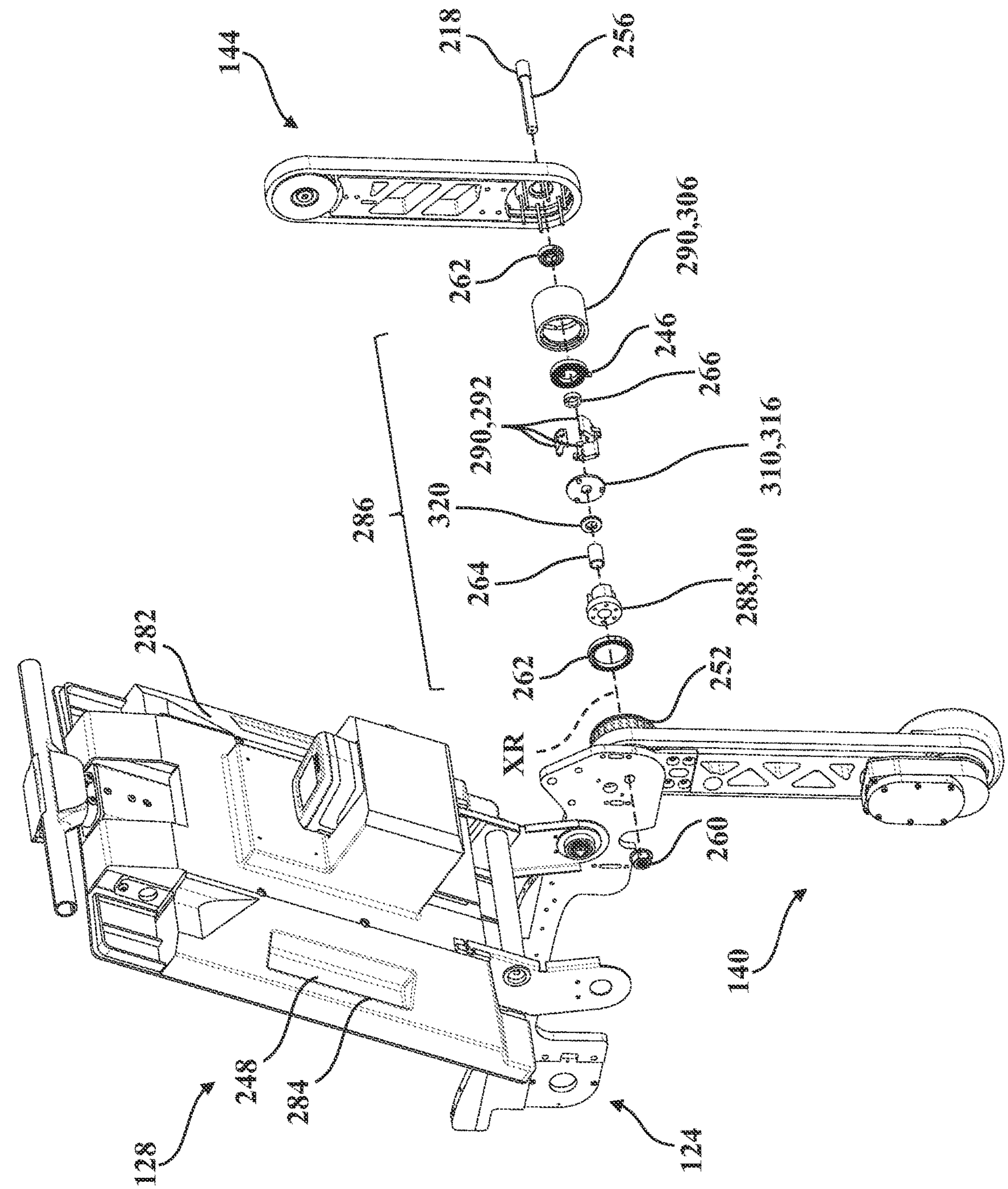
FIG. 16 is a partially-exploded perspective view of portions of another version of the litter of the patient transport apparatus according to the present disclosure, shown with portions of a ski assembly and portions of a rear assembly spaced from a seat frame member of a seat assembly supporting a fowler assembly, and with a carrier to selectively lock the ski assembly to the rear assembly according to versions of the present disclosure.

In the illustrated version, an indexing spacer 266 is disposed in keyed engagement with the D-shaped shank 256 of the carrier pin 218 to facilitate coupling the biasing element 246 between the seat assembly 122 and the ski assembly 144. Here, the biasing element 246 includes a first tang 268 operatively attached to the ski assembly 144, and a second tang 270 operatively attached to the indexing spacer 266. As is best shown in FIG. 11, the ski track frame member 192 includes a generally annular wall 272 shaped to receive the biasing element 246 into which a notch defining a first tang catch 274 is formed. As is depicted schematically in FIGS. 15A-15B, the first tang catch 274 supports the first tang 268 of the biasing element 246, and the indexing spacer 266 defines a second tang catch 276 supporting the second tang 270 of the biasing element 246. In the illustrated versions, the biasing element 246 is realized as a torsional spring interposed along the rear axis XR between the rear assembly 140 and the ski assembly 144. However, it will be appreciated that other configurations are contemplated. As the ski assembly 144 rotates, the second tang 270 is held in place relative to the rear axis XR by the second tang catch 276, and the first tang 268 moves about the rear axis XR together with the first tang catch 274 to tension the biasing element 246.

Referring now to FIGS. 14A-15B, as noted above, the litter 112 employs the brace 242 operatively attached to the seat assembly 122 to facilitate engagement with the stop face 244 of the ski assembly 144 in the raised ski position 144R. Here, the brace 242 also defines the upper pin 216, and may be operatively attached to (or formed integrally with) the seat assembly 122. The brace 242 defines a brace contact face 278 which abuts the stop face 244 of the ski assembly 144 in the raised ski position 144R, and is disposed in spaced relation from the stop face 244 of the ski assembly 144 in the lowered ski position 144L. As is best shown in FIG. 14B, the ski track frame member 192 defines the stop face 244 in the illustrated version. Here, the ski track frame member 192 includes a frame extension region 280 defining the stop face 244. When viewed normal to the rear axis XR, at least a portion of the frame extension region 280 obscures the ski track 194 adjacent to the stop face 244 such that the fowler assembly 128 and the seat assembly 122 remain in spaced relation from the ski track 194 when the stop face 244 abuts the brace contact face 278.

Put differently, the ski track 194 is not disposed in abutment with any portion of the fowler assembly 128 or the seat assembly 122 when the litter 112 operates in the chair configuration CC. However, as noted above, when operating in the loft configuration CL or when the fowler assembly 128 is otherwise arranged in the fowler lowered position 128L, the guide 248 does abut at least a portion of the ski assembly 144. Here, as best shown in FIG. 6, the fowler assembly 128 includes a fowler cover 282 operatively attached to the fowler frame 130. The fowler cover 282 defines or otherwise has a pocket 284 which at least partially defines the guide 248. Here, the pocket 284 of the fowler cover 282 is arranged to receive at least a portion of the ski assembly 144 (see FIG. 7A). It will be appreciated that the guide 248 could be configured in other ways, such as with a roller, bearing, and the like arranged to engage against the ski track 194 (not shown). Other configurations are contemplated.

Referring now to FIGS. 16-22, another version of the litter 112 is shown. In this version, the rear assembly 140 and the ski assembly 144 are substantially similar to the versions described above in connection with FIGS. 1-15B. Here too in this version, the rear assembly 140 is coupled to the seat assembly 122 and is pivotable between a plurality of rear assembly positions including a first rear assembly position 140A (e.g., the rear assembly chair position 140C), a second rear assembly position 140B (e.g., the rear assembly dock position 140D), and a plurality of intermediate rear assembly positions 140I between the first rear assembly position 140A and the second rear assembly position 140B, the plurality of intermediate rear assembly positions 140I including the rear assembly stair position 140S for engaging stairs ST. Similarly, the ski assembly 144 is operatively attached to the seat assembly 122 and is pivotable relative to the rear assembly 140 between a plurality of ski positions. However, in this embodiment, the litter 112 includes a carrier 286 coupled between the rear assembly 140 and the ski assembly 144. The carrier 286 includes or otherwise cooperates with the carrier pin 218 coupled to the seat frame 124, as well as the biasing element 246 described above. The carrier 286 is operable between an unlocked state 286U where relative movement between the ski assembly 144 and the rear assembly 140 is permitted, and a locked state 286L where the carrier inhibits relative movement between the ski assembly 144 and the rear assembly 140. As is described in greater detail below, movement of the rear assembly 140 from the first rear assembly position 140A (e.g., from the rear assembly chair position 140C) towards the second rear assembly position 140B (e.g., towards the rear assembly dock position 140D) changes operation of the carrier 286 from the unlocked state to the locked state 286L such that continued movement of the rear assembly 140 into the rear assembly stair position 140R arranged the rear assembly 140 and the ski assembly 144 for engagement with stairs ST.

Put differently, the carrier 286 is configured to rotationally lock the ski assembly 144 relative to the rear assembly 140, while also allowing the ski assembly 144 to be rotated relative to the rear assembly 140 in certain configurations. For example, as the rear assembly 140 rotates between the rear assembly chair position 140C and the rear assembly stair position 140S, the carrier 286 may rotationally lock the ski assembly 144 to the rear assembly 140 such that the ski assembly 144 remains substantially parallel to the rear assembly 140 through the rotation about the rear axis XR. Other configurations are contemplated.

Referring now to FIGS. 16-19, in the illustrated version the carrier 286 generally includes a first carrier component 288 operatively attached to one of the rear assembly 140 and the ski assembly 144, and a second carrier component 290 operatively attached to the other of the rear assembly 140 and the ski assembly 144. In the illustrated version, the first carrier component 288 is operatively attached to the rear assembly 140, and the second carrier component 290 is operatively attached to the ski assembly 144. However, it will be appreciated that this configuration could be interposed in other versions. The first carrier component 288 is rotatably supported about the rear axis XR by the carrier pin 218 which, in turn, is coupled to the seat frame 124 as noted above. The second carrier component 290 is similarly supported rotatably about the rear axis XR by the carrier pin, and includes a follower 292 arranged to movably engage a retention face 294 of the first carrier component 288. Here, as is described in greater detail below in connection with FIGS. 21A-21I, the retention face 294 of the first carrier component 288 is arranged such that movement of the rear assembly 140 from the first rear assembly position 140A (e.g., the rear assembly chair position 140C) towards the second rear assembly position 140B (e.g., the rear assembly dock position 140D) moves the retention face 294 into abutment with at least a portion of the follower 292 of the second carrier component 290 to place the carrier 286 in the locked state 286L (see FIG. 21B). Here, the follower 292 defines a locking face 296 arranged to engage the retention face 294 of the first carrier component 288 when the carrier 286 is in the locked state 286L.

Figure 17:
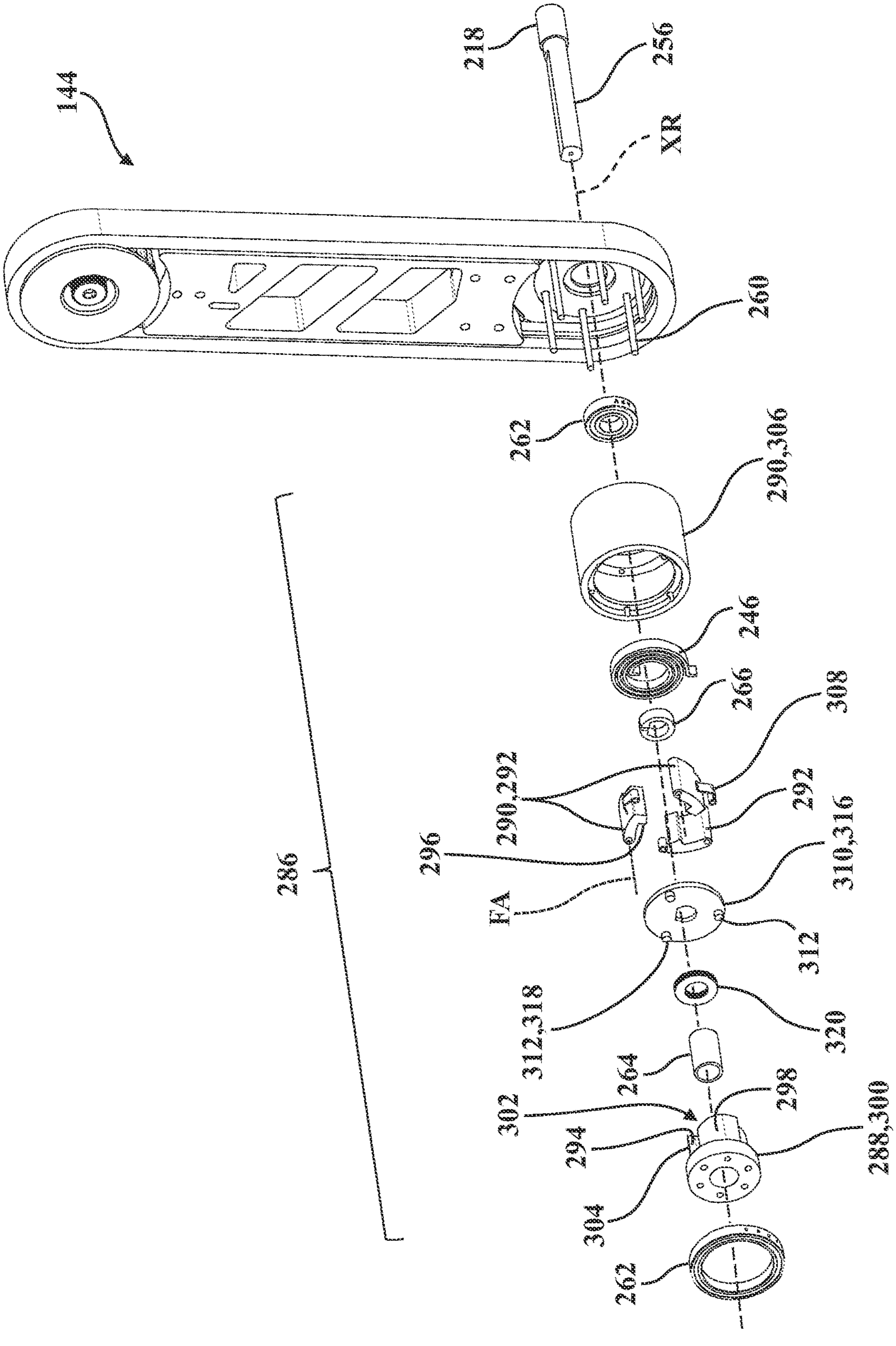
FIG. 17 is another partially-exploded perspective view of the portions of the litter of FIG. 16.
Figure 18:
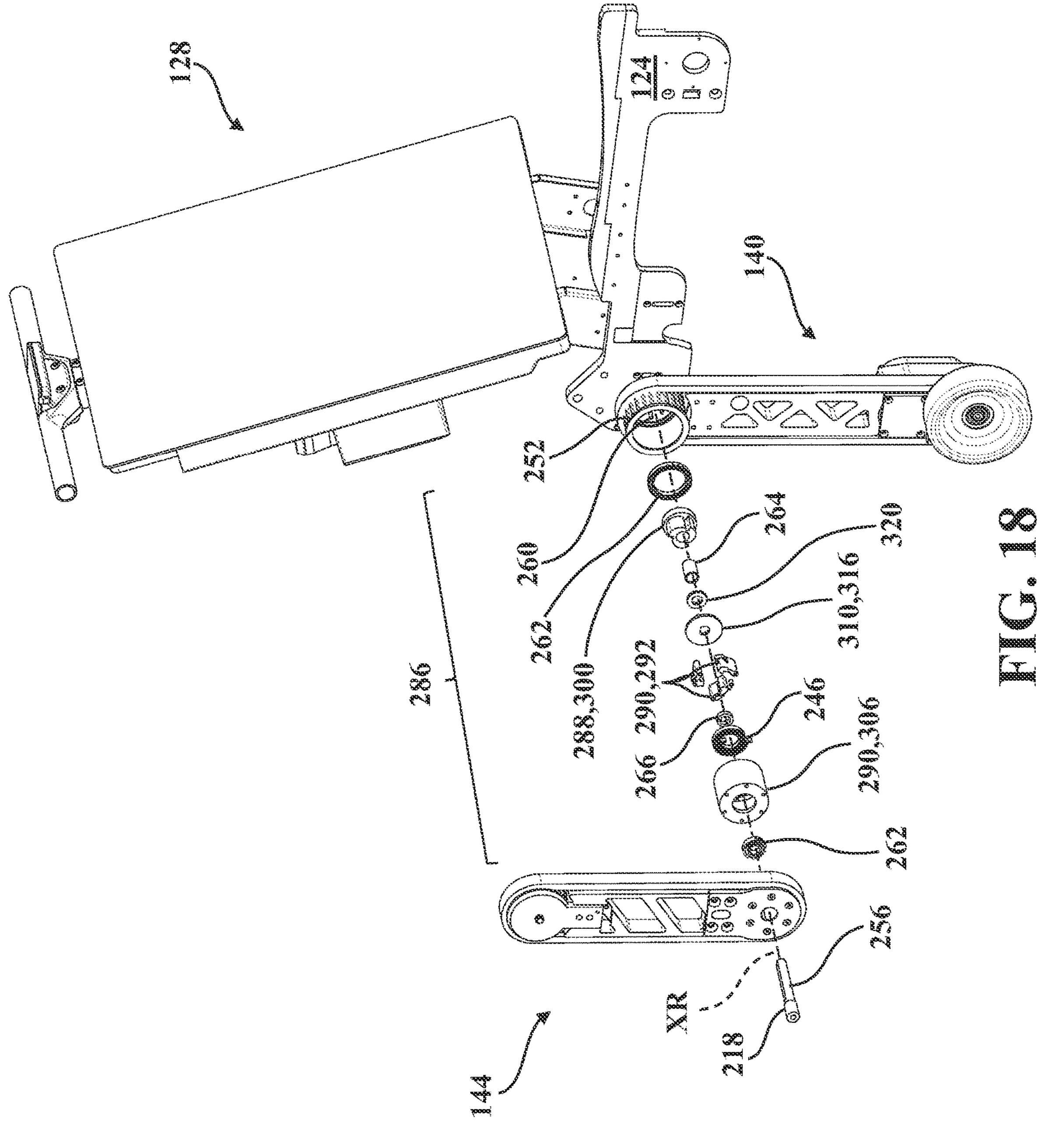
FIG. 18 is another partially-exploded perspective view of portions of the litter of FIG. 16.
Figure 19:
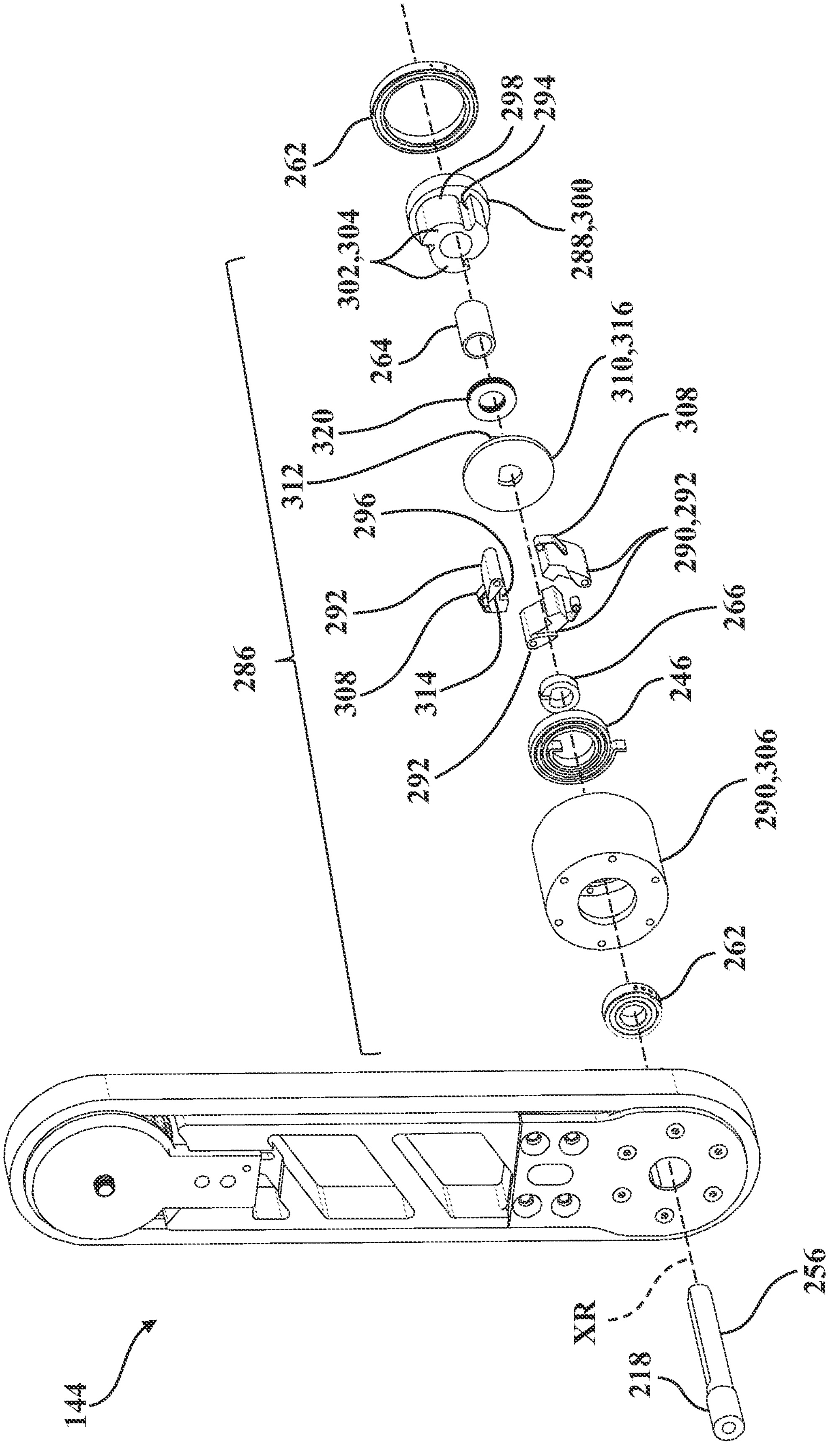
FIG. 19 is another partially-exploded perspective view of the portions of the litter of FIG. 18.

In the illustrated version, the first carrier component 288 further defines a guide face 298, and the follower 292 of the second carrier component 290 is arranged to at least partially engage the guide face 298 when the carrier 286 operates in the unlocked state 286U (see FIGS. 21D-21I). As is best shown in FIGS. 17 and 19, the first carrier component 288 includes a cam body 300 which is coupled to the rear assembly 140 via fasteners 260 such as bolts (not shown in detail). A bushing 264 is supported between the cam body 300 and the carrier pin 218. The cam body 300 includes a cam 302 defining the retention face 294 and the guide face 298, where the retention face 294 is arranged facing towards at least a portion of the guide face 298. In the illustrated version, the cam 302 includes a plurality of lobe regions 304 each defining a respective retention face 294 and a respective guide face 298. More specifically, the illustrated cam 302 includes a total of three lobe regions 304 and, thus, has three retention faces 294 and three guide faces 298. Here too in the illustrated version, the second carrier component 290 includes a carrier hub 306 supporting the follower 292. Here, the carrier hub 306 is operatively coupled to the ski assembly 144 via fasteners 260, and supports a plurality of followers 292 about respective follower axes FA (in the illustrated version, three followers 292). The follower axes FA are each disposed in spaced relation to (and are substantially parallel with) the rear axis XR. In the illustrated version, follower biasing elements 308 (not shown in detail) are also supported by the carrier hub 306 and are arranged to urge the locking faces 296 of the followers 292 towards the retention faces 294 of the first carrier component 288.

In the illustrated versions, the carrier 286 also includes a third carrier component 310 operatively attached to the seat frame 124 of the seat assembly 122 and having a release element 312 arranged to selectively engage the follower to urge the follower 292 away from the retention face 294 of the first carrier component 288 in response to movement of the rear assembly 140 towards the first rear assembly position 140A (e.g., the rear assembly chair position 140C), as described in greater detail below. Here, the follower 292 further defines an unlocking face 314 arranged for selective engagement with the release element 312 of the third carrier component 310 to urge the locking face 296 of the follower 292 away from the retention face 294 of the first carrier component 288 (see FIGS. 21D-21D; see also FIG. 22) to change operation of the carrier 286 from the locked state 286L to the unlocked state 286U as the rear assembly 140 moves towards the first rear assembly position 140A (e.g., the rear assembly chair position 140C). In the illustrated version, the third carrier component 310 includes a plate 316 arranged for keyed engagement with the D-shaped shank 256 of the carrier pin 218. Here, a plurality of release elements 312 extend from the plate 316 to respective release element ends 318. More specifically, in the illustrated version, the third carrier component 310 includes a total of three release elements 312 spaced about the carrier pin 218 and arranged to selectively engage respective unlocking faces 314 of the followers 292. Here, it will be appreciated that different arrangements and configurations of followers 292, release elements 312, and the like may be utilized.

As is best shown in FIG. 19, the locking face 296 and the unlocking face 314 of the follower 292 are spaced from each other along the follower axis FA. Here, while the locking face 296 is arranged to abut portions of the cam 302, it will be appreciated that no portion of the unlocking face 314 can come into contact with the cam 302. Rather, the unlocking face 314 is arranged for selective engagement with the release element 312 of the third carrier component 310 as noted above. In the illustrated version, a thrust washer 320 is arranged between the cam body 300 of the first carrier component 288 and the plate 316 of the third carrier component 310.

Figure 20A:
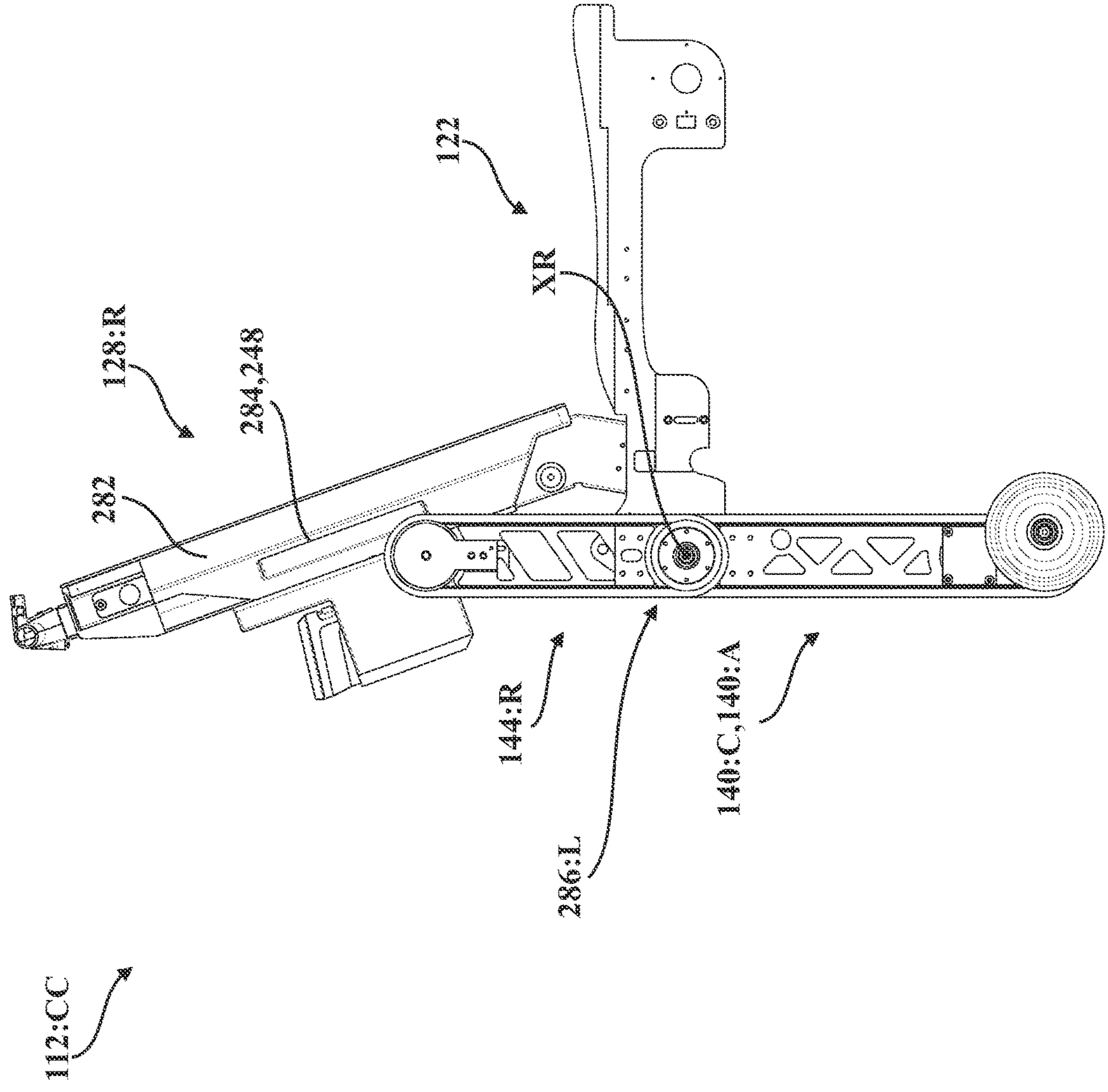
FIG. 20A is a side view of portions of the litter of FIGS. 16-19, shown arranged in a chair configuration with the rear assembly disposed in a rear assembly chair position, with the ski assembly disposed in a raised ski position, and with the fowler assembly disposed in a fowler raised position.
Figure 20B:
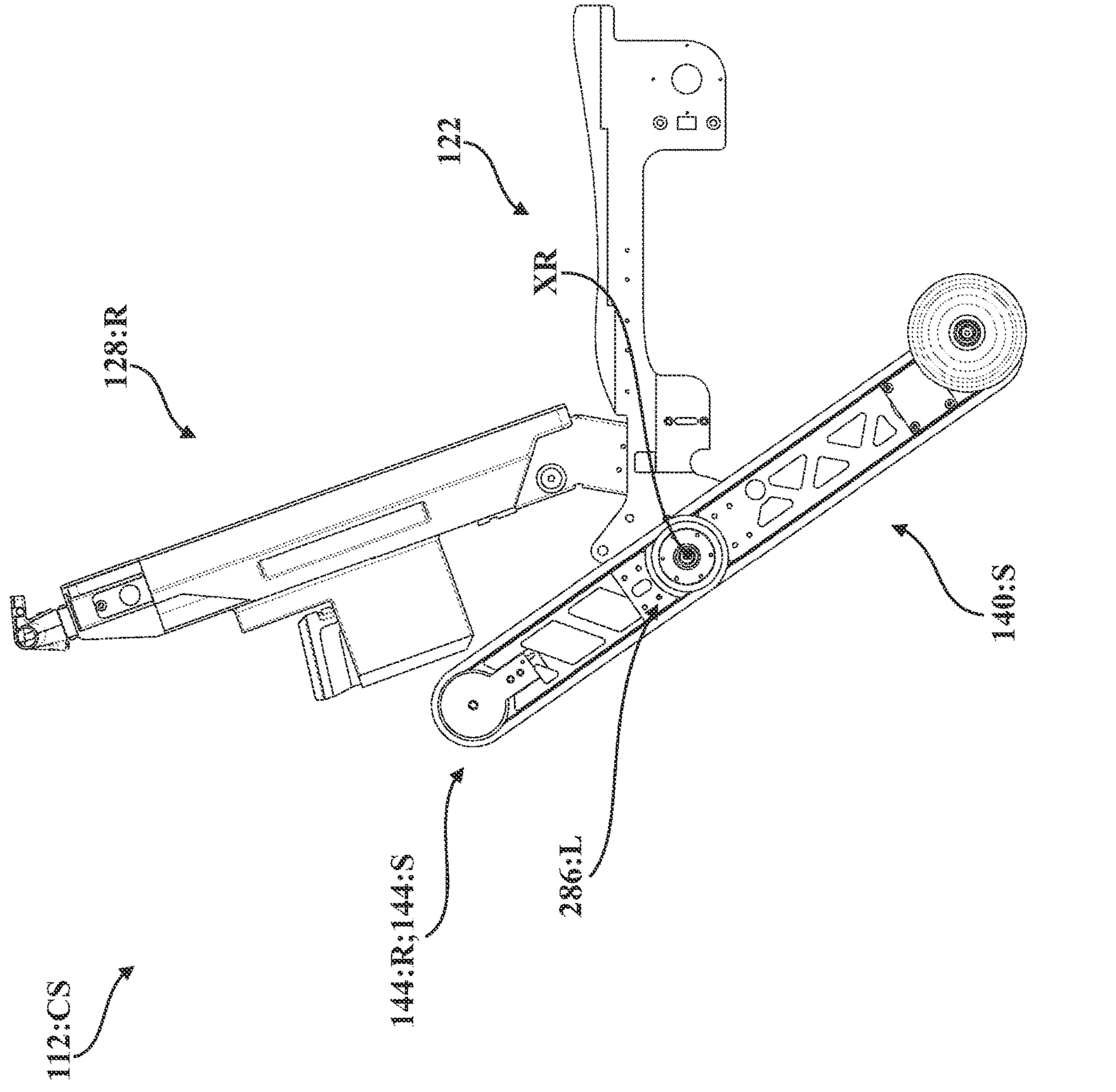
FIG. 20B is another side view of the portions of the litter of FIG. 20A, shown arranged in a stair configuration with the rear assembly disposed in a rear assembly stair position and with the ski assembly arranged in an intermediate ski position.
Figure 20C:
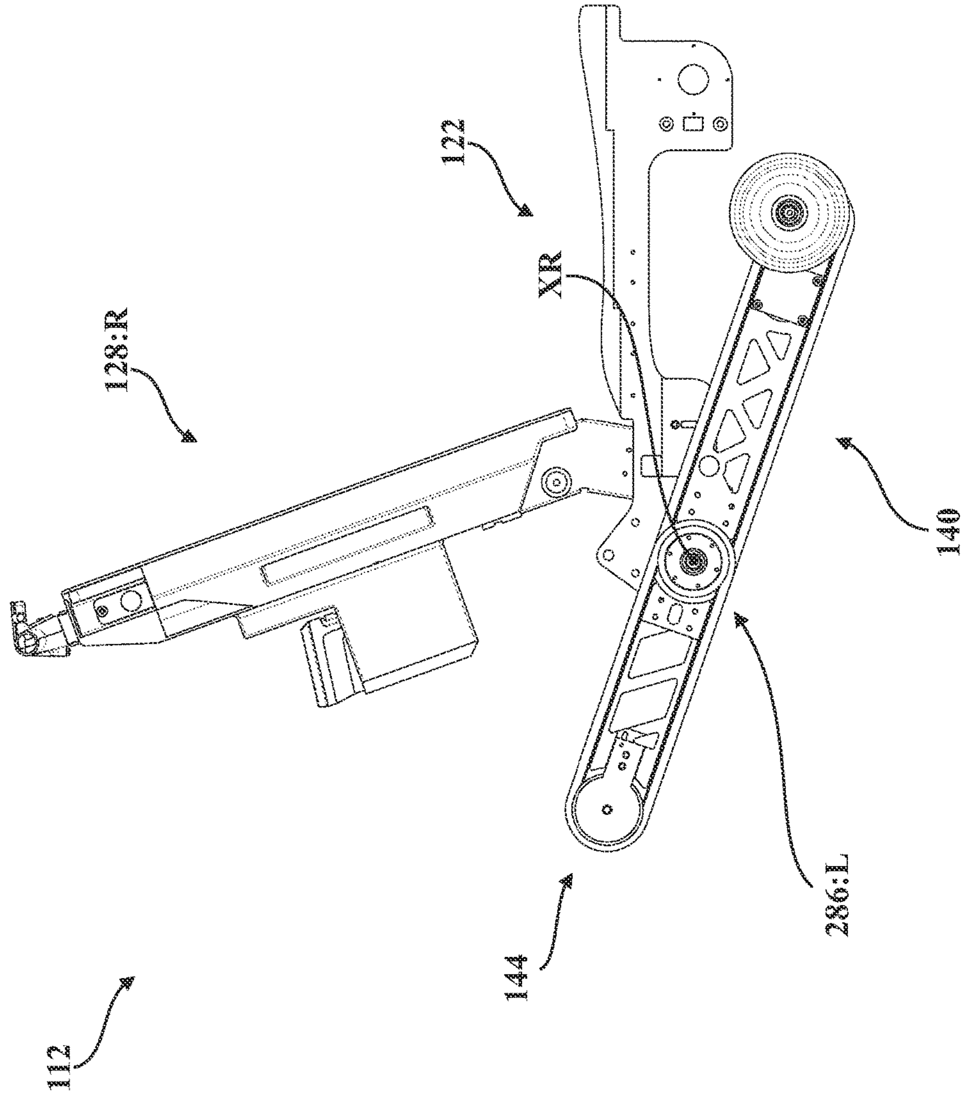
FIG. 20C is another side view of the portions of the litter of FIGS. 20A-20B, shown transitioning between configurations to demonstrate operation of the carrier in a locked state where the ski assembly moves concurrently with the rear assembly.
Figure 20D:
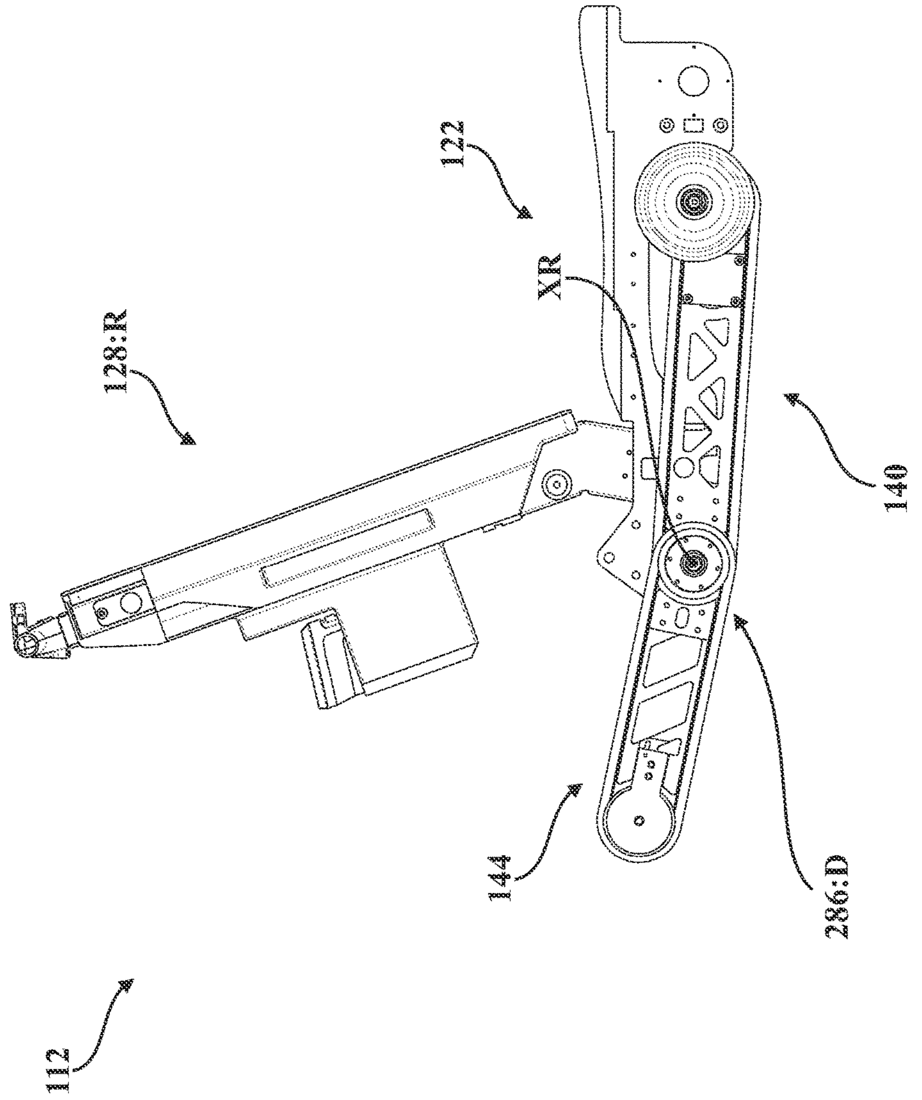
FIG. 20D is another side view of the portions of the litter of FIGS. 20A-20C, shown transitioning between configurations to demonstrate a change in operation of the carrier from the locked state to an unlocked state where the ski assembly begins to move independently of the rear assembly back towards the raised ski position.
Figure 20E:
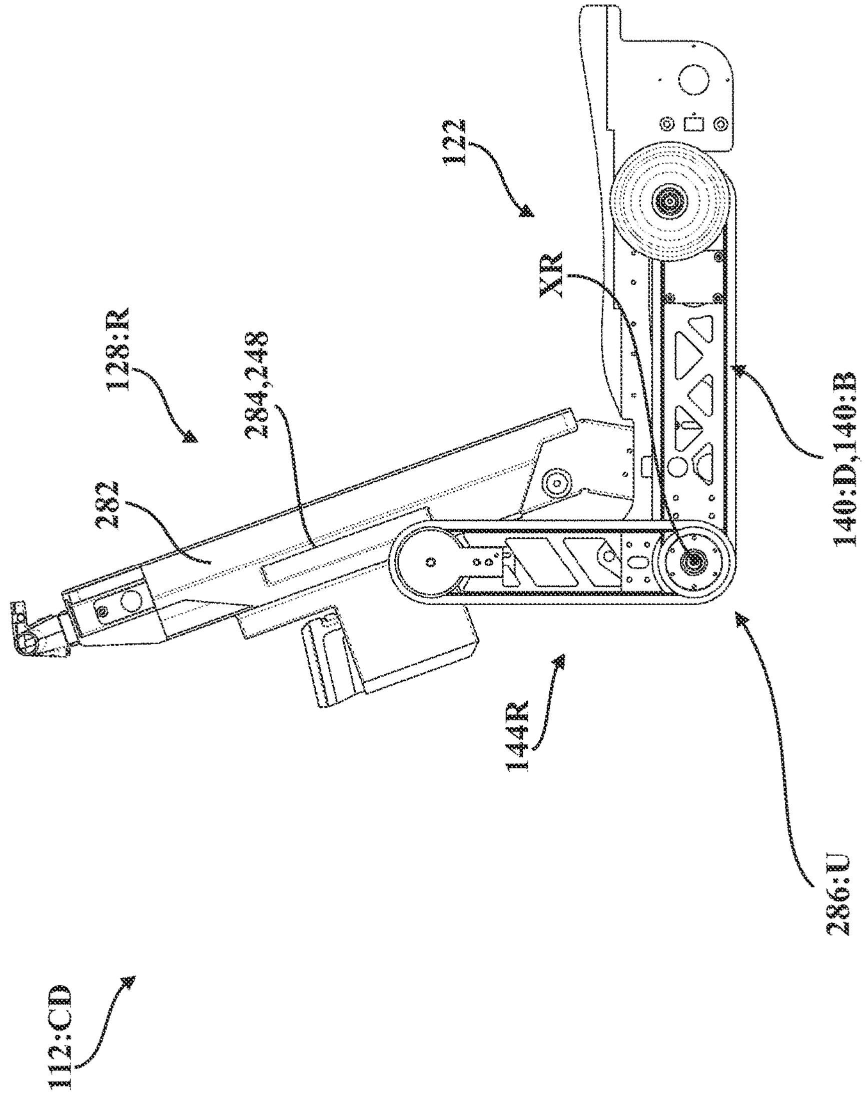
FIG. 20E is another side view of the portions of the litter of FIGS. 20A-20D, shown arranged in a dock configuration with the rear assembly disposed in a rear assembly dock position and with the ski assembly arranged in the raised ski position.
Figure 20F:
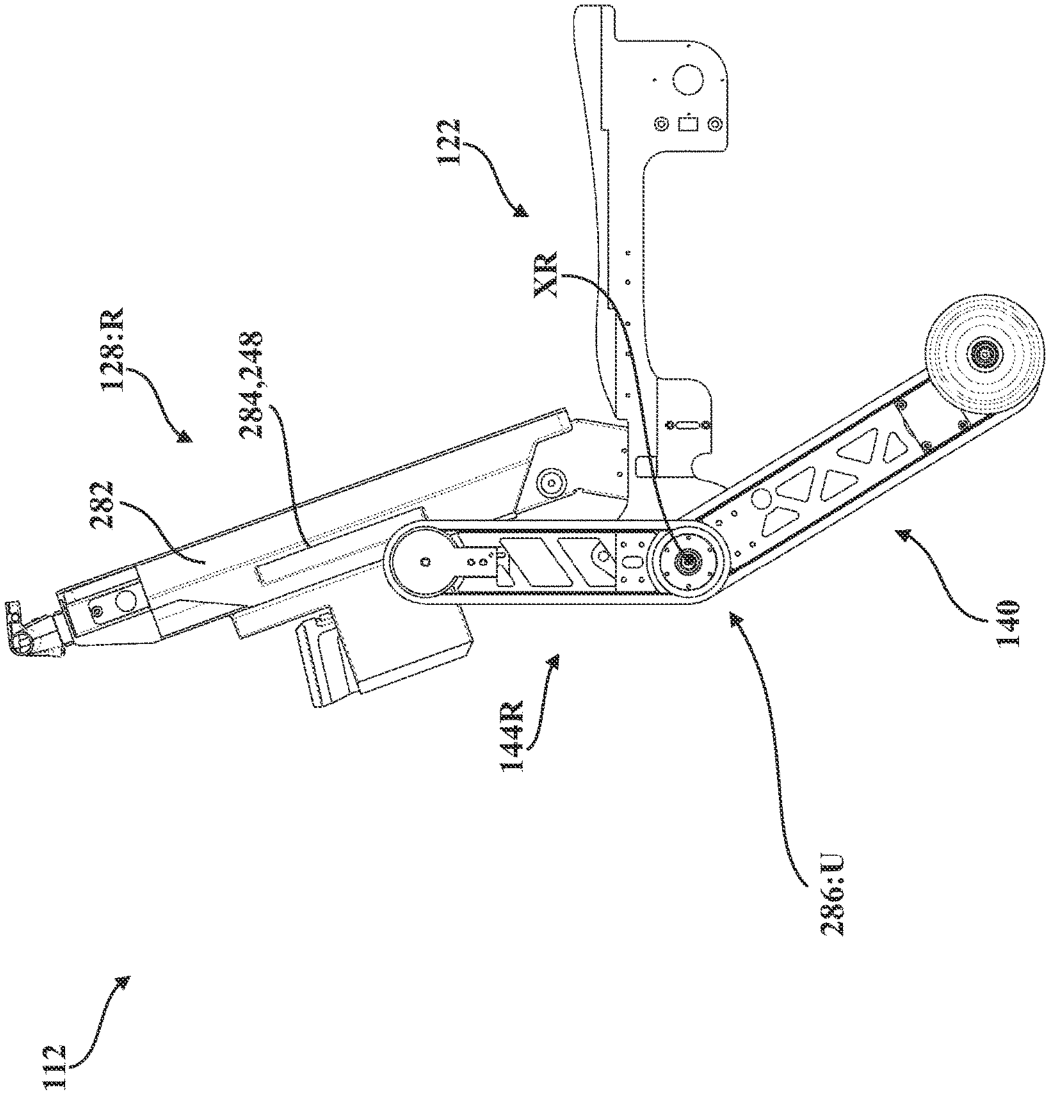
FIG. 20F is another side view of the portions of the litter of FIGS. 20A-20E, shown arranged transitioning from the dock configuration towards the chair configuration with the rear assembly arranged between the rear assembly dock position and the rear assembly chair position, and with the ski assembly disposed in the raised ski position.

Referring now to FIGS. 20A-20I, the litter 112 is shown moving through the various configurations starting with the chair configuration CC in FIG. 20A. Here in the chair configuration CC, the rear assembly 140 is in the rear assembly chair position 140C, the ski assembly 144 is in the raised ski position 144R, and the fowler assembly 128 is in the fowler raised position 128R. In FIG. 20B, the litter 112 is in the stair configuration CS. Here in the stair configuration CS, the rear assembly 140 is in the rear assembly stair position 140S, the ski assembly 144 is in a raised ski position 144R for engaging stairs, and the fowler assembly 128 is in the fowler raised position 128R. FIGS. 20C-20D depict the litter 112 moving between the stair configuration CS and the dock configuration CD. As the rear assembly 140 rotates about the rear axis XR and toward the rear assembly dock position 140D, the ski assembly 144 moves together with the rear assembly 140 as shown by FIG. 20C. Once the rear assembly 140 reaches a certain orientation beyond the rear assembly chair position 140C but before reaching the rear assembly dock position 140D, such as is depicted in FIG. 20D, the carrier 286 moves from the locked state 286L to the unlocked state 286U, which results in the ski assembly 144 returning to the raised ski position 144R as shown in FIG. 20E.

Figure 20G:
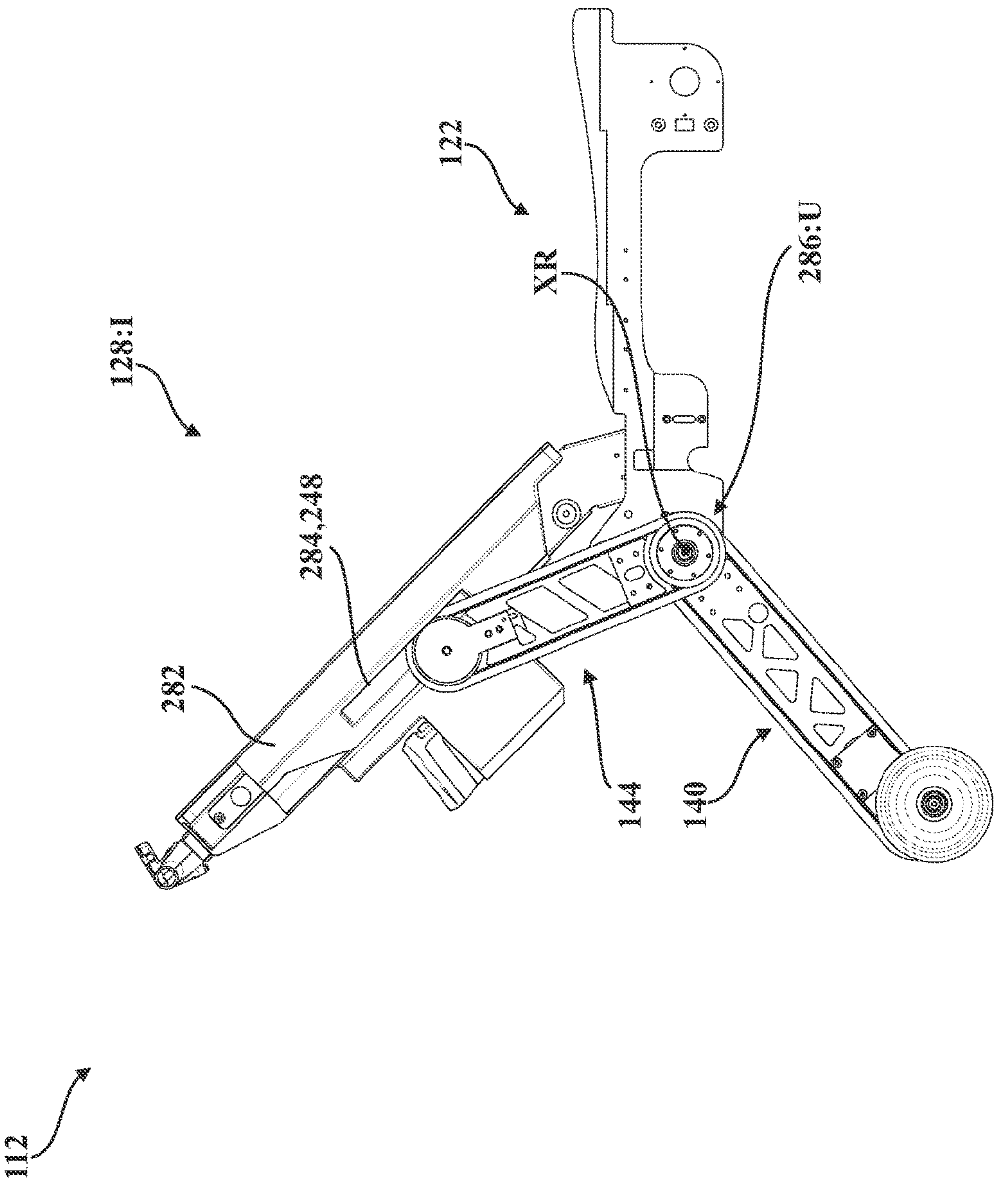
FIG. 20G is another side view of the portions of the litter of FIGS. 20A-20F, shown transitioning out of the chair configuration with the rear assembly having moved out of the rear assembly chair position, with the fowler assembly having moved to an intermediate fowler position, and with the ski assembly having been moved by the fowler assembly to an intermediate ski position.
Figure 20H:
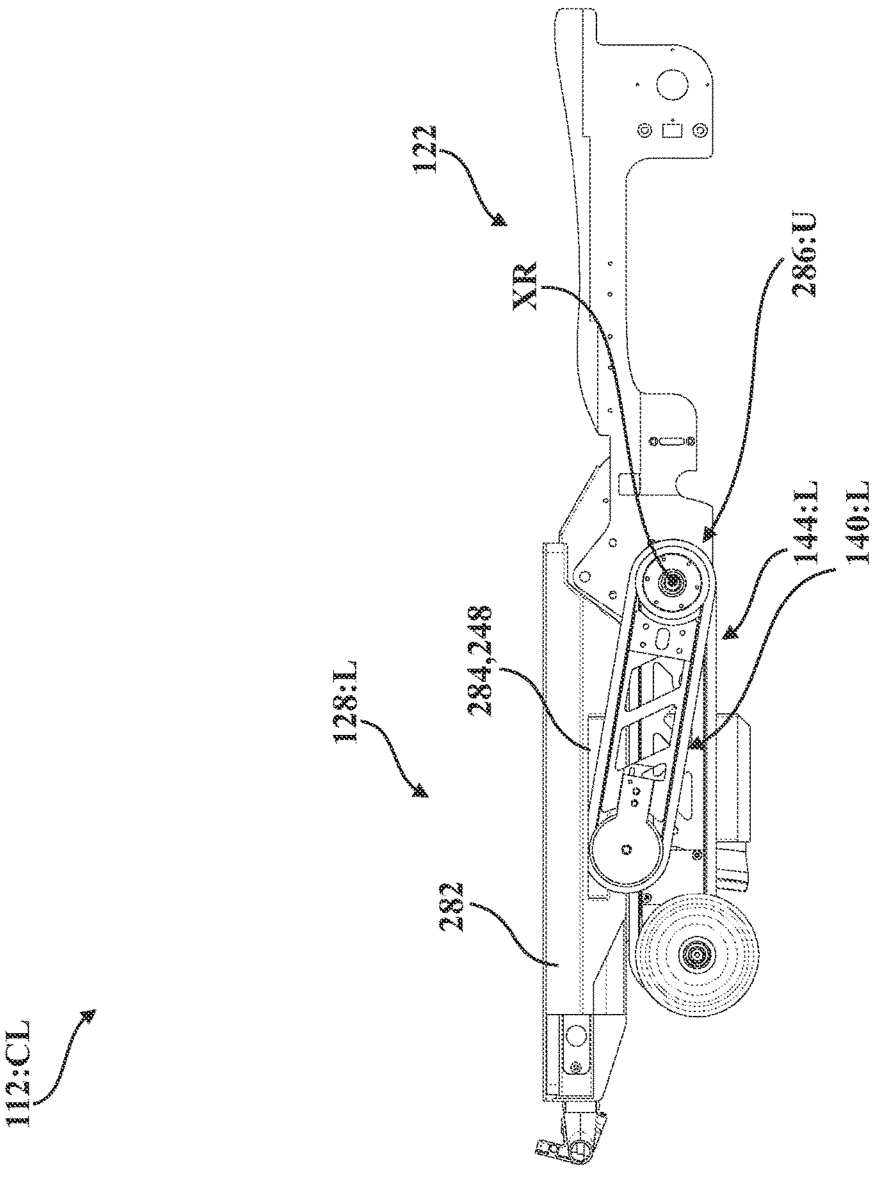
FIG. 20H is another side view of the portions of the litter of FIGS. 20A-20G, shown arranged in a loft configuration with the rear assembly arranged in a rear assembly loft position, with the ski assembly arranged in a lowered ski position, and with the fowler assembly arranged in a fowler lowered position.

In FIG. 20E, the litter 112 is in the dock configuration CD. Here in the dock configuration CD, the rear assembly 140 is in the rear assembly dock position 140D, the ski assembly 144 is in the raised ski position 144R, and the fowler assembly 128 is in the fowler raised position 128R. Here, it will be appreciated that the fowler assembly 128 may be moved towards the fowler lowered position 128L while in the dock configuration CD, and the ski may be urged toward the lowered ski position 144L in response similar to as is described above in connection with FIGS. 9-15B. In the version illustrated in FIG. 20E, however, the fowler assembly 128 is in the fowler raised position 128R, and the ski assembly 144 is in the raised ski position 144R. Similarly, when moving from the chair configuration CC depicted in FIG. 20A into the loft configuration CL depicted in 20H, the litter 112 may arrive in a configuration similar to as is depicted in FIG. 20G, where movement of the fowler assembly 128 likewise moves the ski assembly 144 away from the raised ski position 144R. In FIG. 20H, the litter 112 is in the loft configuration CL with the rear assembly 140 in the rear assembly loft position 140L, the ski assembly 144 is in a lowered ski position 144L, and the fowler assembly 128 in the fowler lowered position 128L. As the rear assembly 140 rotates about the rear axis XR and toward the rear assembly loft position 140L, the fowler assembly 128 moves toward the fowler lowered position 128L and urges the ski assembly 144 toward the lowered ski position 144L.

Figure 20I:
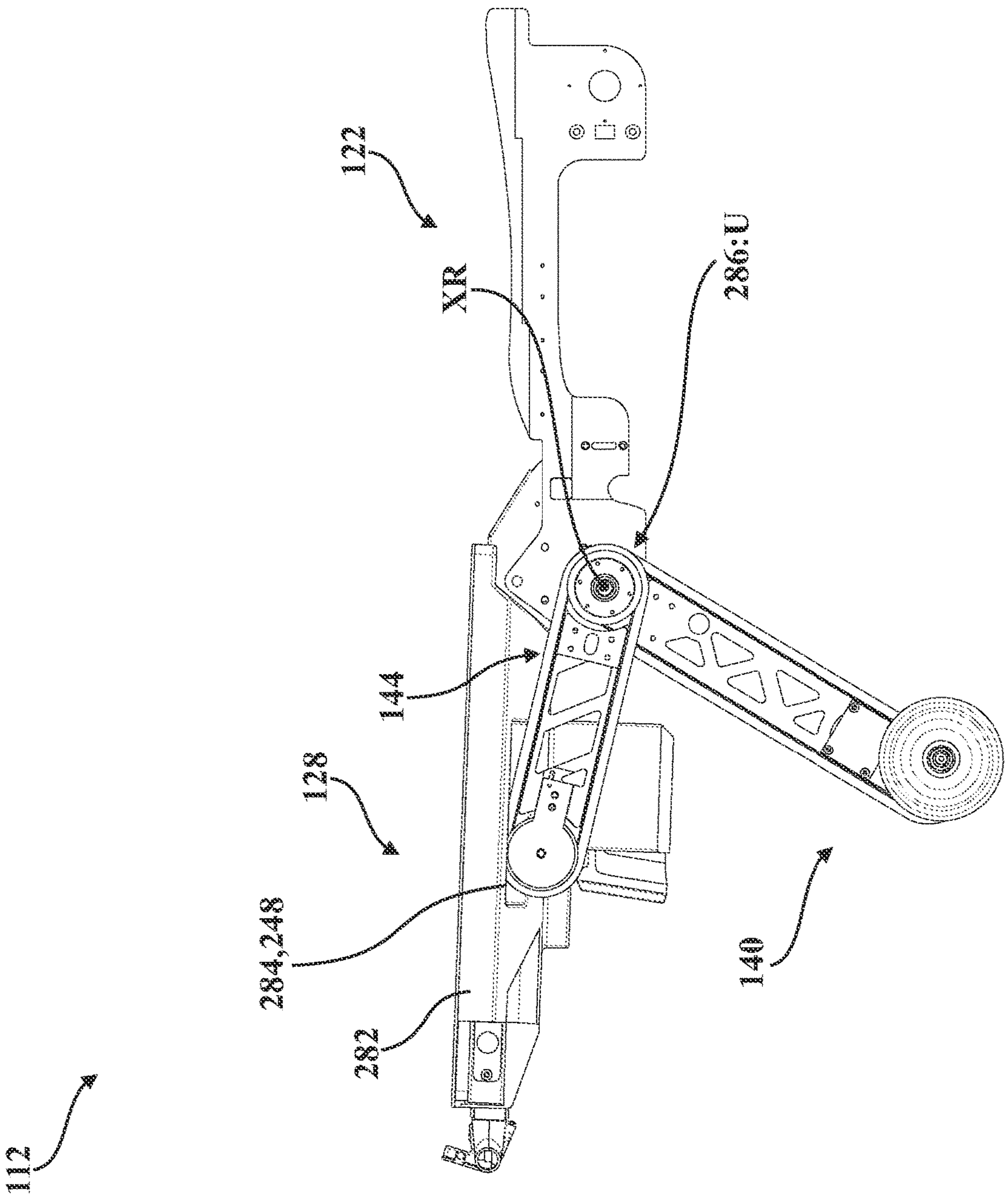
FIG. 20I is another side view of the portions of the litter of FIGS. 20A-20H, shown transitioning out of the loft configuration with the rear assembly having moved away from the rear assembly loft position, with the ski assembly having moved away from the lowered ski position, and with the fowler assembly having moved away from the fowler lowered position.

In FIG. 20I, the litter 112 is shown moving out of the loft configuration CL and towards the chair configuration CC. Here, as the rear assembly 140 rotates about the rear axis XR and moves towards the rear assembly chair position 140C, the fowler assembly 128 rotates about the rear axis XR toward the fowler raised position 128R. The ski assembly 144 is urged against and follows the fowler assembly 128 as the fowler assembly 128 rotates until the ski assembly 144 reaches the raised ski position 144R as shown by FIG. 20A.

Referring now to FIGS. 21A-21I, the carrier 286 is shown moving through the various configurations corresponding to movement of the litter 112 described above in connection with FIGS. 20A-20I. As noted above, the carrier 286 is operable in the locked state 286L and the unlocked state 286U to facilitate proper alignment between the ski assembly 144 and the rear assembly 140 as the litter 112 is arranged in the various configurations.

Figure 21A:
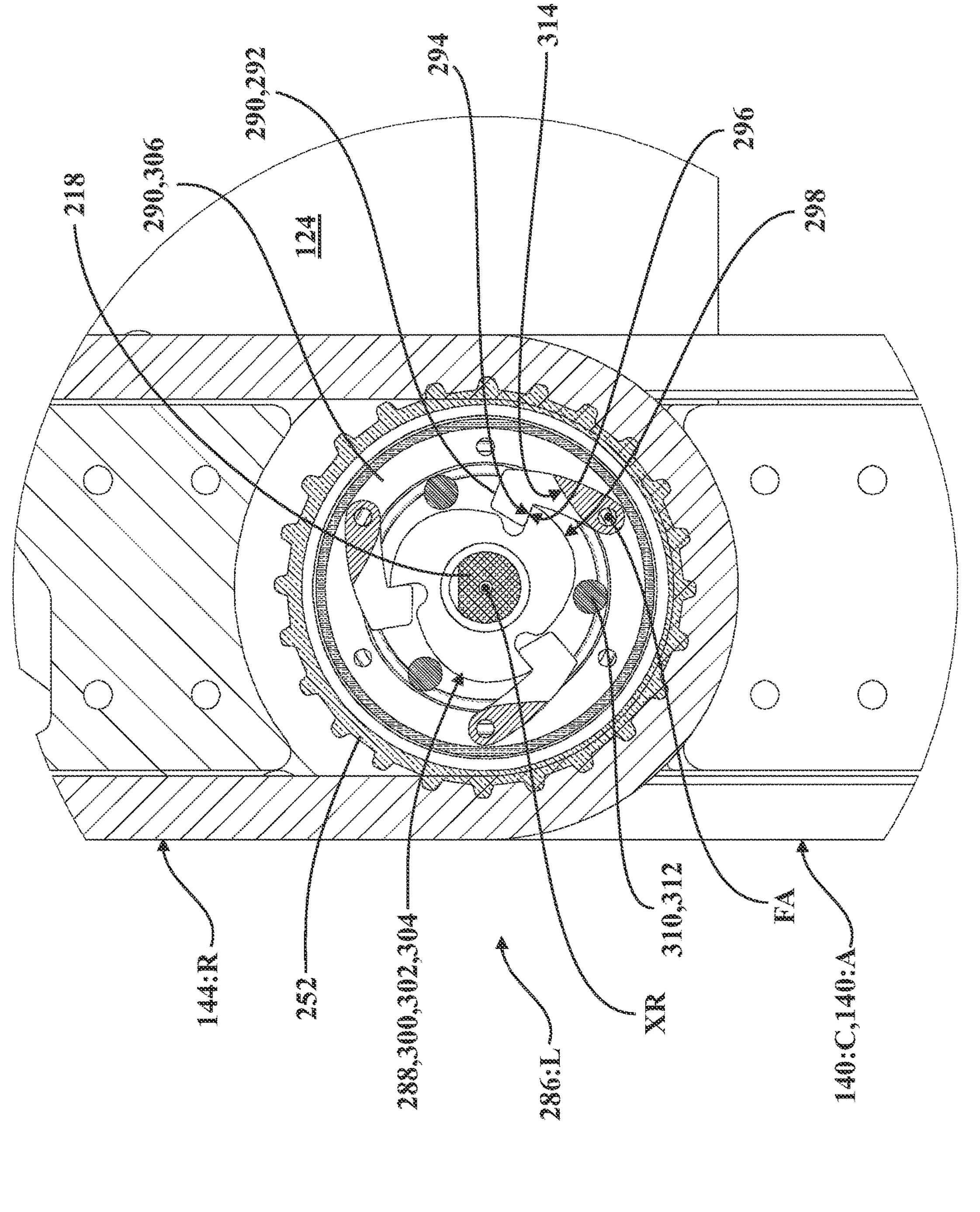
FIG. 21A is a partial sectional view taken longitudinally through the carrier and showing portions of the litter arranged as depicted in FIG. 20A.
Figure 21B:
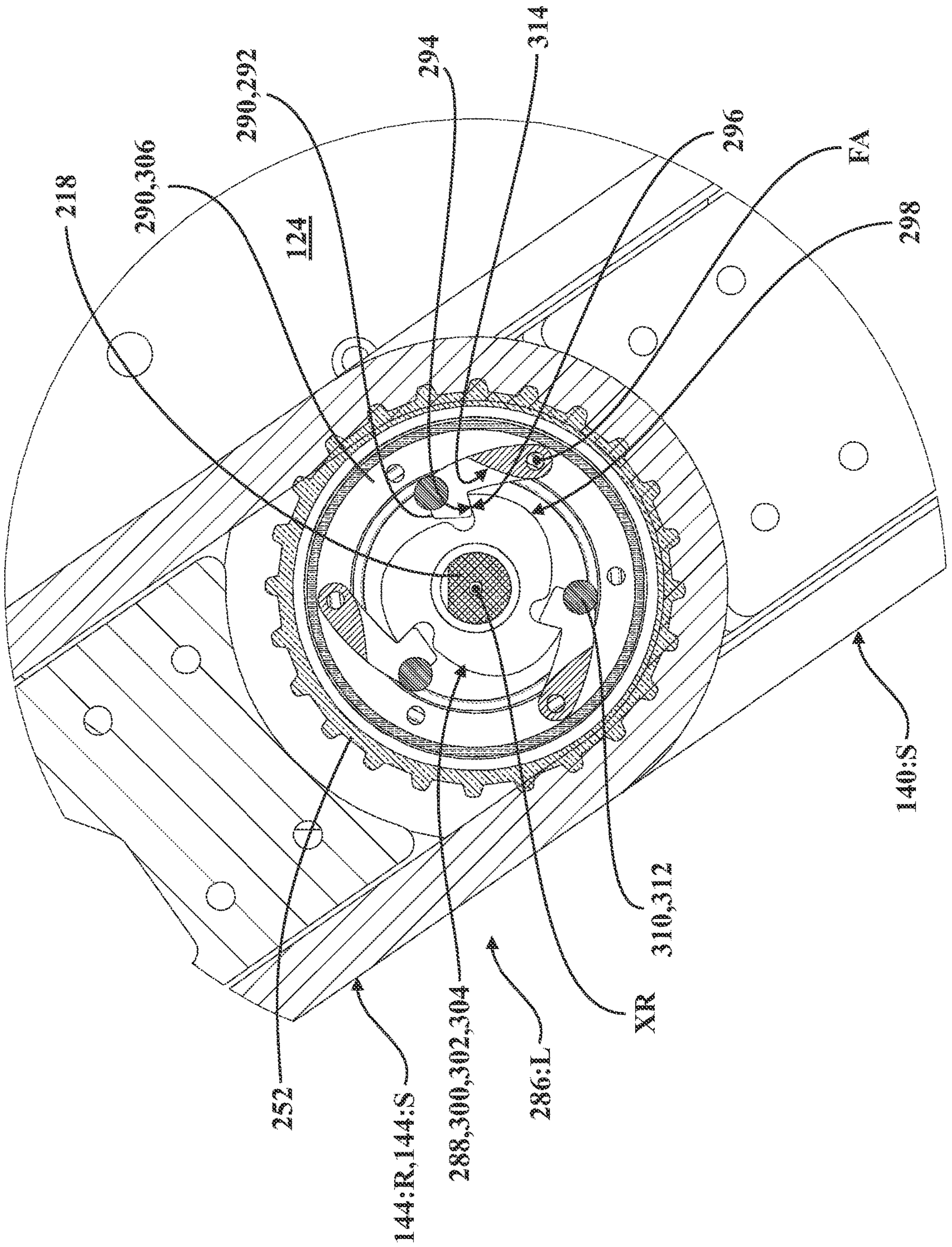
FIG. 21B is a partial sectional view taken longitudinally through the carrier and showing portions of the litter arranged as depicted in FIG. 20B.

As shown by FIG. 21A (see also FIG. 20A), the ski assembly 144 disposed in a raised ski position 144R (perpendicular to the seat assembly 122 and not arranged for engagement with stairs ST). This may be considered to be a "stowed" ski position. Here in FIG. 21A, the locking face 296 of the follower 292 rests against the retention face 294 of the first carrier component 288. This is the locked state 286L in which the carrier 286 inhibits relative movement between the ski assembly 144 and the rear assembly 140. As shown by FIGS. 21A-21B, the carrier 286 remains in the locked state 286L as the rear assembly 140 rotates toward the rear assembly stair position 140S. In other words, as the rear assembly 140 moves from the rear assembly chair position 140C to the rear assembly stair position 140S, the locking face 296 of the follower 292 remains engaged with the retention face 294 of the first carrier component 288 to keep the carrier 286 in the locked state 286L such that the movement of the rear assembly 140 into the rear assembly stair position 140S arranges the ski assembly 144 to be substantially parallel with the rear assembly 140 for engagement with stairs ST.

Figure 21C:
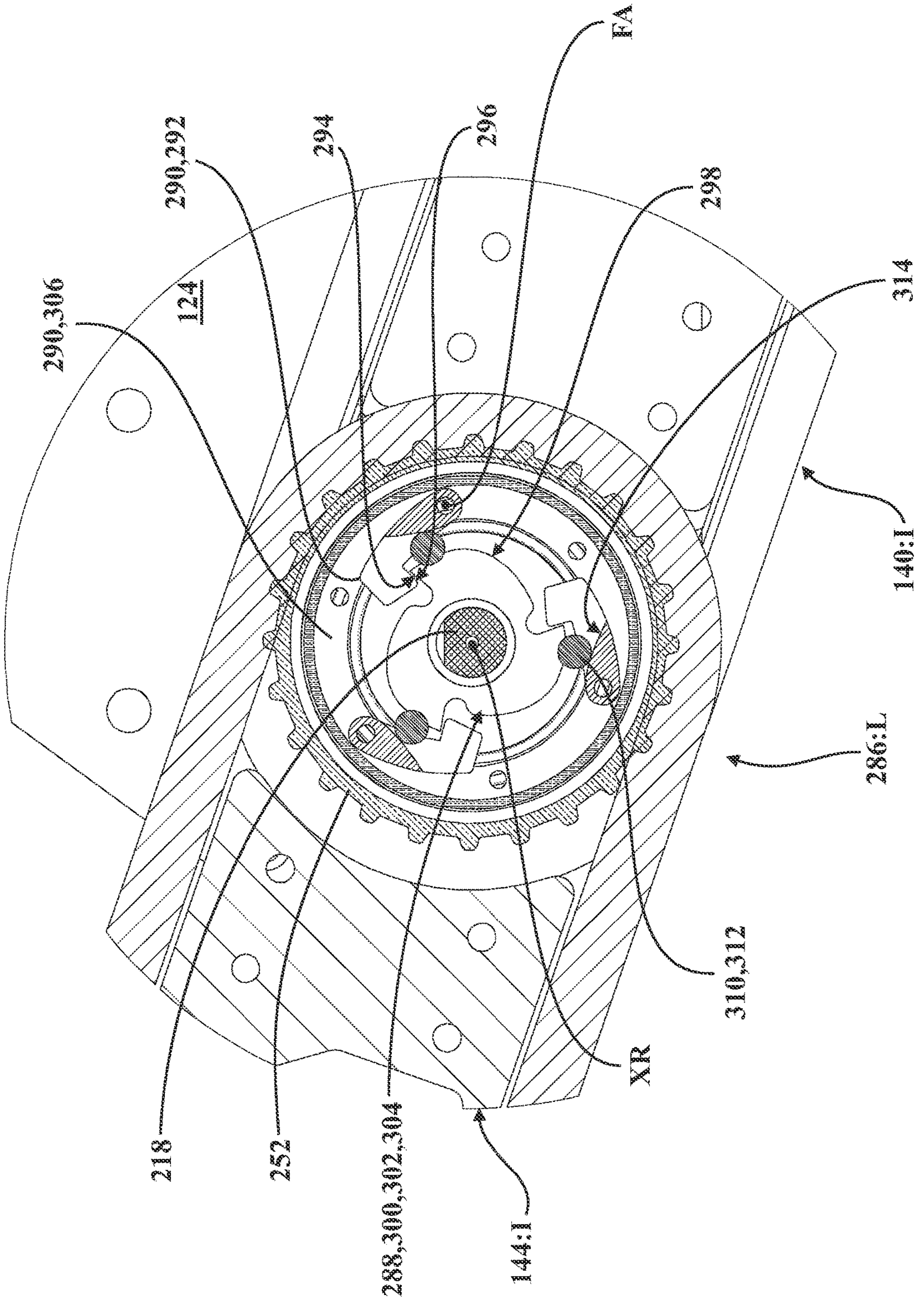
FIG. 21C is a partial sectional view taken longitudinally through the carrier and showing portions of the litter arranged as depicted in FIG. 20C.
Figure 21D:
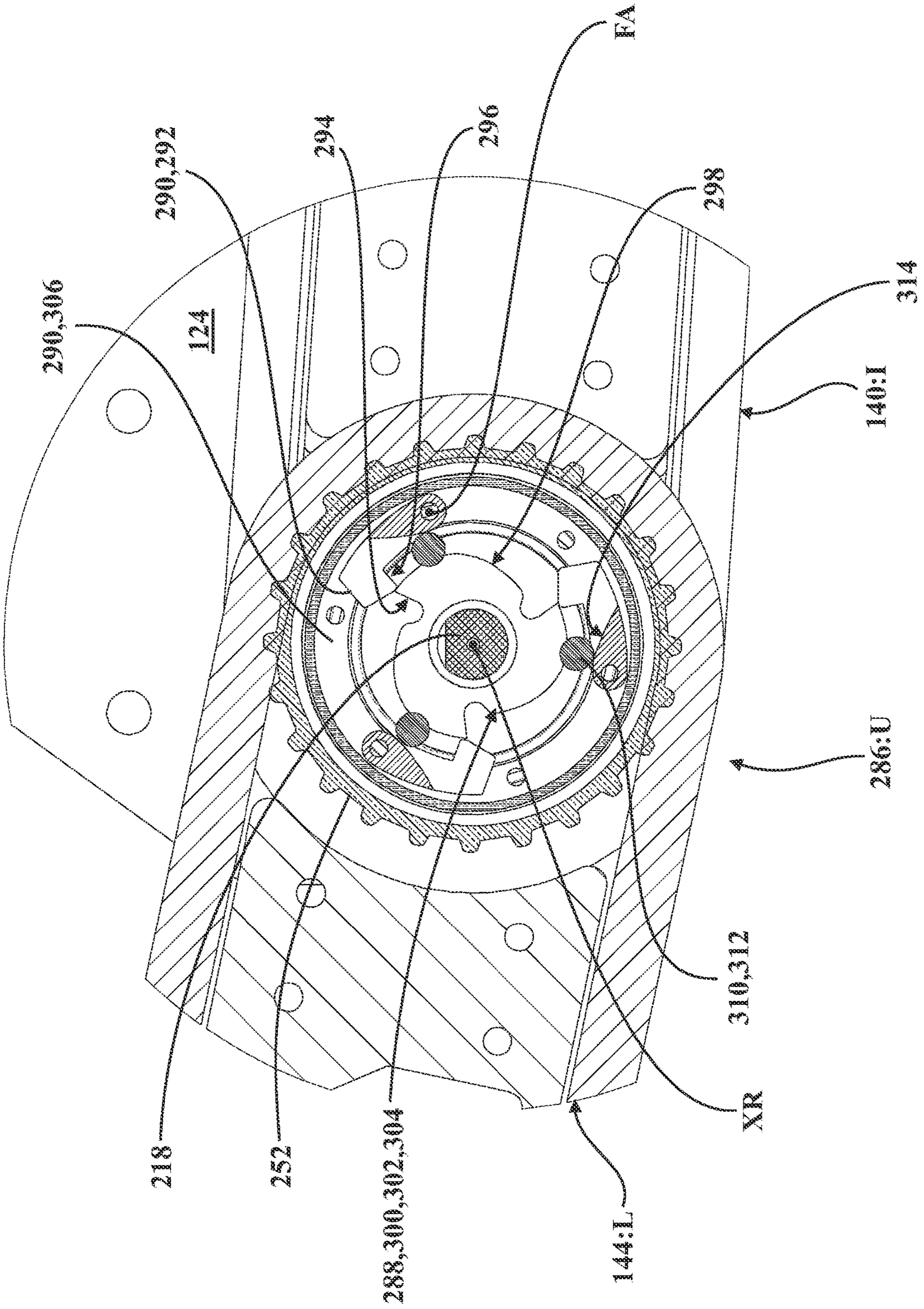
FIG. 21D is a partial sectional view taken longitudinally through the carrier and showing portions of the litter arranged as depicted in FIG. 20D.

Looking now to FIGS. 21C-21D from FIG. 21B, the carrier 286 is shown transitioning between the locked state 286L and the unlocked state 286U. As the rear assembly 140 moves from the rear assembly stair position 140S to the rear assembly dock position 140D, the release element 312 of the third carrier component 310 selectively engages the unlocking face 296 of the follower 292 to urge the locking face 296 of the follower 292 away from the retention face 294 of the first carrier component 288 such that the carrier 286 moves into the unlocked state 286U. Thus, moving the rear assembly 140 into the rear assembly dock position 140D releases the ski assembly 144 and permits relative movement between the ski assembly 144 and the rear assembly 140. FIG. 21D shows the point of transition from the locked state 286L to the unlocked state 286U as the locking face 296 of the follower 292 is ultimately urged away from the retention face 294 of the first carrier component 288 via abutment of the release element 312 of the third carrier component 310 with the unlocking face 296 of the follower 292.

Figure 21E:
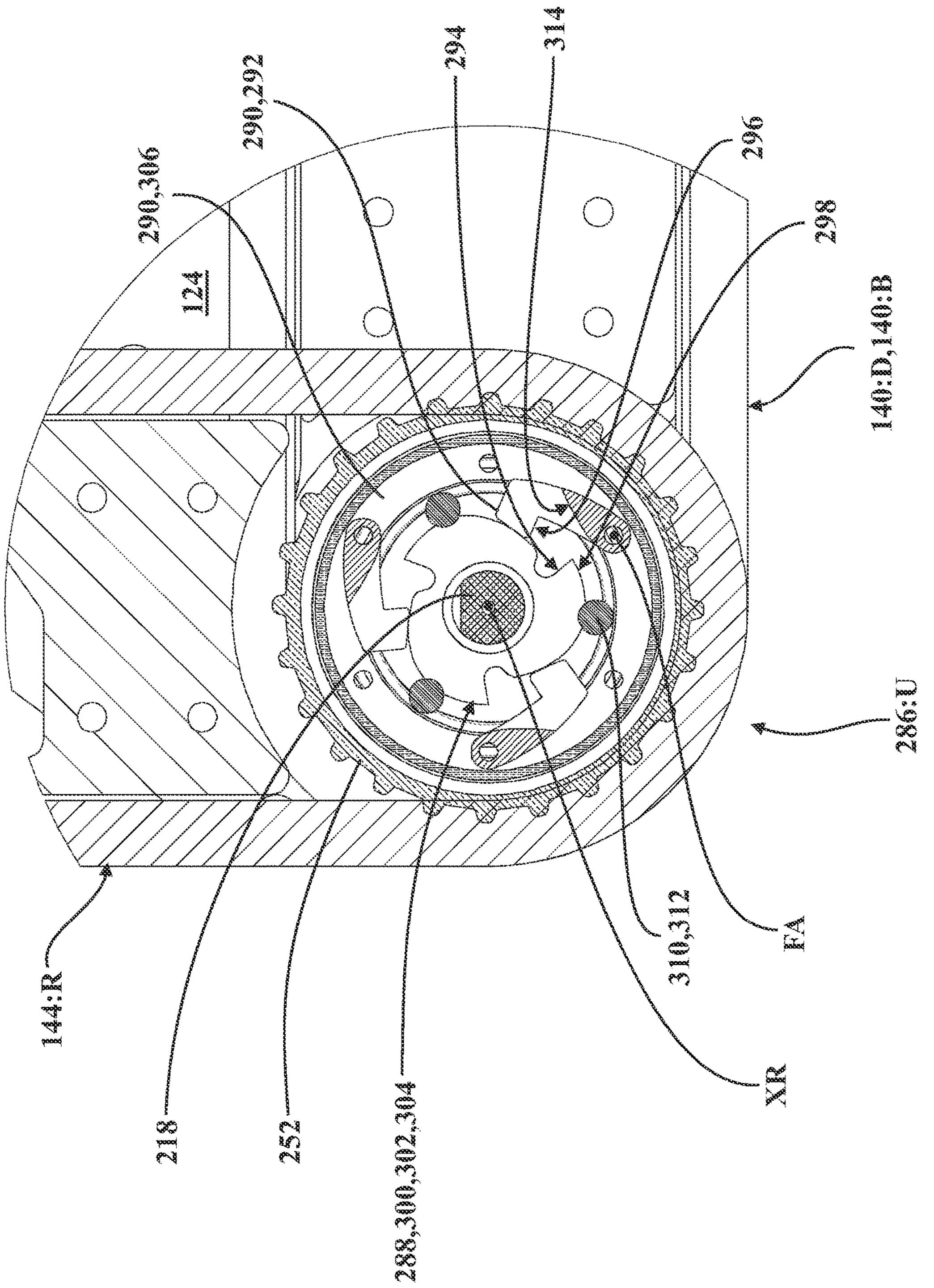
FIG. 21E is a partial sectional view taken longitudinally through the carrier and showing portions of the litter arranged as depicted in FIG. 20E.
Figure 21F:
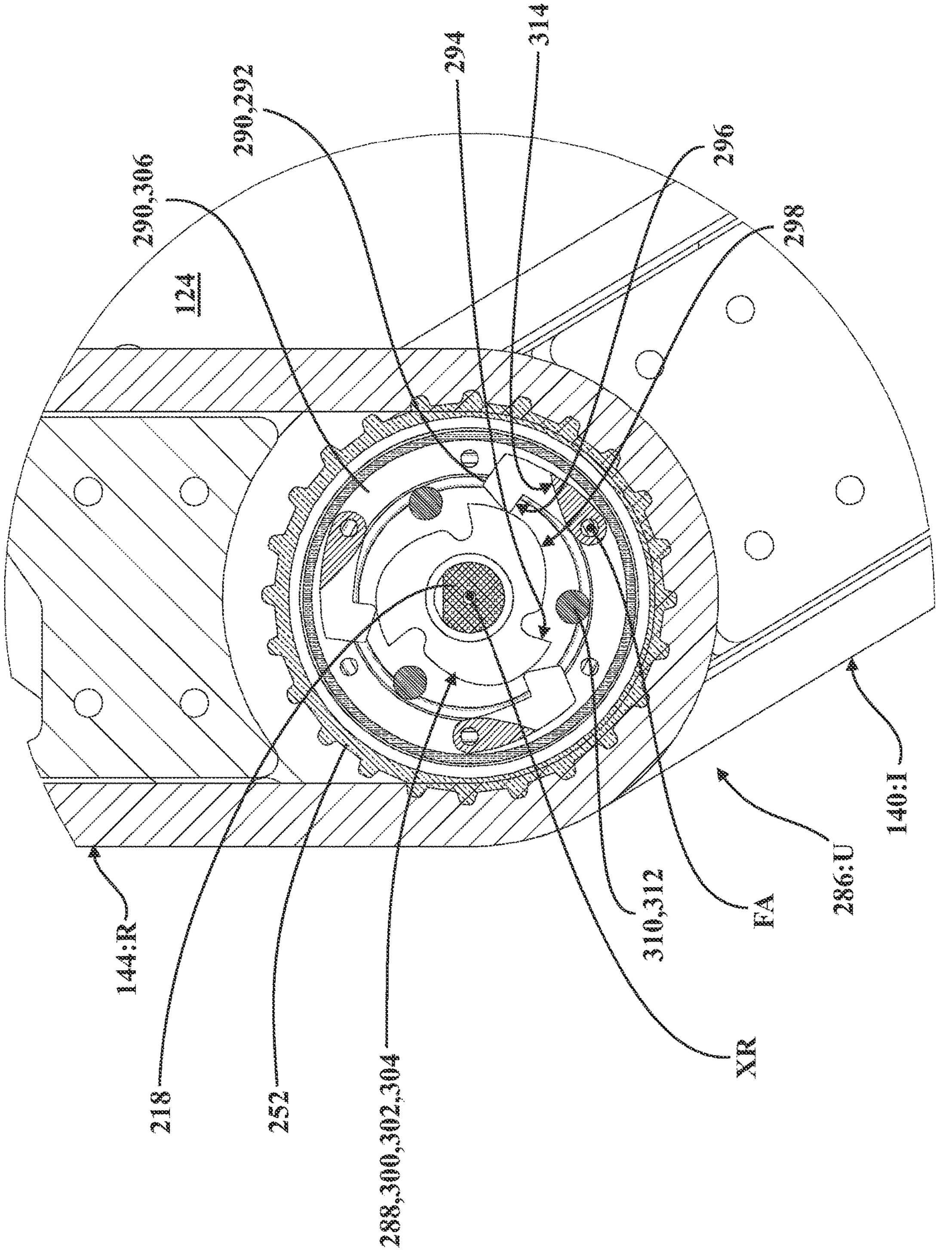
FIG. 21F is a partial sectional view taken longitudinally through the carrier and showing portions of the litter arranged as depicted in FIG. 20F.
Figure 21G:
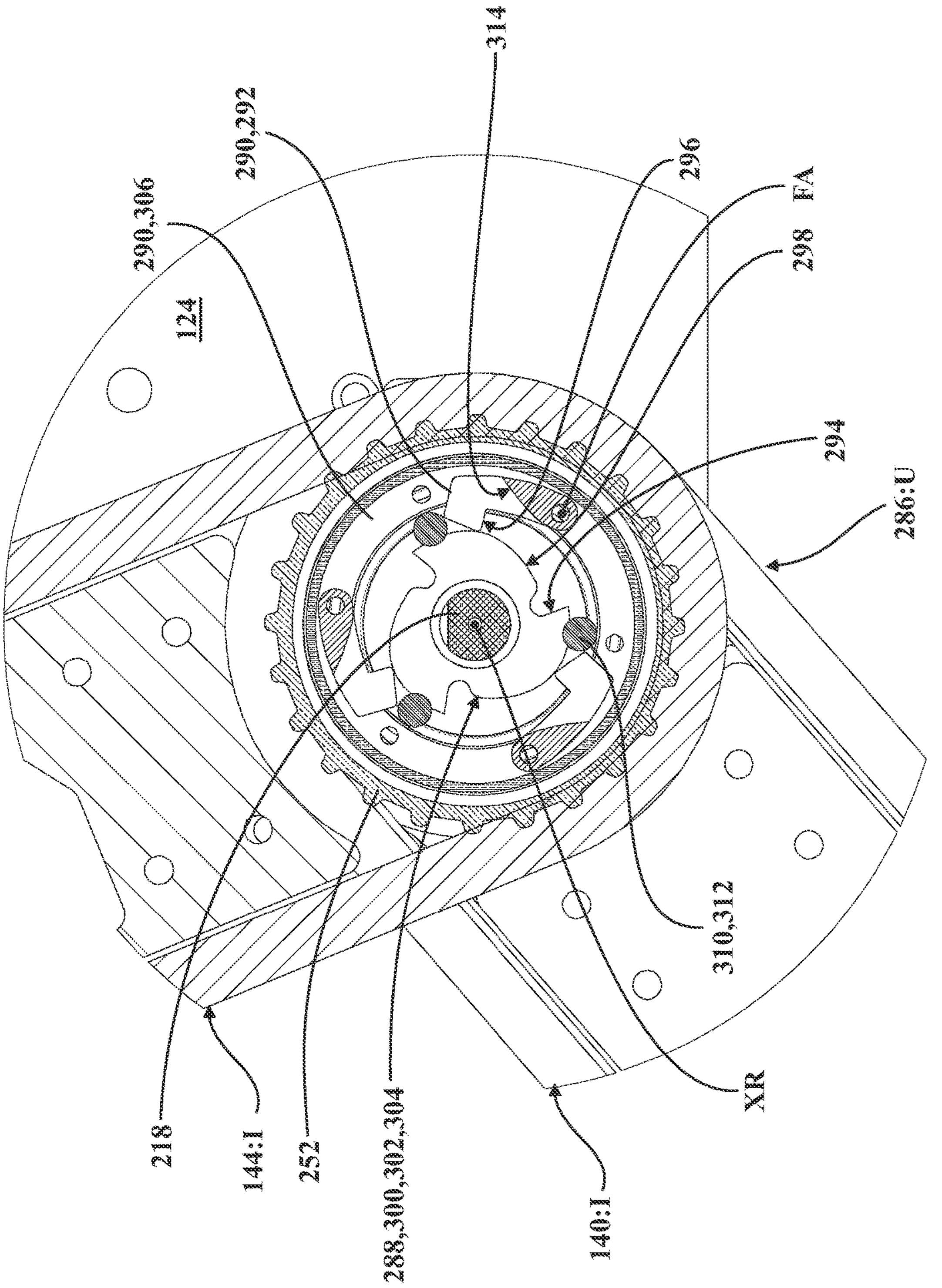
FIG. 21G is a partial sectional view taken longitudinally through the carrier and showing portions of the litter arranged as depicted in FIG. 20G.

Referring now to FIG. 21E, the carrier 286 is shown in the unlocked state 286U and the litter 112 is shown in the dock configuration CD. In the unlocked state 286U, the follower 292 rides along the guide face 298 of the first carrier component 288, and the ski assembly 144 is free to rotate relative to the rear assembly 140 about the rear axis XR. As shown by FIG. 21F, during movement from the dock configuration CD (see FIG. 21E) back towards the chair configuration CC (see FIG. 21A), the follower 292 rides along the guide face 298 of the first carrier component 288 and the carrier 286 remains in the unlocked state 286U such that the ski assembly 144 is not rotated along with the rear assembly 140. Similarly, as shown by FIG. 21G, during movement from the chair configuration CC (see FIG. 21A) towards the loft configuration CL (see FIG. 21H), the follower 292 rides along the guide face 298 of the first carrier component 288 and the carrier 286 remains in the unlocked state 286U such that the ski assembly 144 is not rotated along with the rear assembly 140. Thus, it will be appreciated that while the litter 112 does return to the chair configuration CC when moving between the dock configuration CD and the loft configuration CL, the carrier 286 does not prohibit rotation of the ski assembly 144 relative to the rear assembly 140. Indeed, as noted above, in such circumstances the retention face 294 of the first carrier component 288 does not engage the locking face 296 of the follower 292 as the litter 112 rotates from the dock configuration CD toward the loft configuration CL.

Figure 21H:
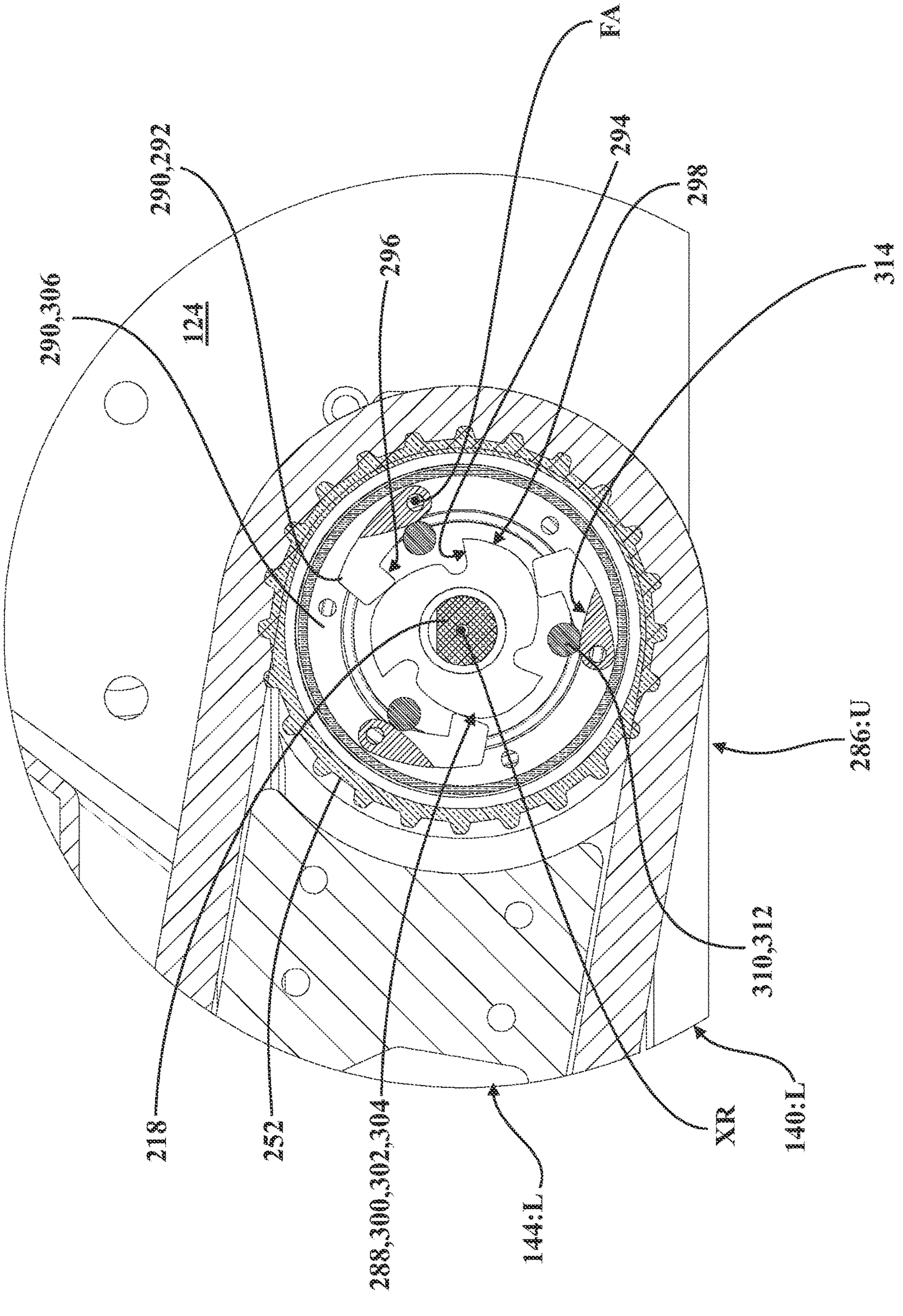
FIG. 21H is a partial sectional view taken longitudinally through the carrier and showing portions of the litter arranged as depicted in FIG. 20H.
Figure 21I:
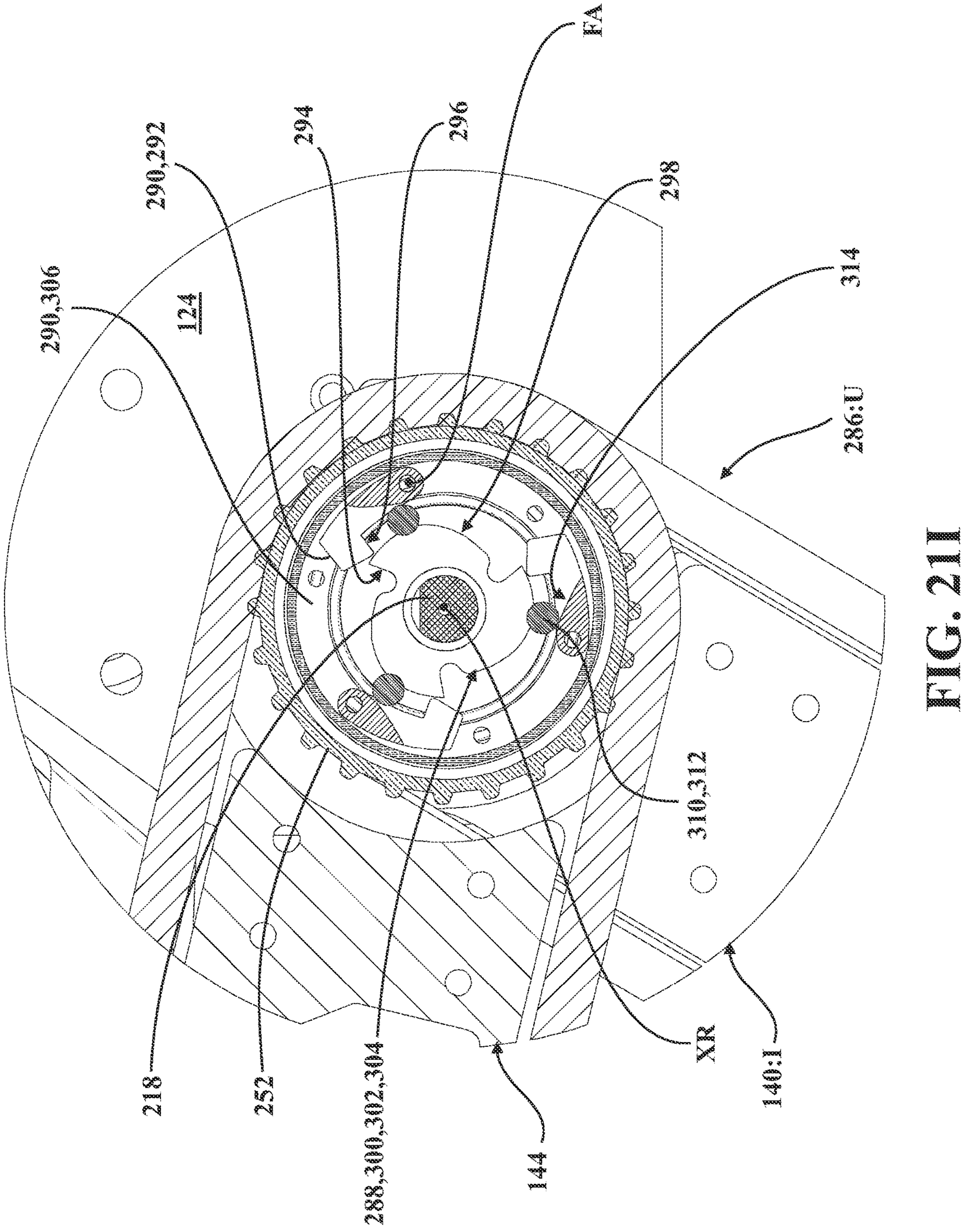
FIG. 21I is a partial sectional view taken longitudinally through the carrier and showing portions of the litter arranged as depicted in FIG. 20I.
Figure 22:
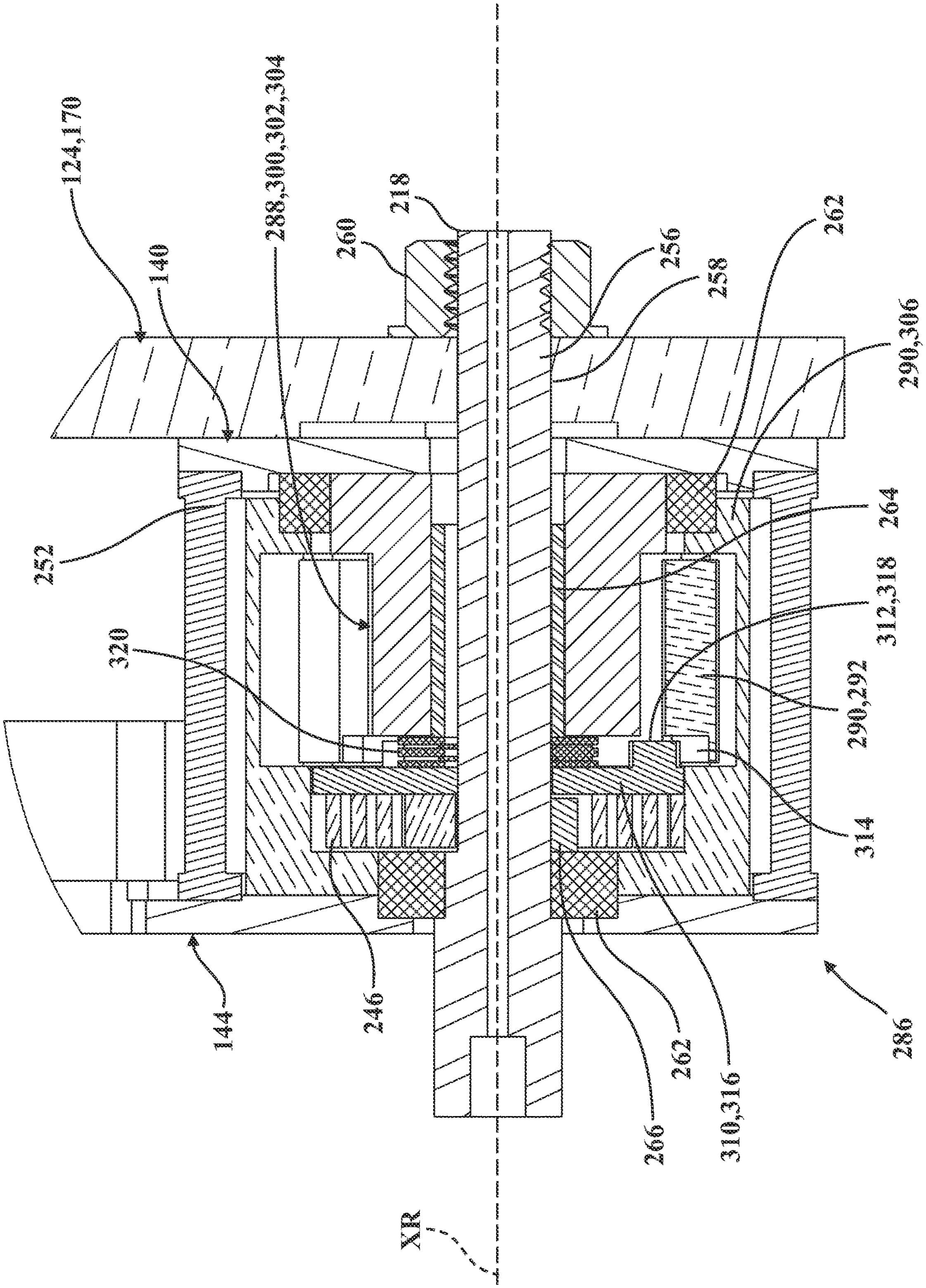
FIG. 22 is a partial sectional view taken laterally through the carrier and showing portions of the litter arranged as depicted in FIG. 20C.

Referring now to FIG. 21I, the carrier 286 is shown as the rear assembly 140 moves from the rear assembly loft position 140L (see FIG. 21H) toward the rear assembly chair position 140C (see FIG. 21A). In FIG. 21H, the rear assembly 140 is in the rear assembly loft position 140L and the carrier 286 is in the locked state 286L. Here, the ski assembly 144 is free to rotate relative to the rear assembly 140. However, the fowler assembly 128 is in the fowler lowered position 128L and, thus, is preventing free movement of the ski assembly 144 back toward the raised ski position 144R. As depicted in FIG. 21H, the follower 292 of the second carrier component 290 is urged away from the first carrier component 288 by the release element 312 of the third carrier component 310. Since the third carrier component 310 does not rotate about the rear axis XR, the release element 312 remains stationary and continues to urge the follower 292 away from the first carrier component 288. As a result, the carrier 286 remains in the unlocked state 286U and the rear assembly 140 may freely rotate toward the rear assembly chair position 140C as shown by FIG. 21I.

Figure 23:
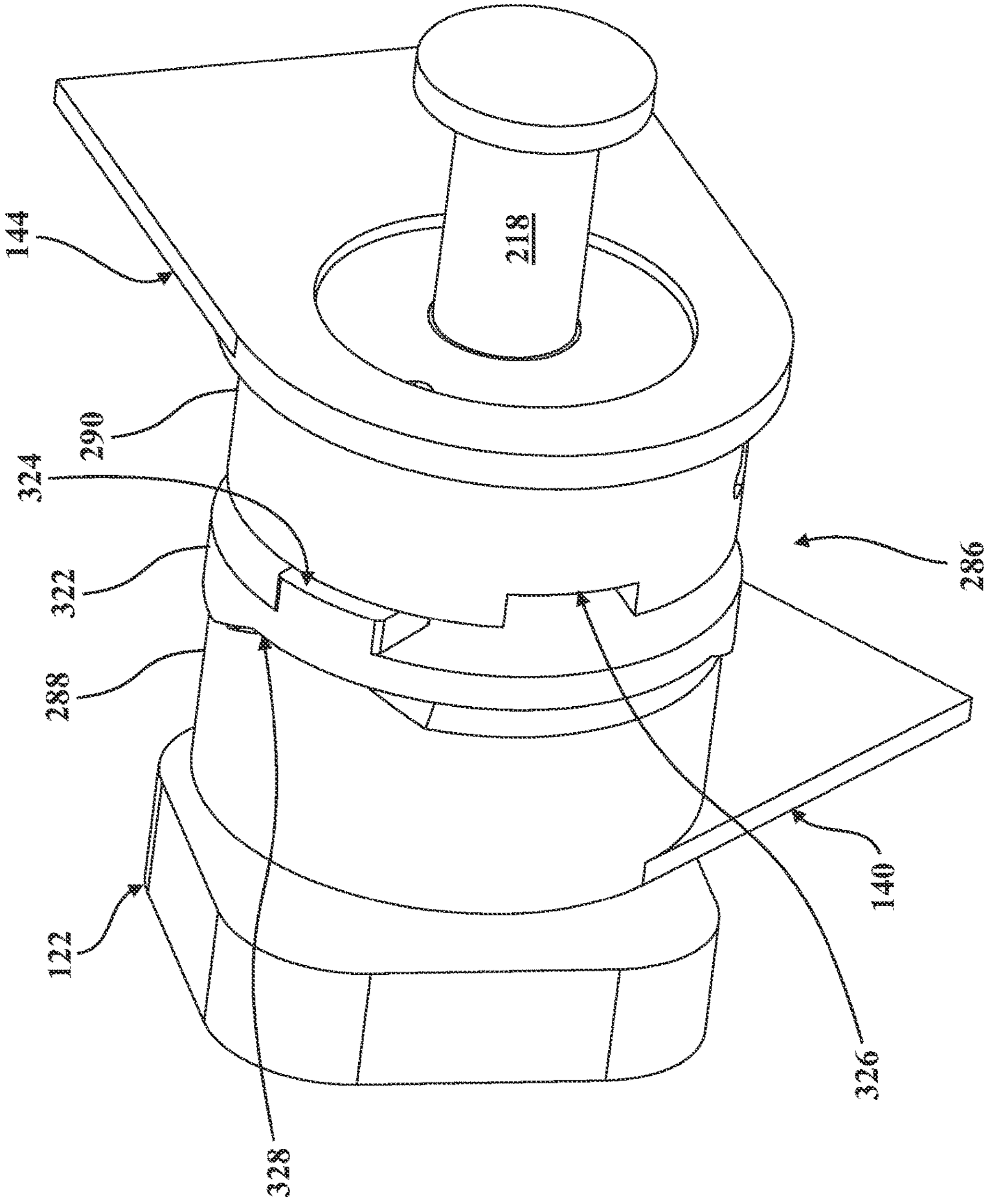
FIG. 23 is a partial perspective view of another version of a litter with a carrier according to the present disclosure.

Referring now to FIG. 23, as noted above, the carrier 286 may be configured in a number of different ways sufficient to facilitate selectively locking the ski assembly 144 to the rear assembly 140 for engagement with stairs ST based on movement about the rear axis XR. Here in FIG. 23, another version of the carrier 286 is depicted generically, with a central portion 322 fixed about the carrier pin 218, such as by keyed engagement (not shown). The central portion 322 includes a key 324 shaped and arranged to selectively engage in a notch 326 formed in the second carrier component 290 coupled to the ski assembly 144. A compression spring or other biasing element (not shown) supported along the carrier pin 318 may urge the key 324 and/or the notch 326 axially towards each other in response to contact occurring along correspondingly-shaped ramped engagement regions 328 disposed on the central portion 322 and on the first carrier component 288 coupled to the rear assembly 140.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient transport apparatus for supporting a patient for transport along stairs, the patient transport apparatus comprising:

a seat assembly including a seat frame and a seat section coupled to the seat frame to support the patient;

a rear assembly coupled to the seat assembly and pivotable between a plurality of rear assembly positions including a first rear assembly position, a second rear assembly position, and a plurality of intermediate rear assembly positions therebetween, the plurality of intermediate rear assembly positions including a rear assembly stair position;

a front assembly spaced from the rear assembly and coupled to the seat assembly;

a ski assembly operatively attached to the seat assembly and being selectively pivotable relative to the rear assembly between a plurality of ski positions; and a carrier coupled between the rear assembly and the ski assembly and being operable between: an unlocked state where relative movement between the ski assembly and the rear assembly is permitted, and a locked state where the carrier inhibits relative movement between the ski assembly and the rear assembly, wherein movement of the rear assembly from the first rear assembly position towards the second rear assembly position changes operation of the carrier from the unlocked state to the locked state such that continued movement of the rear assembly into the rear assembly stair position arranges the rear assembly and the ski assembly for engagement with stairs.

II. The patient transport apparatus of clause I, wherein the carrier includes:

a carrier pin coupled to the seat frame;

a first carrier component operatively attached to one of the rear assembly and the ski assembly, the first carrier component being rotatably supported by the carrier pin; and a second carrier component operatively attached to the other of the rear assembly and the ski assembly, the second carrier component being rotatably supported by the carrier pin and having a follower arranged to movably engage the first carrier component.

III. The patient transport apparatus of clause II, wherein the first carrier component defines a retention face arranged such that movement of the rear assembly from the first rear assembly position toward the second rear assembly position moves the retention face of the first carrier component into abutment with at least a portion of the follower of the second carrier component to place the carrier into the locked state.

IV. The patient transport apparatus of clause III, wherein the first carrier component further defines a guide face; and wherein the follower of the second carrier component is arranged to at least partially engage the guide face of the first carrier component when the carrier operates in the unlocked state.

V. The patient transport apparatus of clause IV, wherein the first carrier component includes a cam defining the retention face and the guide face, with the retention face arranged facing towards at least a portion of the guide face.

VI. The patient transport apparatus of clause V, wherein the cam includes a plurality of lobe regions each defining a respective retention face and a respective guide face.

VII. The patient transport apparatus of any one of clauses IV-VI, wherein the second carrier component includes a carrier hub supporting the follower and arranged for rotation about a rear axis; and wherein the follower is arranged for rotation about a follower axis disposed in spaced relation from the rear axis.

VIII. The patient transport apparatus of clause VII, wherein the follower axis is arranged substantially parallel to the rear axis.

IX. The patient transport apparatus of any one of clauses VII-VIII, wherein the carrier pin is supported by the seat frame along the rear axis.

X. The patient transport apparatus of any one of clauses III-IX, wherein the follower defines a locking face arranged to engage the retention face of the first carrier component when the carrier is in the locked state.

XI. The patient transport apparatus of clause X, further comprising a follower biasing element arranged to urge the locking face of the follower towards the retention face of the first carrier component.

XII. The patient transport apparatus of any one of clauses X-XI, wherein the carrier further includes a third carrier component operatively attached to the seat frame and having a release element arranged to selectively engage the follower to urge the follower away from the retention face of the first carrier component in response to movement of the rear assembly towards the first rear assembly position.

XIII. The patient transport apparatus of clause XII, wherein the follower further defines an unlocking face arranged for selective engagement with the release element of the third carrier component to urge the locking face of the follower away from the retention face of the first carrier component to change operation of the carrier from the locked state into the unlocked state as the rear assembly moves towards the first rear assembly position.

XIV. The patient transport apparatus of any one of clauses XII-XIII, wherein the third carrier component includes a plate arranged for keyed engagement with the carrier pin, with the release element extending from the plate.

XV. The patient transport apparatus of clause XIV, where the third carrier component includes a plurality of release elements each extending from the plate to respective release element ends, with the plurality of release elements being radially spaced from each other about the carrier pin.

XVI. The patient transport apparatus of any one of clauses XIII-XV, wherein one or more of the rear assembly and the ski assembly are pivotably supported about a rear axis; and wherein the carrier is interposed along and at least partially rotates about the rear axis to change between the unlocked state and the locked state.

XVII. The patient transport apparatus of clause XVI, wherein the rear assembly is pivotably supported about a rear axis extending through the seat frame; and wherein the front assembly is pivotably supported about a front axis extending through the seat frame.

XVIII. The patient transport apparatus of clause XVII, wherein the rear axis is coincident with the rear axis.

XIX. The patient transport apparatus of any one of clauses XVII-XVIII, wherein the first rear assembly position is further defined as a rear assembly chair position in which the rear assembly is arranged substantially vertically;

wherein the second rear assembly position is further defined as a rear assembly dock position in which the rear assembly is arranged substantially parallel to the seat assembly; and wherein the rear assembly is arranged at an oblique angle relative to the seat assembly in the rear assembly stair position.

XX. The patient transport apparatus of clause XIX wherein the carrier includes:

a carrier pin coupled to the seat frame;

a first carrier component operatively attached to one of the rear assembly and the ski assembly, the first carrier component being rotatably supported by the carrier pin and having a retention face and a guide face;

a second carrier component operatively attached to the other of the rear assembly and the ski assembly, the second carrier component being rotatably supported by the carrier pin and having a follower arranged to engage the first carrier component, the follower defining a locking face arranged to engage the retention face when the carrier is in the locked state;

a third carrier component operatively attached to the seat frame and having a release element arranged to selectively engage the follower to urge the follower away from the retention face of the first carrier component.

XXI. The patient transport apparatus of clause XX, wherein the locking face of the follower remains engaged with the retention face of the first carrier component as the rear assembly moves from the rear assembly chair position to the rear assembly stair position.

XXII. The patient transport apparatus of any one of clauses XX-XXI, wherein the release element of the third carrier component selectively engages an unlocking face of the follower to urge the locking face of the follower away from the retention face of the first carrier component such that the carrier moves into the unlocked state as the rear assembly moves from the rear assembly stair position to the rear assembly dock position.

XXIII. The patient transport apparatus of any one of clauses XX-XXII, wherein the follower moves relative to the guide face of the first carrier component as the rear assembly moves from the rear assembly dock position to the rear assembly chair position.

XXIV. The patient transport apparatus of clause XXIII, wherein the carrier remains in the unlocked state as the rear assembly moves between the rear assembly dock position to the rear assembly chair position.

XXV. The patient transport apparatus of clause XXIV, wherein the locking face of the follower moves into abutment with the retention face of the first carrier component to place the carrier moves into the locked state as the rear assembly moves into the rear assembly chair position.

XXVI. A patient transport apparatus for supporting a patient for transport along stairs, the patient transport apparatus comprising:

a seat assembly including a seat frame and a seat section coupled to the seat frame to support the patient;

a rear assembly coupled to the seat assembly adjacent to a rear side of the patient transport apparatus and pivotable between a plurality of rear assembly positions including a rear assembly chair position, and a rear assembly stair position for engaging stairs;

a front assembly spaced from the rear assembly and coupled to the seat assembly adjacent to a front side of the patient transport apparatus;

a brace operatively attached to the seat frame;

a ski assembly operatively attached to the seat assembly and being pivotable relative to the rear assembly between a plurality of ski positions including: a raised ski position arranged for engagement with stairs, and a lowered ski position, the ski assembly including a stop face arranged to abut the brace in the raised ski position to maintain the ski assembly in the raised ski position during engagement with stairs; and a biasing element operatively attached to the ski assembly to urge the ski assembly towards the raised ski position; and a fowler assembly coupled to the seat assembly and pivotable between a plurality of fowler positions including a fowler lowered position, a fowler raised position, and a plurality of intermediate fowler positions therebetween, the fowler assembly including a guide arranged to abut at least a portion of the ski assembly in the fowler lowered position and disposed in spaced relation from the ski assembly in the fowler raised position such that movement from the fowler raised position towards the fowler lowered position moves the ski assembly from the raised ski position towards the lowered ski position as the guide comes into abutment with at least a portion of the ski assembly.

XXVII. The patient transport apparatus of clause XXVI, wherein the fowler assembly further includes a fowler frame supporting a fowler cover having a pocket; and wherein the guide is defined by at least a portion of the pocket of the fowler cover.

XXVIII. The patient transport apparatus of clause XXVII, wherein the pocket of the fowler cover is arranged to receive at least a portion of the ski assembly.

XXIX. The patient transport apparatus of any one of clauses XXVI-XXVIII, further including a carrier pin operatively attached to the seat assembly; and wherein the rear assembly and the ski assembly are each rotatably supported by the carrier pin.

XXX. The patient transport apparatus of clause XXIX, further including an indexing spacer arranged for keyed engagement with the carrier pin; and wherein the biasing element includes a first tang operatively attached to the ski assembly, and a second tang operatively attached to the indexing spacer.

XXXI. The patient transport apparatus of clause XXX, wherein the ski assembly defines a first tang catch supporting the first tang of the biasing element, and the indexing spacer defines a second tang catch supporting the second tang of the biasing element.

XXXII. The patient transport apparatus of clause XXXI, wherein the ski assembly includes a ski track frame defining the first tang catch.

XXXIII. The patient transport apparatus of any one of clauses XXVI-XXXII, wherein the stop face of the ski assembly abuts the brace in the raised ski position; and wherein the stop face of the ski assembly is disposed in spaced relation from the brace in the lowered ski position.

XXXIV. The patient transport apparatus of any one of clauses XXVI-XXXIII, wherein the rear assembly is pivotably supported about a rear axis extending through the seat frame;

wherein the front assembly is pivotably supported about a front axis extending through the seat frame; and wherein the patient transport apparatus is operable between:

a chair configuration for movement about floor surfaces; and a stair configuration for movement along stairs.

XXXV. The patient transport apparatus of clause XXXIV, wherein the rear assembly is arranged substantially vertically in the rear assembly chair position; and wherein the rear assembly is arranged at an oblique angle relative to the seat assembly in the rear assembly stair position.

XXXVI. The patient transport apparatus of clause XXXV, wherein pivoting movement of the rear assembly from the rear assembly chair position to the rear assembly stair position brings the rear assembly into substantially parallel alignment with the ski assembly in the raised ski position as the patient transport apparatus changes operation from the chair configuration into the stair configuration.

XXXVII. The patient transport apparatus of any one of clauses XXXV-XXXVI, wherein when the patient transport apparatus is further defined as a litter configured for releasable attachment to a base;

wherein the litter is operable between the chair configuration, the stair configuration, and a dock configuration to facilitate releasable attachment to the base.

XXXVIII. The patient transport apparatus of clause XXXVII, wherein the rear assembly is in a rear assembly dock position during operation in the dock configuration.

XXXIX. The patient transport apparatus of any one of clauses XXXV-XXXVIII, wherein the patient transport apparatus is operable between the chair configuration, the stair configuration, and a loft configuration; and wherein rear assembly is further arranged for movement from the rear assembly chair position to a rear assembly loft position in which the rear assembly is arranged substantially parallel to the seat assembly.

What is claimed is:

1. A patient transport apparatus for supporting a patient for transport along stairs, the patient transport apparatus comprising:

a seat assembly including a seat frame and a seat section coupled to the seat frame to support the patient;

a rear assembly coupled to the seat assembly and pivotable between a plurality of rear assembly positions including a first rear assembly position, a second rear assembly position, and a plurality of intermediate rear assembly positions therebetween, the plurality of intermediate rear assembly positions including a rear assembly stair position;

a front assembly spaced from the rear assembly and coupled to the seat assembly;

a ski assembly operatively attached to the seat assembly and being selectively pivotable relative to the rear assembly between a plurality of ski positions; and a carrier coupled between the rear assembly and the ski assembly and being operable between: an unlocked state where relative movement between the ski assembly and the rear assembly is permitted, and a locked state where the carrier inhibits relative movement between the ski assembly and the rear assembly, wherein movement of the rear assembly from the first rear assembly position towards the second rear assembly position changes operation of the carrier from the unlocked state to the locked state such that continued movement of the rear assembly into the rear assembly stair position arranges the rear assembly and the ski assembly for engagement with stairs.

2. The patient transport apparatus of claim 1, wherein the carrier includes:

a carrier pin coupled to the seat frame;

a first carrier component operatively attached to one of the rear assembly and the ski assembly, the first carrier component being rotatably supported by the carrier pin; and a second carrier component operatively attached to the other of the rear assembly and the ski assembly, the second carrier component being rotatably supported by the carrier pin and having a follower arranged to movably engage the first carrier component.

3. The patient transport apparatus of claim 2, wherein the first carrier component defines a retention face arranged such that movement of the rear assembly from the first rear assembly position toward the second rear assembly position moves the retention face of the first carrier component into abutment with at least a portion of the follower of the second carrier component to place the carrier into the locked state.

4. The patient transport apparatus of claim 3, wherein the first carrier component further defines a guide face; and wherein the follower of the second carrier component is arranged to at least partially engage the guide face of the first carrier component when the carrier operates in the unlocked state.

5. The patient transport apparatus of claim 4, wherein the first carrier component includes a cam defining the retention face and the guide face, with the retention face arranged facing towards at least a portion of the guide face.

6. The patient transport apparatus of claim 5, wherein the cam includes a plurality of lobe regions each defining a respective retention face and a respective guide face.

7. The patient transport apparatus of claim 4, wherein the second carrier component includes a carrier hub supporting the follower and arranged for rotation about a rear axis; and wherein the follower is arranged for rotation about a follower axis disposed in spaced relation from the rear axis.

8. The patient transport apparatus of claim 7, wherein the follower axis is arranged substantially parallel to the rear axis.

9. The patient transport apparatus of claim 7, wherein the carrier pin is supported by the seat frame along the rear axis.

10. The patient transport apparatus of claim 3, wherein the follower defines a locking face arranged to engage the retention face of the first carrier component when the carrier is in the locked state.

11. The patient transport apparatus of claim 10, further comprising a follower biasing element arranged to urge the locking face of the follower towards the retention face of the first carrier component.

12. The patient transport apparatus of claim 10, wherein the carrier further includes a third carrier component operatively attached to the seat frame and having a release element arranged to selectively engage the follower to urge the follower away from the retention face of the first carrier component in response to movement of the rear assembly towards the first rear assembly position.

13. The patient transport apparatus of claim 12, wherein the follower further defines an unlocking face arranged for selective engagement with the release element of the third carrier component to urge the locking face of the follower away from the retention face of the first carrier component to change operation of the carrier from the locked state into the unlocked state as the rear assembly moves towards the first rear assembly position.

14. The patient transport apparatus of claim 13, wherein one or more of the rear assembly and the ski assembly are pivotably supported about a rear axis; and wherein the carrier is interposed along and at least partially rotates about the rear axis to change between the unlocked state and the locked state.

15. The patient transport apparatus of claim 12, wherein the third carrier component includes a plate arranged for keyed engagement with the carrier pin, with the release element extending from the plate.

16. The patient transport apparatus of claim 15, where the third carrier component includes a plurality of release elements each extending from the plate to respective release element ends, with the plurality of release elements being radially spaced from each other about the carrier pin.

17. The patient transport apparatus of claim 14, wherein the rear assembly is pivotably supported about a rear axis extending through the seat frame; and wherein the front assembly is pivotably supported about a front axis extending through the seat frame.

18. The patient transport apparatus of claim 17, wherein the first rear assembly position is further defined as a rear assembly chair position in which the rear assembly is arranged substantially vertically;

wherein the second rear assembly position is further defined as a rear assembly dock position in which the rear assembly is arranged substantially parallel to the seat assembly; and wherein the rear assembly is arranged at an oblique angle relative to the seat assembly in the rear assembly stair position.

19. The patient transport apparatus of claim 18 wherein the carrier includes:

a carrier pin coupled to the seat frame;

a first carrier component operatively attached to one of the rear assembly and the ski assembly, the first carrier component being rotatably supported by the carrier pin and having a retention face and a guide face;

a second carrier component operatively attached to the other of the rear assembly and the ski assembly, the second carrier component being rotatably supported by the carrier pin and having a follower arranged to engage the first carrier component, the follower defining a locking face arranged to engage the retention face when the carrier is in the locked state; and a third carrier component operatively attached to the seat frame and having a release element arranged to selectively engage the follower to urge the follower away from the retention face of the first carrier component.

* * * * *